US006629050B2

(12) United States Patent
Modgil

(10) Patent No.: US 6,629,050 B2
(45) Date of Patent: Sep. 30, 2003

(54) VEHICLE SAFETY AND SECURITY SYSTEM

(75) Inventor: Onkar S. Modgil, Plano, TX (US)

(73) Assignee: UDT Sensors, Inc., Hawthorne, CA (US)

(*) Notice: Subject to any disclaimer, the term of this patent is extended or adjusted under 35 U.S.C. 154(b) by 0 days.

(21) Appl. No.: 09/782,617

(22) Filed: Feb. 13, 2001

(65) Prior Publication Data

US 2002/0111756 A1 Aug. 15, 2002

(51) Int. Cl.[7] .......................... B60R 25/00; B60R 25/04
(52) U.S. Cl. ...................... 702/73; 307/10.2; 307/10.6; 180/287; 340/426
(58) Field of Search ................ 307/10.2, 10.3, 307/10.6, 10.7; 180/287; 340/426, 541; 324/379; 702/66, 73

(56) References Cited

U.S. PATENT DOCUMENTS

| 5,184,023 A | * | 2/1993 | Carlo et al. ............... 307/10.3 |
| 5,200,877 A | * | 4/1993 | Betton et al. .............. 361/92 |
| 5,287,006 A | * | 2/1994 | Carlo et al. ............... 307/10.3 |
| 5,304,849 A | * | 4/1994 | Chen et al. ............... 307/10.5 |
| 5,939,797 A | * | 8/1999 | Konno et al. ............. 307/10.3 |
| 5,977,654 A | * | 11/1999 | Johnson et al. .......... 307/10.3 |
| 6,218,742 B1 | * | 4/2001 | Lafontaine et al. ....... 307/10.6 |

* cited by examiner

Primary Examiner—Marc S. Hoff
Assistant Examiner—Paul L Kim
(74) Attorney, Agent, or Firm—Jones Day

(57) ABSTRACT

A self-contained safety and security system and method that performs the multiple functions of theft deterrence, battery saving, battery analysis system, accident protection, and telemetry and control data communication for vehicles is disclosed. The electronically-based system for a vehicle having an existing power transmission circuit including a battery that can be readily installed and made operational by an individual having no special training using common household tools. The system requires the installation of no dedicated wiring in the vehicle. Furthermore, the system preferably installs without any cutting or splicing of the wiring in the vehicle's electrical system.

The system preferably includes an electrical activity sensor sensing electrical activity on the power transmission circuit, a motion sensor sensing vibration associated with the vehicle, a battery-disconnect switch, and a controller to receive signals from the electrical activity and motion sensors and control the switch.

15 Claims, 31 Drawing Sheets

RESONANCE FREQUENCY = 5KHz

SLIGHTLY OVER DAMPED

THE WEIGHT AT THE END OF THE EXTENSION ARM IS ADJUSTED FOR DESIRED SENSITIVITY.

PIEZO-CERAMIC MOTION TRANSDUCER

PIEZO-CERAMIC MOTION TRANSDUCER

ANALOG SIGNAL CONDITIONER CIRCUIT

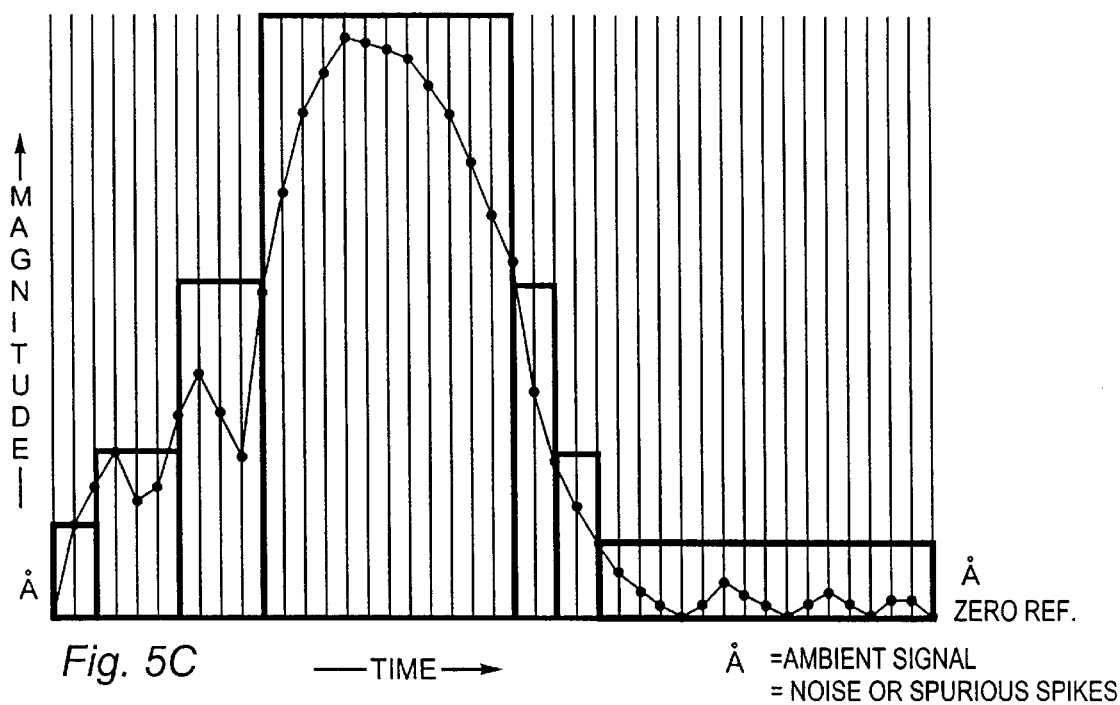
Fig. 5C  CONVERSION TO A DIGITAL COMPOSITE
Å = AMBIENT SIGNAL
= NOISE OR SPURIOUS SPIKES
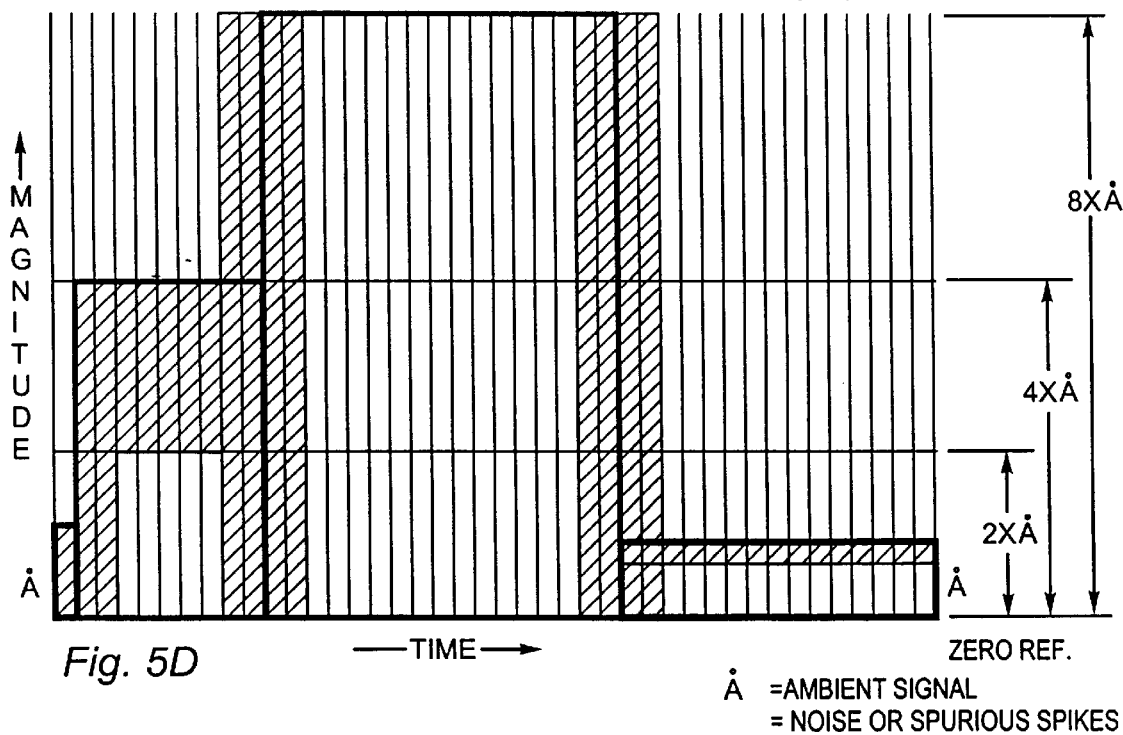
Fig. 5D  A MEMORY DIGITAL COMPOSITE, PRE-STORED FOR COMPARISON. GRAY AREA REPRESENTS TOLERANCE MARGINS
Å = AMBIENT SIGNAL
= NOISE OR SPURIOUS SPIKES

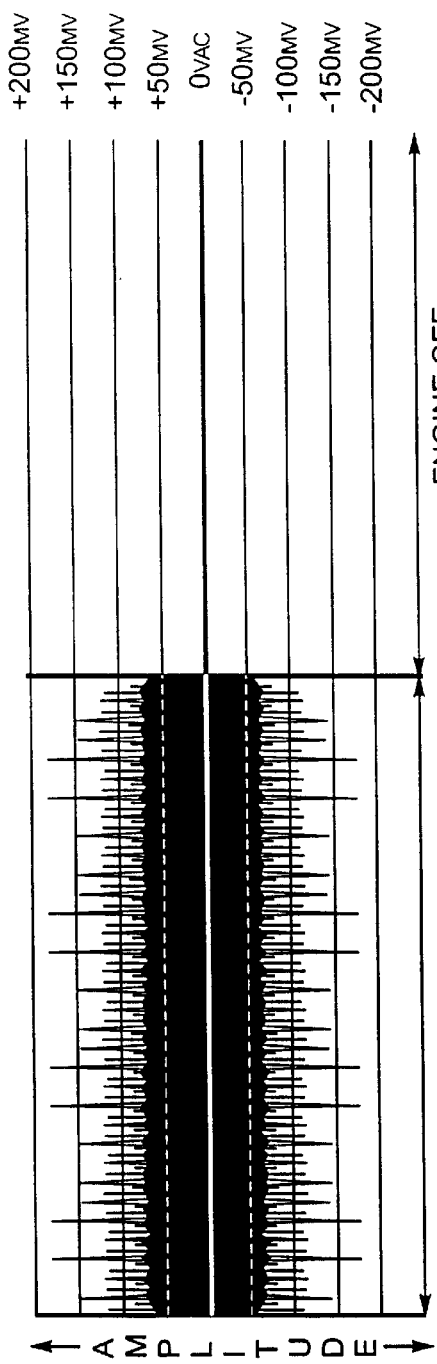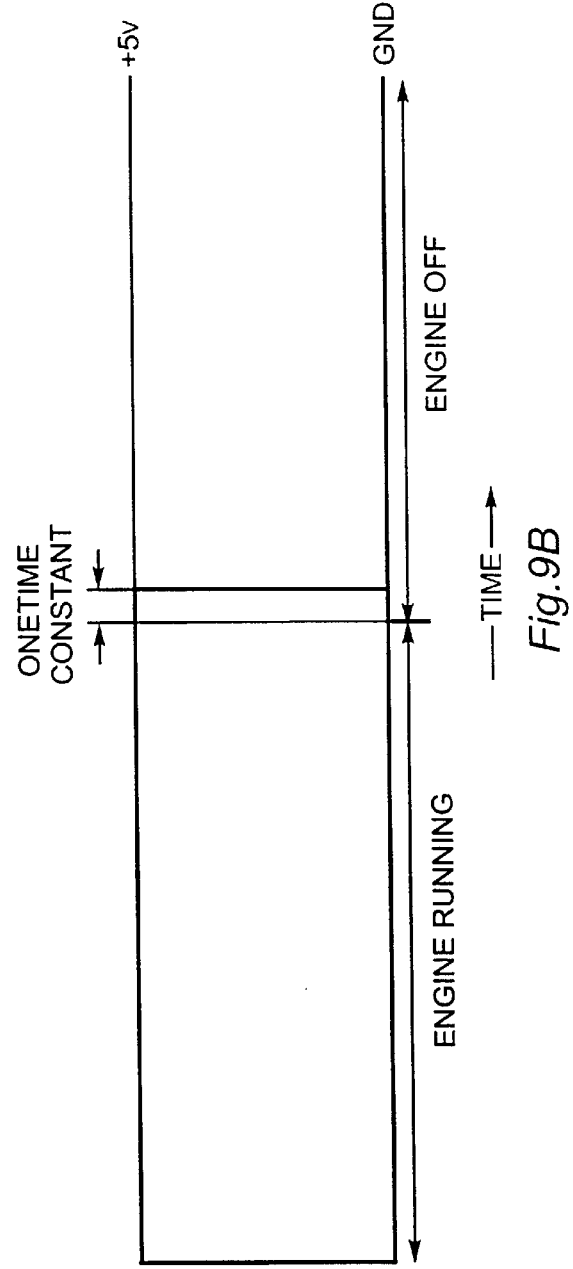

CONSTANT CURRENT SOURCE
100MA 8 VOLTS

SWITCHING WAVEFORM BEFORE
FALLING EDGE CLEANING

NOTE: ALL VOLTAGES REFERENCED
TO VEHICLES'S CHASSIS GROUND

SWITCHING WAVEFORM BEFORE
FALLING EDGE CLEANING

TRANSMISSION SCHEME HEX
068 TRANSMITTED

NOTE: ALL VOLTAGES REFERENCED
TO VEHICLES'S CHASSIS GROUND

FRONT VIEW

SIDE VIEW

R/S LATCH TRUTH TABLE

| | VA | VB | Q | Q* | |
|---|---|---|---|---|---|
| SUPPLY VOLTAGE NORMAL ≥ 12 VOLTS | H | L | H | L | Q=H |
| SUPPLY VOLTAGE FALLS BELOW 10 VOLTS BUT OVER 9 VOLTS | L | L | H | L | Q=H NO CHANGE |
| SUPPLY VOLTAGE FALLS BELOW 9 VOLTS | L | H | L | H | Q TRANSITS FROM H TO L |
| SUPPLY VOLTAGE STAYS BELOW 9 VOLTS | L | H | L | H | Q= L NO CHANGE |
| SUPPLY VOLTAGE GOES OVER 9 VOLTS BUT BELOW 10 VOLTS | L | L | L | H | Q= L NO CHANGE |
| SUPPLY VOLTAGE GOES OVER 10 VOLTS | H | L | H | L | Q TRANSITS FROM H TO L |

THE TRUTH TABLE INDICATES 1 VOLT HYSTERESIS
WHEN SENSING THE TRANSMISSION VOLTAGES

*Fig. 15E*

INTELLIGENT CONTROL MODULE ELECTRONICS IN THE PLASTIC BOX

VEHICLE SAFETY AND SECURITY SYSTEM

This application claims priority to a U.S. application entitled "Vehicle Safety and Security System," having Ser. No. 09/534,243 and filed on Mar. 23, 2000.

1. FIELD OF THE INVENTION

The present invention generally relates to the field of vehicle security and particularly, to the field of computer processing-based vehicle-installed systems that perform a plurality of safety and security functions.

2. BACKGROUND OF THE INVENTION

The marketplace teems with products designed to enhance the safety and security of vehicles. The products range from simple mechanical devices to sophisticated computer-controlled systems. Because of the enormity of the automobile market, most if not all of the technology in vehicle safety and security can be found in devices and systems directed to the automotive industry. Products in the field of automotive safety and security are often differentiated according to the entity intended to perform the product installation. The most complex systems typically are designed to be installed in or are integrated during the construction of a vehicle by the manufacturers of the vehicle. Other systems, often referred to as after-market products, typically require less integration with basic vehicle systems and are typically designed to be installed either by trained personnel operating out of a vehicle dealership or security system installation center, or by the end user of the vehicle. The simplest systems normally are specifically designed to be used and/or installed by the end-user of the vehicle, where the assumption is that no installation training is required.

With respect to vehicle manufacturers, nearly all motorized vehicles are presently manufactured with some level of built-in security system. These systems, commonly referred to as Original Equipment Manufacturer or OEM systems, range from mechanical ignition locks that prevent ignition and steering wheel turning until a vehicle is activated by a key, to computerized systems that not only disable the vehicle when an attempted theft or vandalism is detected, but also provide features like automatic door locks, automatic trunk latch, dome light control, headlight control and remote control of various accessories. These electronic security systems are wired during the manufacturing process and are fully integrated into the rest of the vehicle's electrical system.

The after-market vehicle safety and security products, which are either trained personnel or end user-installed, range from mechanical bars that are literally locked to the steering wheel to prevent wheel rotation, to multi-function electronic systems. The after-market mechanical devices are often but a slight deterrent because they can be easily bypassed. For example, the typical lock bar can be circumvented by severing the steering wheel and hard wiring the ignition switch. In contrast, the after-market electronic systems are more difficult to disarm. These systems, however, are correspondingly more expensive and more difficult to install. In the marketplace, these systems are often offered to the consumer as an option by the vehicle dealership.

As noted above, the after-market electronic systems are typically less complex than the manufacturer-installed systems, but are still quite labor-intensive to install and de-install. After-market electronic systems, though seemingly less vehicle-integrated than the manufacturer systems, typically require a partial disassembly of the motorized vehicle, and interfacing with the vehicle's electrical system. This interfacing requires wiring dedicated specifically to the security system, and integrating the new wiring with the vehicle's existing wiring. The existing and new wires normally must be cut, spliced, and/or crimped as part of the process of installing the after-market systems. Such extensive manipulation of electrical wiring potentially introduces defects into the installed electronic security systems, and in the worst case, into the vehicle's other electrical systems. For example, a poorly crimped wire is susceptible to failure as a result of shock, vibration, exposure to moisture and other corrosive materials. Potentially, within months after a defective crimp is made, an electronic security system or an aspect of the vehicle's electrical system could suddenly fail.

For dealer-installed systems, therefore, dealerships attempt to avoid such problems by employing expert installers. However, because of the substantial expertise needed by the installers, the dealerships incur a substantial labor cost. Substantial costs are also potentially incurred where a de-installation of an electronic security system is necessary. Sometimes, for example, the after-market product has been previously installed by the manufacturer. Because such systems are typically an optional feature at the time of vehicle purchase, often a vehicle buyer does not want the already-installed security system. In that event, the dealership must bear the substantial expense of de-installation or risk losing the sale.

With respect to the after-market electrical systems directed to the end-user, most consumers are technically incapable of installing an electronic security system, and are particularly unwilling to cut and splice the wires in a vehicle's electrical system as is required to install the security system. Still other consumers do not have the tools or time to install a vehicle security system and, therefore, the installation of an electronic security system must be performed, at a substantial additional expense, by a trained technician. Nevertheless, vehicle dealerships are highly motivated to dealer-install vehicle security systems as options on their vehicles because of the normally high profit margin associated with such vehicle options. Unfortunately, because the high labor cost, many vehicle owners are often deterred from having sophisticated security systems installed in their existing vehicles.

Thus, a need exists for a vehicle safety and security system that has the sophistication and multi-function capability desired by many vehicle owners while not exacting the prohibitive costs associated with installing and de-installing such systems. The needed vehicle safety and security system includes an effective theft-deterring capability comparable to other sophisticated security systems and preferably seamlessly incorporates other desirable safety and security features. Such features include a battery saving function to preserve a vehicle's battery charge capacity in the event of potential loss of battery power, such as when the headlights of a vehicle remain lit after the vehicle's engine has been deactivated. Another preferable feature is a battery warning function that informs the vehicle user of the charge capacity of the battery. Further, a need exists for a system that preferably includes an accident safety capability. The system disconnects the battery after a collision involving the vehicle as a measure for minimizing the probability of a vehicle fire caused by an electrical short circuit. Also, a system is needed that preferably includes intelligent control of and communication with the electronic accessories, including pre-existing and later-installed accessories, of a vehicle that are powered using the vehicle's electrical system.

The need for a sophisticated system that performs the above safety and security functions with easy installation and de-installation has, until now, not been effectively met. With respect to theft-deterrence, one of the more common measures has been to disconnect the vehicle's battery. The first battery disconnect system used as a safety and anti-theft device was disclosed by F. M. Blake in U.S. Pat. No. 1,654,450 on a method and apparatus of disconnecting the battery of a motorized vehicle by means of a hidden plunger/switch. Blake had three positions on the disclosed plunger/switch. The first position allowed normal operation of the vehicle. The second position inserted a resistive means in the electrical circuit of the battery and the starter so that the parking lights could operate but the starter and the horn would be disabled. The third position disconnected the battery completely from the electrical circuit of the vehicle. Since then, numerous variations of the same concept have been marketed and/or patented. As the technology and the resources have advanced, so have the system designs for disabling a motor vehicle by disconnecting the battery. However, a sophisticated theft-deterrence system based on battery disconnection that is easily installed in a vehicle and that seamlessly incorporates other safety functions has not been disclosed by the prior art.

An aspect of sophisticated vehicle safety and security systems is the sensing and characterizing of external stimuli, such as the motion, shock or vibration subjected upon the vehicle. The reliability of a security system depends on an accurate characterization of these external stimuli. Otherwise, a security system may falsely trigger an alarm, or worse yet, not trigger one at all while the protected vehicle is being violated. The burden of an accurate characterization and analysis lies not only on the sensors deployed about the vehicle by the security system, but also on the methods of processing the information obtained from the sensors. In recent years, there has been a substantial development in the sensitivity and discrimination of sensors and the methods for processing their responses to improve overall system performance. Acoustic energy, sonic and ultrasonic waves, infrared, radar, heat sensing and pressure sensing have been applied to develop better and more reliable sensors for vehicular use.

Regardless of the medium used to detect a stimulus, there are three levels of sophistication in the technology of detection. The first and simplest level is the measurement of amplitude or intensity of stimuli and the comparison of that amplitude or intensity with a pre-selected threshold. The second level of sophistication has multiple thresholds of intensity for a measured signal to determine multiple levels of hazard to which a vehicle may be exposed. The third and most complex level is exemplified by first having a measured signal operated on by plurality of filters to distinguish different frequency bands. Then the amplitudes in the bands are compared with pre-stored parameters to identify the level of hazard to which the vehicle is being exposed. The pre-stored amplitude and frequency contents may be re-programmed in the field by either the consumer or the installer. The U.S. Pat. No. 4,845,464 by Drori et al. teaches such a system, where such amplitude and frequency contents are measured and stored for comparison with pre-stored parameters.

On the same level, U.S. Pat. No. 5,598,141 discloses several embodiments where an identity or similarity test is conducted between a measured signal and a stored signal. This patent discloses an embodiment where a Von Neumann architecture is used for similarity or identity testing by a Dynamic Time Warping (DTW) algorithm. In the DTW algorithm, the characteristics of the measured signal and the sample signal with time are treated as respective vector sets and a warping function is determined for each of the sets. The warping function can also be determined from the amplitude values rather than from the time characteristics. A distortion matrix is formed of these elements which may represent the similarity of the vector sets. In the DTW algorithm, the characteristics of the amplitude with time are generally subjected to a normalization process such that similar amplitude sequences are treated as similar events.

In yet another embodiment, a computer processes sensor signals using "Fuzzy Logic." Fuzzy logic is based upon the theory that sharply demarcated values and logic are not necessary elements of a signal recognition process. Rather, the theory suggests that variables can have fuzzy values and blurred limits. With fuzzy logic, a degree of hazard is calculated that is not limited to a definite value. In applying fuzzy logic to a vehicle security system, an alarm device may be activated whether a "hazard" value exceeds or is just below a predetermined threshold value.

Systems such as those discussed above that use sophisticated signal processing technology in vehicle safety and security systems can improve the overall reliability of the detection and characterization of external stimuli. However, to accomplish this, a plurality of transmitters and receivers of the chosen energy medium are required. Moreover, to implement such systems, sophisticated computing hardware is necessary. Such computing hardware, however, is costly and has substantial power requirements. With respect to the sensors that provide the input to such systems, their calibration for sensitivity and temperature and the physical coupling of the sensors to a vehicular body are issues that potentially translate into high material and installation costs. Such consequences of applying sophisticated technology in motor vehicle security systems often make their use impractical. Thus, a need exists for an inexpensive method of measuring external stimuli, having a simple hardware/software interface, consuming low power and having high reliability in characterizing external stimuli.

As outlined above, a need exists for a multi-function easily installed vehicle safety and security system that includes battery saving and battery condition warning capabilities. Systems that perform these functions have been in existence for some time as battery failure has always been a problem in motorized vehicles.

One of the most common causes of battery failure is accidental battery discharge. Accidental battery discharge can occur because of vehicle operator error, such as when in an inactive vehicle, an electrical load such as headlights or parking lights remain active for an extended period Accidental battery discharge is also caused by auxiliary equipment loads powered from, for example, the cigarette lighter plug. Many vehicle manufacturers have addressed the problem of accidental battery discharge and have implemented electrical wiring changes in their vehicles to attempt to prevent it. However, wiring changes alone cannot prevent all accidental battery discharges. For example, while the cigarette lighter socket and the headlights can be wired into the ignition without affecting their versatility, the parking lights, on the other hand, cannot be wired into the ignition circuit. A vehicle operator must be free to leave the vehicle unattended with the parking lights activated. Further, a vehicle's interior lights must be designed to be activated when the engine is inactive and the doors of the vehicle are opened.

To address these issues, battery saver systems that prevent or at least minimize battery drain have been developed as after-market products. As certain conditions are met, a battery saver system saves the charge on the battery by disconnecting the battery from the rest of the vehicle's electrical system. In U.S. Pat. No. 5,089,762 to J. M. Sloan, a battery disconnect device is disclosed in which a microprocessor iteratively compares a battery voltage signal with a cutoff voltage, the level for which depends partially on the ambient temperature surrounding the battery. If the battery voltage is less than or equal to the cutoff voltage level, then after a short period of time, the battery is disconnected by a battery disconnect signal from the microcontroller. Similarly in U.S. Pat. No. 5,691,619 issued to S. Vingsbo, a battery safety switch is provided which continuously monitors the battery voltage and compares it to a reference voltage. A relay is disengaged subsequently to detecting a battery voltage that is of lower magnitude than the reference. These systems, as well as others in the prior art, do not perform their battery saving function in combination with other vehicle safety and security functions. In fact, as single function systems, these devices at times may interfere with the performance of other vehicle safety or security devices.

Another common cause of battery failure is a faulty battery. A battery may be faulty because of aging, low electrolyte (poor maintenance), a weak or non-functioning alternator, a malfunctioning regulator, corrosion on the battery electrodes or a manufacturing defect. This kind of failure typically becomes observable over a longer period of time than if a battery loses charge capacity simply because of a power-draining active load. To address this issue, battery condition warning systems have been developed that continually or periodically analyze a battery's charge capacity. These systems often provide a warning to the vehicle operator when the charge capacity in the battery is low. For example, in U.S. Pat. No. 4,816,768, K. Champlin discloses a medium-scale integration (MSI) and CMOS implementation of a battery testing circuit. The testing device performs small signal measurements of a battery's dynamic conductance and provides for displaying either quantitative or qualitative assessments of the battery's condition In U.S. Pat. No. 5,438,270, J. Harper et al. discloses a battery tester that includes a circuit that provides a battery charge and current level signal. The signals are based on a comparison between a first ratio of the battery potential when the battery is unloaded and a second ratio of the loaded battery potential. In U.S. Pat. No. 5,629,680, issued to S. K. Makhija, a self-contained vehicle current drain tester with memory saver is disclosed. The tester includes a measurement current; loop, an offset circuit and a fail indicator. A current sensor generates a measurement signal in response to current flowing in the current loop. Like the battery saver systems in the prior art however, the above devices are not directed towards seamless integration into a multi-function vehicle safety and security system. Thus, a need exists for a battery condition testing and warning system that warns the vehicle operator about forthcoming battery problems and seamlessly integrates into an easily-installed multi-function vehicle safety and security system.

A need also exists for a multi-function easily installed vehicle safety and security system that includes a battery-disconnect capability in case of a collision involving the vehicle. It is well known in the technology of vehicular safety that as a result of an automobile accident in which the body of the vehicle is damaged, a serious risk of a fire exists. Of the fires that are started in the engine compartment because of an accident, about 80% are caused by an electrical short circuit. Because of this threat, vehicle manufacturers such as Mercedes Benz, BMW and General Motors have designed and implemented systems in many of their luxury models to minimize the probability of vehicle fires caused by electrical short circuits. A need exists however, for an after market multi-function vehicle safety and security system that seamlessly incorporates such an accident safety capability as one of its functions.

A need further exists for an easily installed multi-function vehicle safety and security system that effectively communicates with accessories, such as the vehicle door locks, dome light and trunk latch. There are several known methods of communication between a main security system unit, which is often installed under the hood, and its accessories, which are often installed in the passenger compartment, inside the door panels or in the trunk. The most commonly practiced method is to install dedicated wiring to selectively control the accessories. In some implementations, more than one wire is run to each accessory to selectively control corresponding functions performed by the accessories. Hard wiring, however, is tedious work and normally requires a working knowledge of a vehicle's electrical system.

To avoid the problems associated with hard wiring, wireless systems have been devised that potentially only require wiring for the systems' power supplies. Wireless methods using radio frequency transmission have, however, inherent drawbacks. In a radio-controlled security system for a vehicle, interference signals coming from similar anti-theft systems in nearby vehicles, garage door openers, electrical storms, stray harmonics of broadcast radio or the like, could inadvertently operate the vehicle's accessories or the security system itself. Ultrasonic and infrared signals may be used for communication, but for these methods it is almost impossible to transmit the signal from the engine compartment to the passenger compartment or to the trunk of the vehicle.

To communicate with vehicle accessories, another practice is to use a vehicle's existing power wiring. U.S. Pat. No. 4,463,340 by Adkins et al. discloses a method of imposing coded signals on a vehicle's power transmission circuit. A coded signal is imposed on the vehicle's power transmission circuit using a high power switch that loads the circuit at high speed. This method imposes a signal on the power transmission circuit that is rich in harmonics, and which, because of interference, could render useless sensitive electronic equipment, like a radio or internal computer. The patent, however, neither addresses nor provides any solution for the problem of interference. U.S. Pat. No. 5,539,388 by O. S. Modgil discloses a method that resolves the interference problems by imposing a signal on the power transmission circuit that resembles the noise induced on the power transmission circuit by other electrical systems of the vehicle, like the spark plugs and alternator. The inposed signal however differs from such noise in periodicity. Further, electronic equipment that is provided in most vehicles suppresses such noise. Because the imposed signal is only a few millivolts, this method requires sophisticated and relatively expensive means to isolate the imposed coded signal from the imposed noise. In U.S. Pat. No. 5,677,663 by Sansome, a method is disclosed in which a terminal receives power produced by a power supply, and a signal modifier modifies a characteristic of the power produced by the power supply. A reader detects the presence of the verification signal and an enabler enables the vehicle to be driven when the presence of the verification signal is detected.

All of the vehicle communication systems discussed above and in the prior art that use the power transmission circuit of the vehicle impose a new signal on the DC power transmission signal. However, the battery in most motorized vehicles, being a low resistance and high capacitance device, resists having a signal imposed on it. Furthermore, although an imposed signal may be identifiable a significant distance away from the battery, near the battery, the magnitude of the imposed signal is lower, making identification much more difficult. Thus, the integrity of the imposed signal in the prior art systems varies from location to location within the power transmission circuit of the vehicle. Temperature, stray capacitance and capacitance to chassis ground also have significant effects on the quality of imposed signal.

Compounding the problems associated with such methods, modern vehicles having sub-systems like air bags, anti-skid systems, anti-lock breaking systems, and the like, require a clean, uncontaminated supply of power. Consequently, vehicle manufacturers are beginning to install localized noise filters and noise suppression systems under the dashboard or elsewhere about the vehicle. The installation of such systems makes ascertaining the true magnitude of an imposed signal that is received at a particular point in a power transmission circuit even more difficult. Thus, a need exists for system that includes a capability of communicating with vehicle accessories but that is not hampered by such communication problems.

SUMMARY OF THE INVENTION

The present invention provides an electronically-based, self-contained safety and security system for a vehicle having an existing power transmission circuit including a battery that can be readily installed and made operational by an individual having no special training using common household tools. The safety and security system requires the installation of no dedicated wiring in the vehicle. Furthermore, the system preferably installs without any cutting or splicing of the wiring in the vehicle's electrical system.

A preferred embodiment of the present invention includes an electrical activity sensor coupled to and sensing electrical activity on the direct current power transmission circuit, a motion sensor sensing vibration associated with the vehicle, a battery-disconnect switch electrically interposed in the direct current power transmission circuit; and a controller having inputs to receive signals from the electrical activity and motion sensors and an output to communicate with and control the switch. The electrical activity sensor has an electrical activity sensor output producing an electrical activity output signal functionally related to a voltage detected on the direct current power transmission circuit. Similarly, the motion sensor includes a motion sensor output that is electrically coupled to the input of the controller and produces a motion sensor output signal functionally related to any vibration detected within the vehicle.

As such, it is an object of the present invention to provide a novel battery saver for a vehicle that automatically detects a condition leading to an accidental discharge of the battery, and prevents it. The system and method of the present invention achieves this object in that the controller first analyzes the electrical activity output signal of the electrical activity sensor to determine a load on the direct current power transmission circuit. The controller then transmits a battery-disabling signal to the switch thereby opening the switch when the electrical activity output signal varies by a preset amount from a predetermined ambient condition level. Preferably, the present invention further includes an intelligent module electrically interposed in and sensing electrical activity on the direct current power transmission circuit. The intelligent module has an output electrically coupled to one or more electronic accessories in the vehicle and deactivates the electronic accessory from an active state when the intelligent module senses that the battery is overloaded. The intelligent module senses an overload when it detects the electrical activity on the direct current power transmission circuit falling a preset amount below a predetermined ambient condition level.

It is also an object of the present invention to provide a novel system and method for deterring theft. The system and method of the present invention achieves this object in that the controller first analyzes the electrical activity output signal of the electrical activity sensor to identify when the electrical activity output signal contains an electrical signature of an ignition switch in motion. The controller then calculates a theft-deterrence value based on the analyzed electrical activity and transmits a battery-disabling signal to the battery-disconnect switch when the theft-deterrence value surpasses a predetermined battery-disconnect threshold level.

It is another object of the present invention to provide a novel battery analyzing system and method for a vehicle that automatically detects the charge-capacity of the battery and warns the user of the system audibly and/or visually. The system and method of the present invention achieves this object in that the controller first analyzes the electrical activity output signal of the electrical activity sensor when the vehicle's starter is activated to determine the battery condition. The controller then transmits on the direct current power transmission circuit a battery condition signal containing data on the battery condition to a battery condition reporting module. The battery condition reporting module is electrically interposed in the direct current power transmission circuit and reports to the user the battery condition information that is encoded in the battery condition signal.

It is another object of the present invention to provide a novel accident safety system and method for a vehicle. The system automatically disconnects the battery for the power transmission circuit when the vehicle is involved in a forceful collision. The system and method of the present invention achieves this object in that the controller first analyzes the motion sensor output signal of the motion sensor to identify whether the motion sensor output signal contains a vibration signature of a collision. The controller then transmits a battery-disabling signal to the switch when the motion sensor output signal matches the vibration signature to a preset degree.

It is another object of the present invention to provide a system and method for transmitting telemetry and control signals including data to electronic accessories interposed on the power transmission circuit, without including any dedicated wiring for the communication. The system and method of the present invention achieves this object in that the controller encodes the data in the signals by transmitting to the switch a sequence of battery-enabling and disabling signals. The time between enabling and disabling signals comprises the data signal. A receiver electrically coupled to the direct current power circuit receives the data signal and decodes it into data. Preferably, the present invention includes a constant current source interposed in the direct current power transmission circuit and electrically in parallel with the switch. The constant current source, when enabled, preferably supplies an ambient condition voltage to the direct current power transmission circuit. When the controller disables the battery by transmitting a disabling signal to the switch, the voltage on the direct current power transmission circuit shifts to the ambient condition voltage.

It is another object of the present invention to provide a seamless integration between these aforementioned systems and methods such that they are performed by a single unified system.

These and other objects, features, enhancements and advantages of the present invention will become apparent upon consideration of the following detailed description of the invention and the accompanying drawings.

BRIEF DESCRIPTION OF THE DRAWINGS

FIG. 5C graphically depicts a digital composite construction of the motion sensor output signal of FIG. 5A of a vehicle door being opened.

FIG. 5D graphically depicts a digital model of a typical vibration signature for a door opening, as stored in the electronic memory of an integrated vehicle safety and security system according to a preferred embodiment of the present invention. The diagram shows the tolerance-margins for the digital model in gray.

FIG. 9A graphically depicts typical electrical activity on a vehicle's power transmission circuit before and after the vehicle's engine has been turned off.

FIG. 9B graphically depicts an output signal from the electrical activity sensor of FIG. 8 where the input to the electrical activity sensor is the electrical activity induced on the power transmission circuit as shown in FIG. 9A.

FIG. 15E depicts an R/S latch truth table implemented in a condition reporting module and in intelligent control modules included in preferred alternative embodiments of the present invention.

DETAILED DESCRIPTION OF THE PREFERRED EMBODIMENTS

Figure 1:
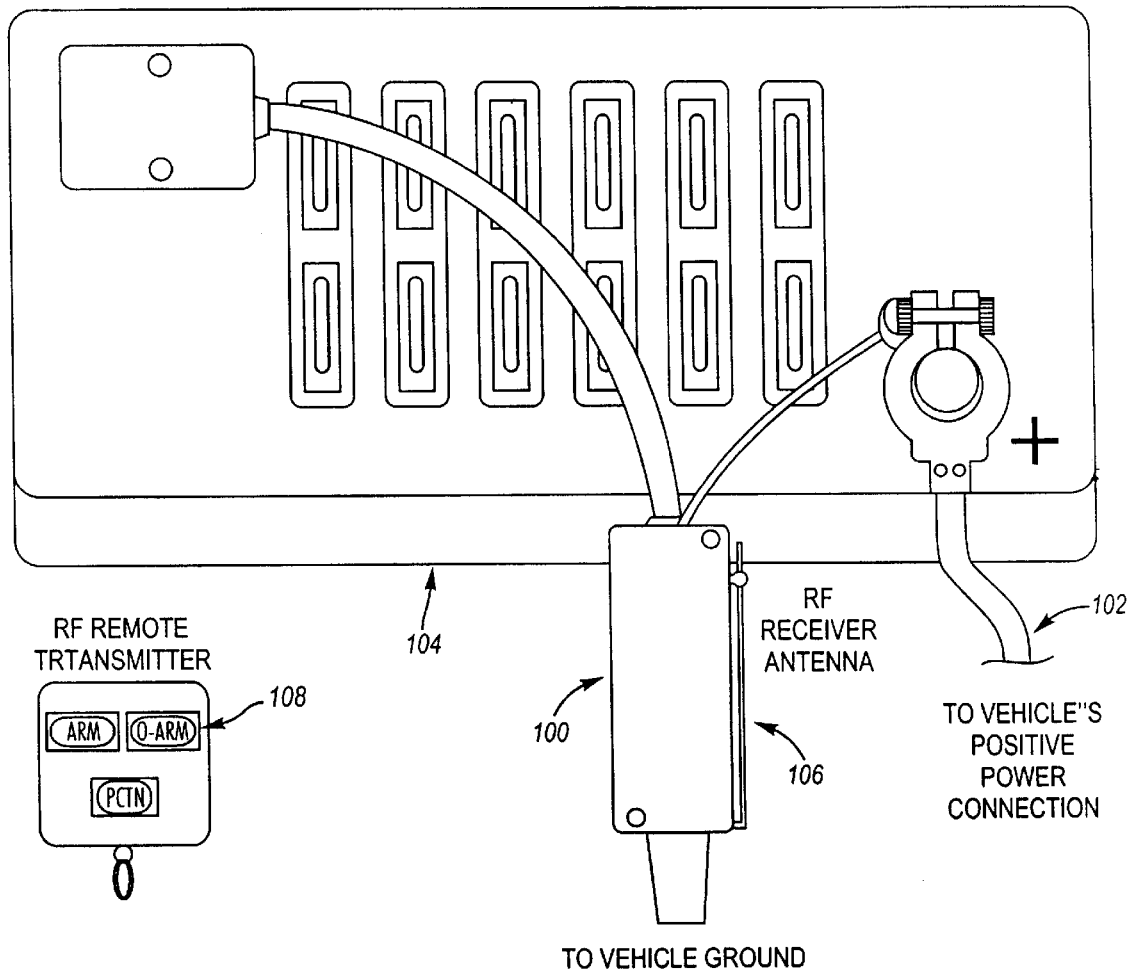
FIG. 1 depicts an integrated vehicle safety and security system according to a preferred embodiment of the present invention mounted on a standard battery used in a motorized vehicle, with an RF remote control transmitter.
Figure 2:
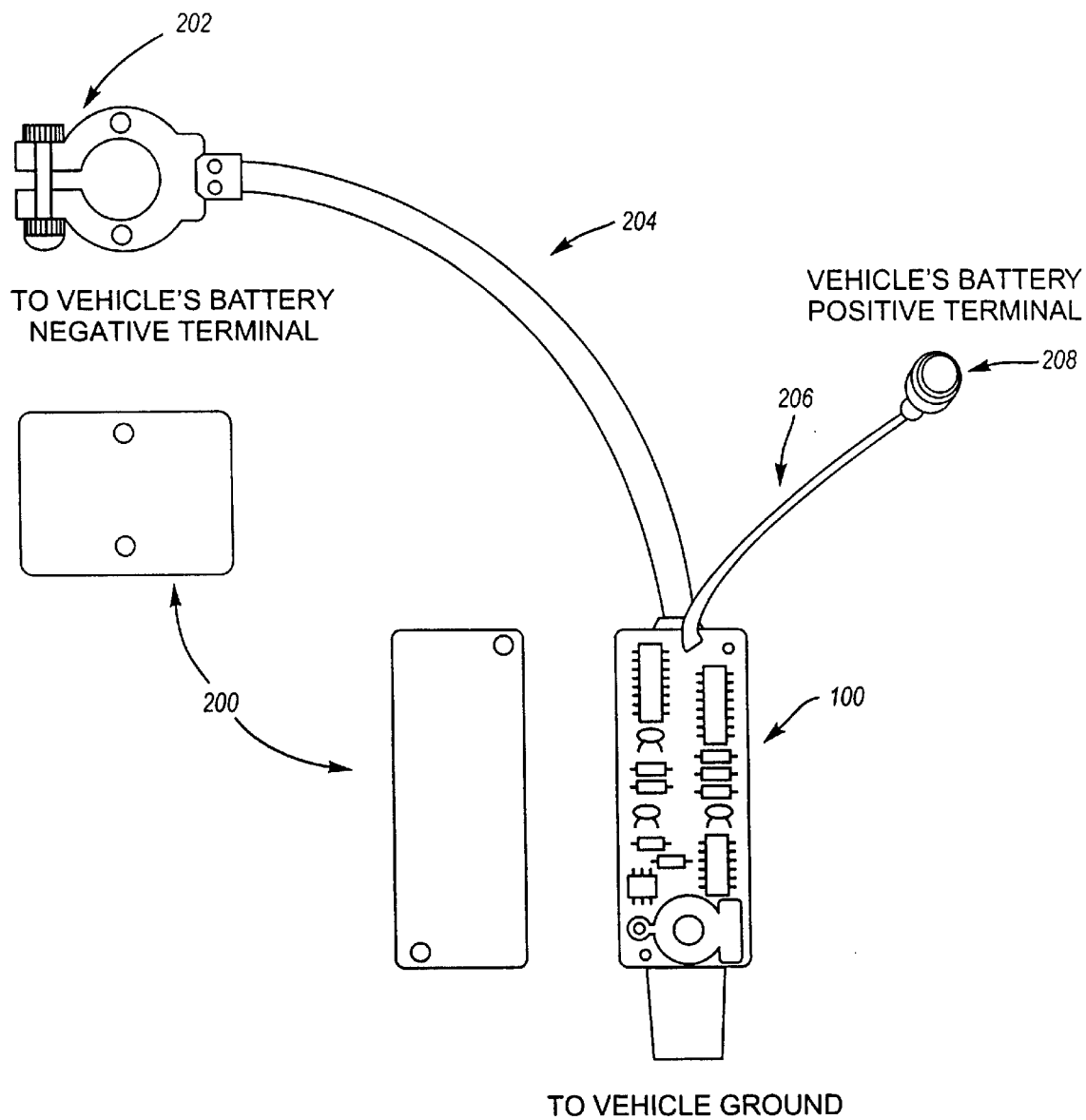
FIG. 2 depicts an integrated vehicle safety and security system according to a preferred embodiment of the present invention with the system casing covers removed.

FIGS. 1 and 2 depict the installation of a Vehicle Safety and Security System (VSS) 100 into a direct current power transmission circuit 102 of a typical motorized vehicle. The vehicle may be an automobile, boat, airplane or other transport. Further, while the preferred embodiment is adopted to a vehicle having an internal combustion engine, the present invention may also be applied to electric or battery-propelled vehicles. Vehicles envisioned to be applicable to the present invention need only have an existing direct current power transmission circuit 102, including a battery 104. FIG. 1 shows the VSS 100 as installed in the power transmission circuit 102 of the vehicle while FIG. 2 shows the VSS 100 with the VSS casing covers 200 removed prior to being mounted to the battery 104. As shown in FIGS. 1 and 2, the VSS 100 is an integrated system that is self-contained and readily installs in a vehicle without any special tools or skills, and without cutting or splicing the wires of the vehicle's electrical system. The ease of installation results in a tremendous reduction in installation time, and readily enables de-installation, if necessary.

The VSS 100, with an attached radio frequency (RF) receiver and antenna 106, is cable-connected 204 the negative side 202 of the vehicle battery 104. The usual connection from the vehicle's chassis (which is ground for the electrical system and is not shown) to the negative side 202 of the battery 104 is removed from the negative side 202 of the battery 104 and connected to the VSS 100. A second cable 206 connects the VSS 100 to the positive side 208 of the battery 104. The positive terminal 208 of the battery 104 is connected to the vehicle's direct current power transmission circuit 102, in which is interposed any and all of the vehicle's electrically-powered accessories. Once installed, the VSS 100 becomes electrically coupled to the direct current power transmission circuit 102 of the vehicle. The VSS 100 provides a hand-held RF remote control transmitter 108 for the user to communicate with the VSS 100 or to customize the features of the VSS 100.

Figure 3:
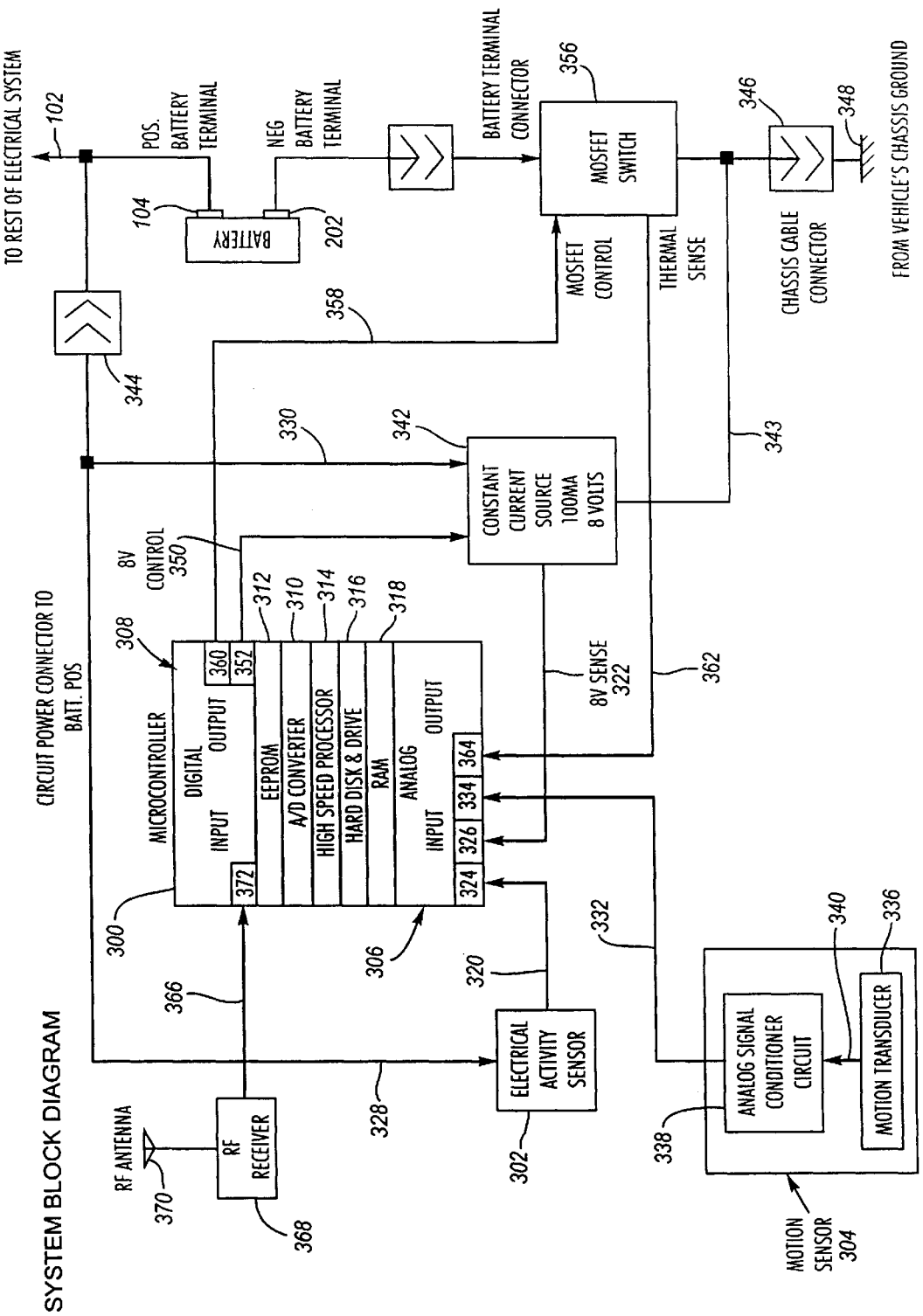
FIG. 3 depicts a system block diagram of an integrated vehicle safety and security system according to a preferred embodiment of the present invention.

FIG. 3 is a system-level block diagram of the hardware components of the VSS 100 and their interconnectivity. As shown in FIG. 3, the VSS 100 is, in part, preferably comprised of a microcontroller 300, an electrical activity sensor 302 and a motion sensor 304. The microcontroller 300 preferably includes a plurality of analog input and analog output channels 306 and a plurality of digital input and digital output channels 308. Preferably, the microcontroller 300 further comprises an analog-to-digital (A/D) converter 310 for converting analog input from the sensors 302, 304 to a digital format, an EEPROM 312 for storing one or more user security codes, a high-speed computing processor 314, such as a Pentium III or other state-of-the art processor preferably capable of multi-tasking, a hard disk and drive 316 for storing and retrieving sets of motion and electrical activity signatures and, therefore, preferably having a gigabyte or more of memory, and RAM 318, preferably 64 megabytes or more.

The electrical activity sensor 302 has an electrical activity sensor output 320, 322 electrically coupled to at least one, and preferably two of the analog inputs 324, 326 of the microcontroller 300. One of the connections of the VSS 100 to the positive side 208 of the battery 104 is to an input 328, 330 of the electrical activity sensor 302. The electrical activity sensor input 328, 330 preferably includes two channels such that the electrical activity sensor 302 can detect both the alternating current (AC) 328 and direct current (DC) 330 components of any electrical activity produced on the direct current power transmission circuit 102. After processing each component 328, 330 separately, the electrical activity sensor output 320, 322 provides an electrical activity sensor output signal to the two analog input channels 324, 326 of the microcontroller 300 that includes the separately processed AC and DC components 328, 330 of the electrical activity.

Similarly, the motion sensor 304 has a motion sensor output 332 preferably electrically coupled to a third analog input 334 of the microcontroller 300. The motion sensor 304 preferably comprises a piezo-ceramic motion transducer 336 (see FIGS. 4A–C) and an analog signal conditioner circuit 338. The piezo-ceramic motion transducer 336 preferably detects vibration within the vehicle and produces an electrical signal functionally related to the vibration. The electrical signal then serves as an input 340 to the analog signal conditioner circuit 338. After processing the electrical signal, the output of the analog signal conditioner circuit (the motion sensor output 332) transmits a motion sensor output signal to the microcontroller 300 that is a processed form of the original electrical signal.

Figure 12:
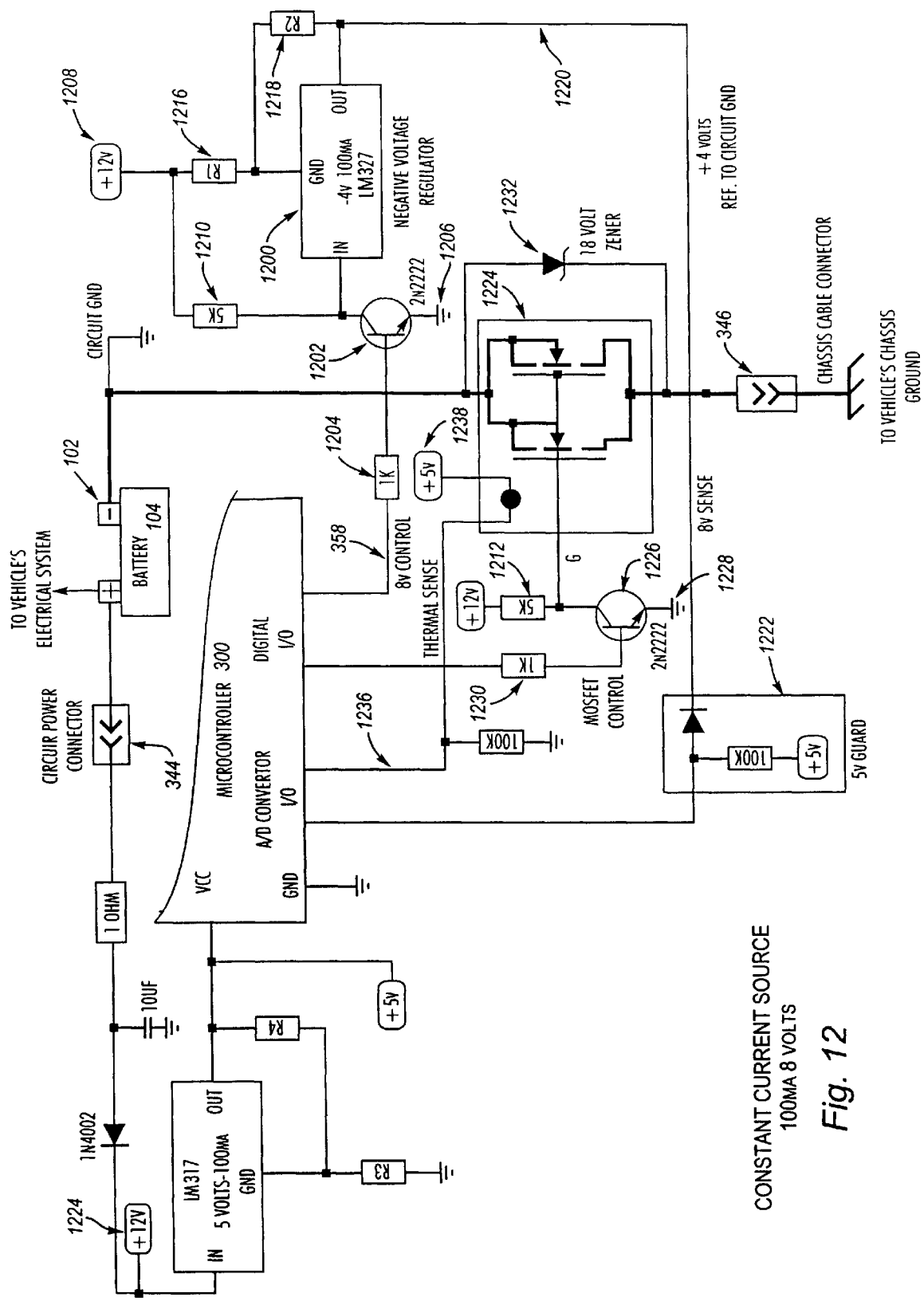
FIG. 12 is a circuit schematic for a preferred embodiment of a high current MOSFET switch and a constant current source according to the present invention.

The VSS 100 preferably further includes a constant current source 342 which operates, under an ambient condition for the vehicle's electrical system 102, at about 100 milliamps and a preferred predetermined ambient condition level of about eight volts (see FIG. 12). Alternatively, the predetermined ambient condition level voltage could be set at any voltage between about three and about eleven volts. These limitations are based on the vehicle battery's nominal voltage (about 12 volts) and the minimum voltage necessary to maintain the memories in any electronic accessories powered on the vehicle's power transmission circuit 102. Such accessories, for example, may include a radio with channel memory, the seat adjuster with position memory, or an engine computer with memory to maintain vital driving statistics to perform various engine functions such as engine self-tuning.

The constant current source 342 further has electrical connections 330, 343 to the positive terminal connector 344 and to the chassis cable connector 346. The chassis cable connector 346 electrically connects to the vehicle chassis (not shown), which is ground 348 for the power transmission circuit 102. The constant current source 342 is preferably electrically in series with the battery 104 in the power transmission circuit 102. The constant current source 342 also has an electrical connection 350 from a first digital output 352 of the microcontroller 300. The constant current source 342 is enabled and disabled when it receives constant current source enabling and disabling signals transmitted from the first digital output 352 of the microcontroller 300 using this electrical connection 350.

Mounted on the negative terminal 202 of the vehicle battery 104 is a negative terminal connector 354. The negative terminal connector 354 is connected to the ground 348 of the vehicle's chassis. However, a switch 356, preferably a MOSFET switch (see FIG. 12), is interposed between the negative terminal 202 of the battery 104 and ground 348, yet is in parallel with the constant current source 342. The switch 356 has an electrical connection 358 from a second digital output port 360 of the microcontroller 300 and is thereby controlled by the microcontroller 300. The switch 356, when opened by a battery disabling control signal from the microcontroller 300, disconnects the battery 104 from the direct current power transmission circuit 102 of the vehicle. In that event, the sole source of power to the direct current power transmission circuit 102 is the constant current source 342. The switch 356, though preferably a MOSFET switch, can be any kind of switching mechanism for disconnecting a battery 104, including a mechanical switching mechanism.

As one of the monitoring functions in the VSS 100, the MOSFET switch 356 preferably returns a thermal sense signal via an electrical connection 362 to a fourth analog input 364 of the microcontroller 300. The thermal sense signal enables the microcontroller 300 to open the switch 356 from the battery 104 in case of thermal runaway. Such an event is more likely to occur in motorized vehicles at the time of engine ignition, and particularly when there are repeated ignition attempts within a short period, or when there is a short circuit in the power transmission circuit 102.

Preferably, another input connection 366 to the microcontroller 300 is from an RF receiver 368 with RF antenna 370 connected to a digital input port 372 of the microcontroller 300. The receiver 368 and antenna 370 enable the user to communicate with the VSS 100 via the remote RF transmitter 108 shown in FIG. 1. The RF remote transmitter 108 enables the user to arm and disarm the VSS 100. Preferably, in response to a VSS disarming signal, the microcontroller 300 transmits a battery-enabling signal to the switch 356, in case the VSS 100, in performing one of its functions, has disabled the battery 104, and the user is ready to have the battery 104 reconnected to the power transmission circuit 102.

Figure 4A:
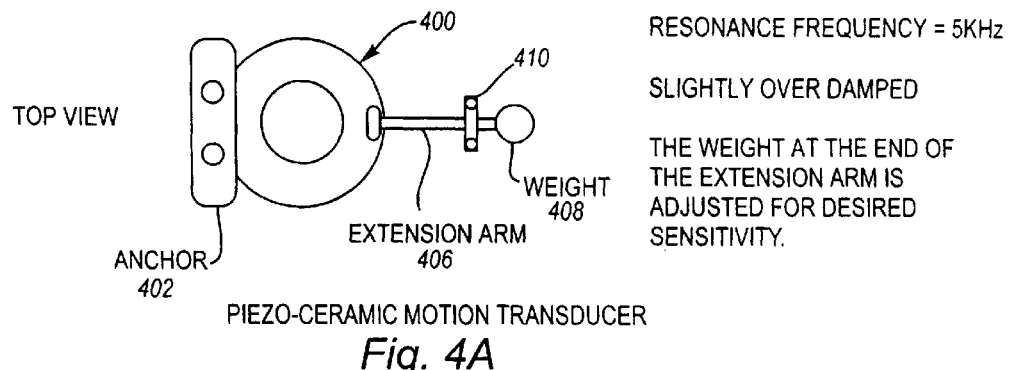
FIG. 4A depicts a top view of a preferred embodiment of a motion sensor in the present invention.
Figure 4B:
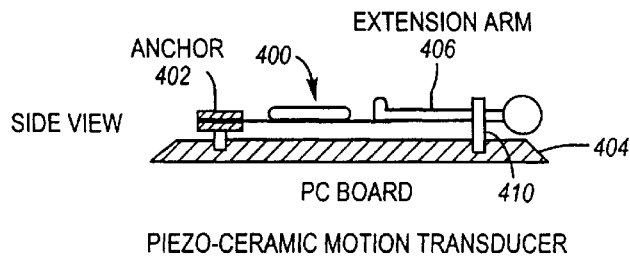
FIG. 4B depicts a side view of a preferred embodiment of a motion sensor in the present invention.
Figure 4C:
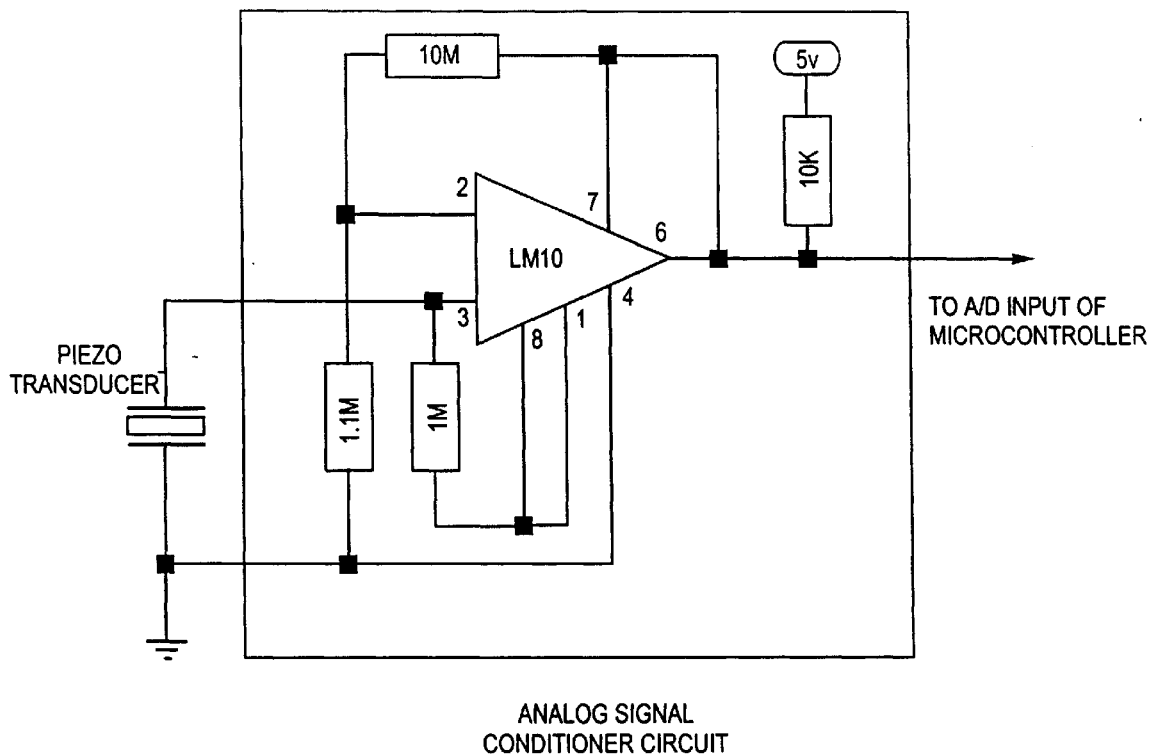
FIG. 4C depicts a circuit schematic for a motion sensor in the preferred embodiment of the present invention.

FIGS. 4A and 4B show top and side views respectively, of a preferred embodiment of a motion sensor 304 included in the present invention. As noted above, the motion sensor 304 preferably comprises a piezo-ceramic motion transducer 326 in which a piezo-ceramic disc 400 is held via an anchor 402 on one end to a printed circuit board 404. However, any motion sensor known in the prior art can be adapted for use in the VSS 100. At 180° from the anchor 402 on the disc 400 is an extension arm 406 welded to a metal part of the disc 400. At the end of the extension arm 406 is a weight 408. The length of the extension arm 406 determines the damping characteristics of the resonant sensor transducer 336 and the weight 408 determines the sensitivity of the sensor transducer 336. The extension arm 406 is surrounded by a U-shaped guard 410 that limits the movement of the extension arm 406 against the destructive limits of shocks and jerks. The design of such a sensor system is known in the art.

Preferably, the motion sensor transducer 336 in the present invention is resonant at 5 KHz and is slightly over-damped. Vibration in the vehicle caused by opening or closing any door of the vehicle amplitude modulates the resonant transducer 336, producing an electrical signal functionally related to the strain induced on the piezo-ceramic disc 400 due to the oscillation of the extension arm 406 and the weight 408. The motion sensor 304 preferably further comprises the analog signal conditioner circuit 338 that accepts as an input 340 the electrical signal produced by the transducer 336. As shown in the circuit schematic diagram of FIG. 4C, the electrical signal from the transducer 336 is conditioned by the conditioner circuit 338. The circuit then outputs the motion sensor output signal to the third analog input 334 of the microcontroller 300. The motion sensor output signal is amplified, filtered, and normalized by the conditioner circuit 338 before being transmitted to the microcontroller 300.

The motion sensor output signal, once received at the microcontroller 300, is processed by the A/D converter 310 at equal to or greater than four times the resonant frequency of the motion sensor 304. The samples are summed and averaged preferably at a rate of one millisecond and then saved in the RAM 318 of the microcontroller 300. The collection of samples forms a digital signature that represents the vibration detected within on the vehicle.

The present invention, being a self-contained system 100, then identifies the digital signal received from the motion sensor 304. The microcontroller 300 preferably uses Digital Signal Processing (DSP) technology to identify the signal of a particular vibration that has been detected by the motion sensor 304. To make the decision, the DSP processing on the signal (or digital representation of the vibration) is impulse-signature sensitive. In a preferred embodiment of the present invention, the digital representation of the vibration determined by the microcontroller 300 is compared with a library of digitized vibration signatures that are previously stored in the microcontroller's memory 316. The microcontroller 300 preferably performs the comparison of the digital vibration representation with the pre-stored vibration signatures in the time domain. Alternatively, however, the comparison can be performed in the frequency domain. In this embodiment, the pre-stored signatures are stored as frequency domain signatures. To perform the comparison, the digital vibration representation is preferably discrete Fourier transformed (DFT) to the frequency domain prior to the comparison. In either case, the microcontroller 300 compares the representations to determine their degree of similarity or identity with the stored signatures. Preferably, the microcontroller 300 selects the pre-stored signature having the highest degree of match with the digital vibration representation to represent the identification of the sensed vibration. Alternatively, if the digital vibration representation fails to meet a predetermined matching threshold, such as 80%, for all of the pre-stored signatures, then the microcontroller 300 does not identify the digital vibration representation.

In another alternative embodiment, rather than comparing the digital vibration representation with all of the digital vibration signatures in the library 316, the microcontroller 300 instead either intelligently selects a subset of signatures for comparison, and/or interrupts the comparison process when the microcontroller 300 identifies a signature meeting the predetermined match threshold. Alternatively, if the microcontroller 300 identifies multiple vibration signatures as meeting the threshold, the microcontroller 300 performs a secondary analysis to narrow the characterization and thereby identify the character of the vibration.

In another alternative embodiment, the microcontroller 300 initially calculates metrics of the digital vibration representation to simplify the characterization of the vibration signal. Metrics are quantifiable attributes associated with the representation to aid in distinguishing between different sources of vibration. A decision space of N dimensions, N being the number of metrics calculated, is preferably formed to aid the identification. A decision algorithm executed by the microcontroller 300 then evaluates the calculated metrics based on their position in the N-dimensional space, thereby identifying the vibration as among other things, a door opening, a door closing, an engine running, a starter motor operating, passengers getting into and out of the vehicle, an external bump or a nudge against the vehicle, or nearby road traffic. By implementing comprehensive signal processing and identification techniques such as those discussed above, the motion sensor 304 provides all of the sensory input required to identify almost any activity that occurs about or around the vehicle. No other sensors or switches are needed in the vehicle to complement the motion sensor output 332 that is already provided to the microcontroller 300.

Figure 5A:
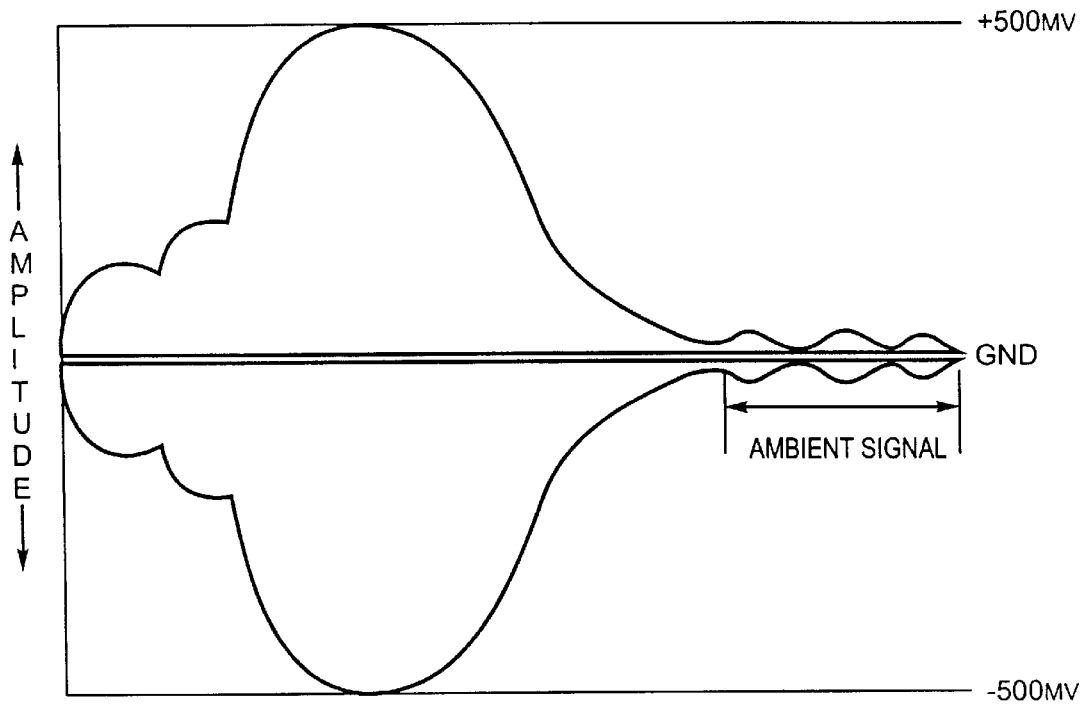
FIG. 5A graphically depicts a typical output signal from a motion sensor in the present invention when a vehicle door is opened.
Figure 5B:
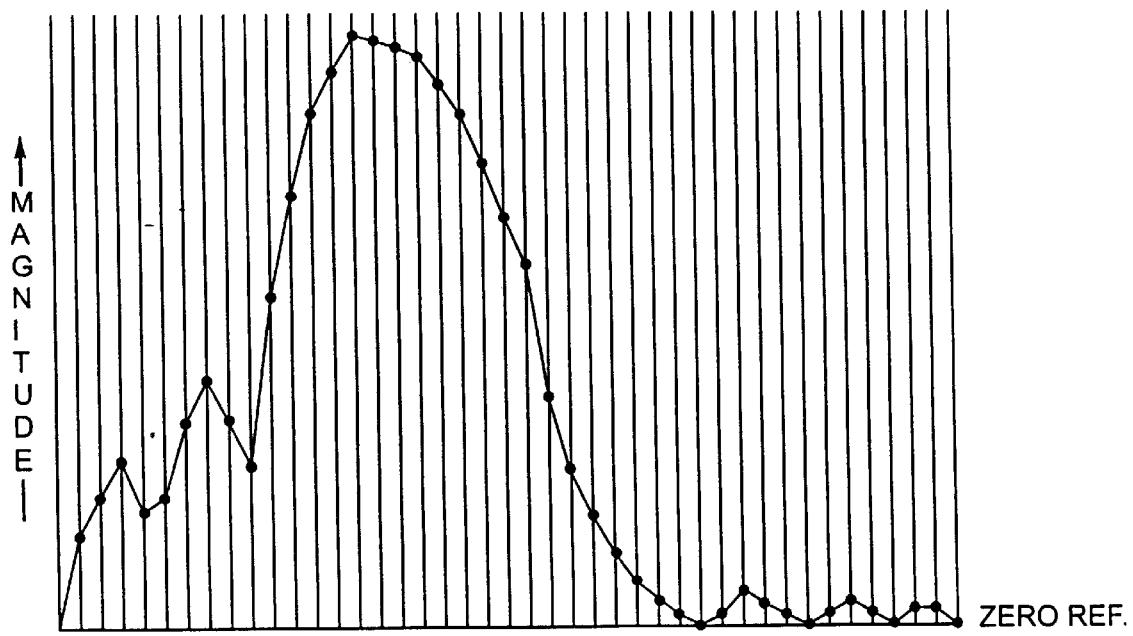
FIG. 5B graphically depicts the output of a "Peak Detection" scheme where the input to the scheme is the motion sensor output signal of FIG. 5A of a vehicle door being opened.

FIGS. 5, 6 and 7 illustrate the process of sampling the vibration induced by a door of a vehicle opening (FIGS. 5A–D), a door of a vehicle closing (FIGS. 6A–D), and a vehicle engine running (FIGS. 7A–D), including converting the sampled motion to a digital composite. The method of conversion to digital composite begins with the input 332 to the microcontroller 300 of the motion sensor output signal shown in FIG. 5A. FIG. 5A is a graphical representation of a motion sensor output signal of a door opening characterized by the relationship between the voltage output from the analog signal conditioner circuit 338 and time. As the signal of the door-opening vibration stimulus fades, an ambient signal for the motion sensor 304 is observed. As seen in FIG. 5A, the motion sensor output signal preferably ranges between +500 mv and −500 millivolts. FIG. 6A is a similar representation, but for a vehicle's door closing. The differences between the two forms of the motion sensor output signal are apparent upon inspection. The metrics referenced above are calculated to highlight the differences in the signals. FIG. 7A depicts a typical motion sensor output signal of a motor vehicle's running engine. The graph shows the high frequency signal of the engine running with a low frequency bias signal caused by the roll and twist of the body of the vehicle.

Figure 6A:
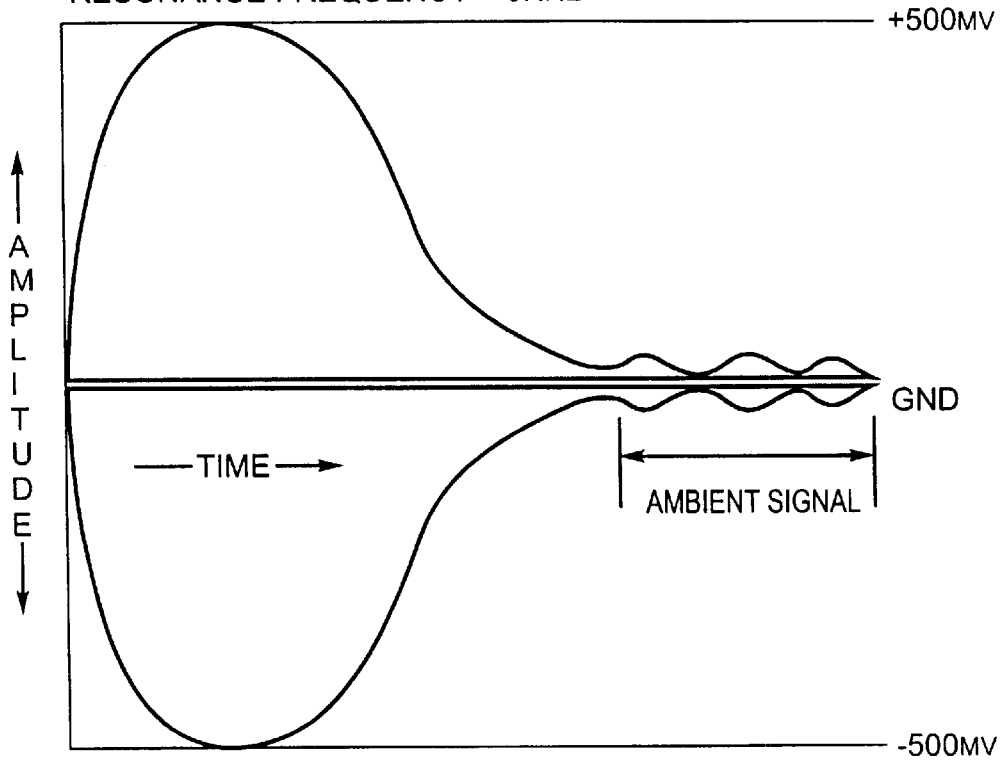
FIG. 6A graphically depicts a typical output signal from a motion sensor in the present invention when a vehicle door is closed.
Figure 6B:
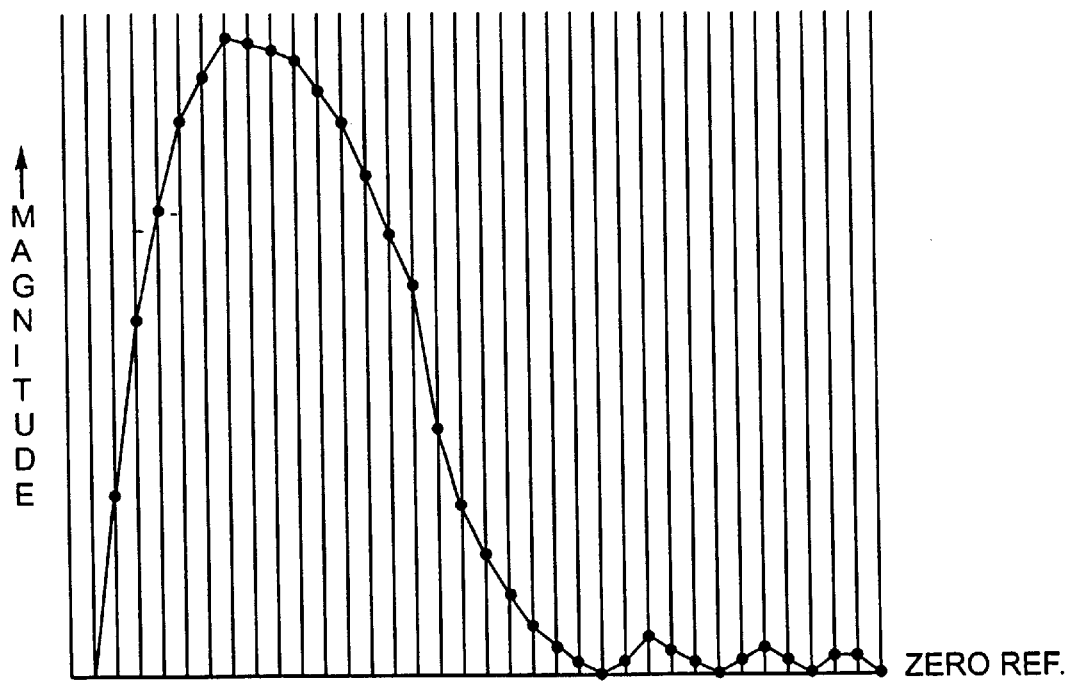
FIG. 6B graphically depicts the output of a "Peak Detection" scheme where the input to the scheme is the motion sensor output signal of FIG. 6A of a vehicle door being closed.
Figure 7A:
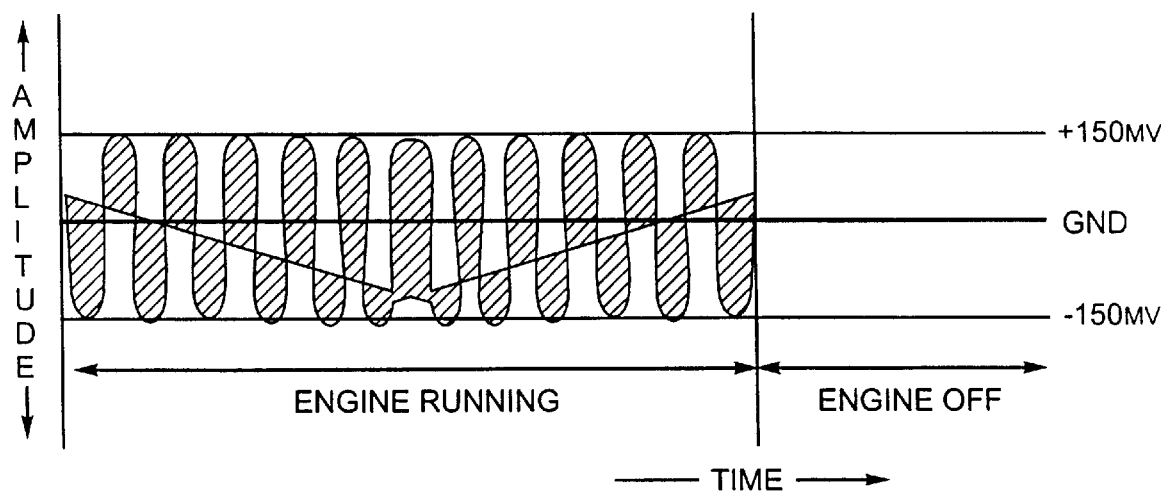
FIG. 7A graphically depicts a typical output signal from a motion sensor in the present invention of a motorized vehicle's running engine.
Figure 7B:
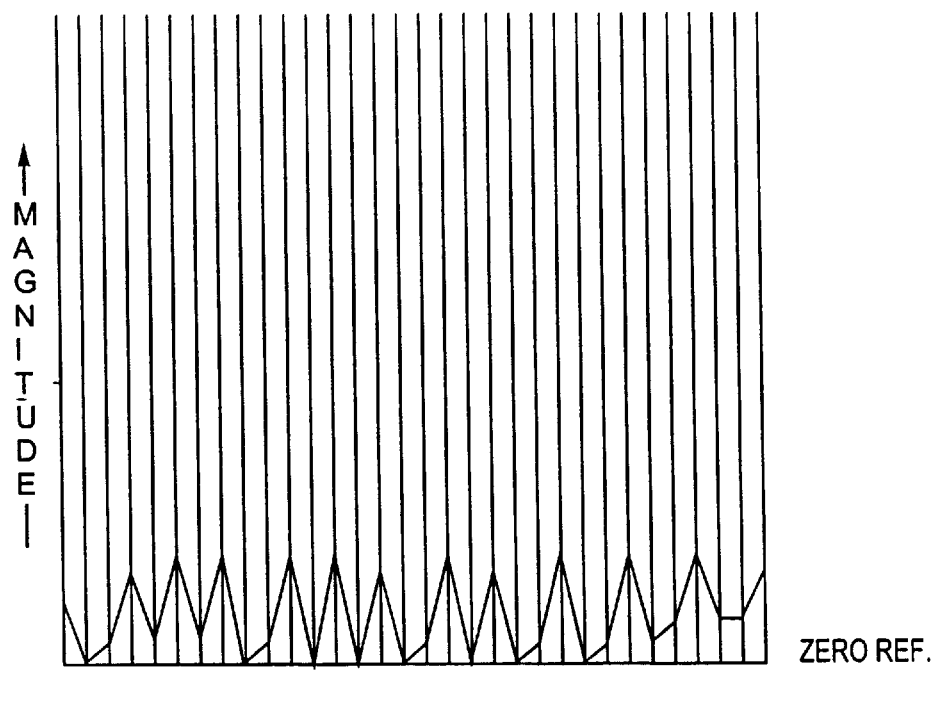
FIG. 7B graphically depicts the output of a "Peak Detection" scheme where the input to the scheme is the motion sensor output signal of FIG. 7A of a motorized vehicle's running engine.

FIG. 5B depicts the output of a "Peak Detection" scheme by means of averaging data that is sampled and acquired over a period of one millisecond. The graph of FIG. 5B is of the magnitude of the signal against time, with a "zero magnitude" being a reference to ground. The sampling of the door-opening signal by the A/D converter of the microcontroller 300 is performed at a sampling rate of equal to or greater than four times the resonance frequency of the motion sensor 304 (equal to if or greater than 20 KHz). FIG. 6B is also a representation of the "Peak Detection" scheme, but for a vehicle's door closing. FIG. 7B illustrates the output of the "Peak Detection" scheme for a vehicle's door closing. Due to an averaging function in the scheme, the low frequency bias signal caused by the roll and twist of the vehicle's body has been filtered out.

Figure 6C:
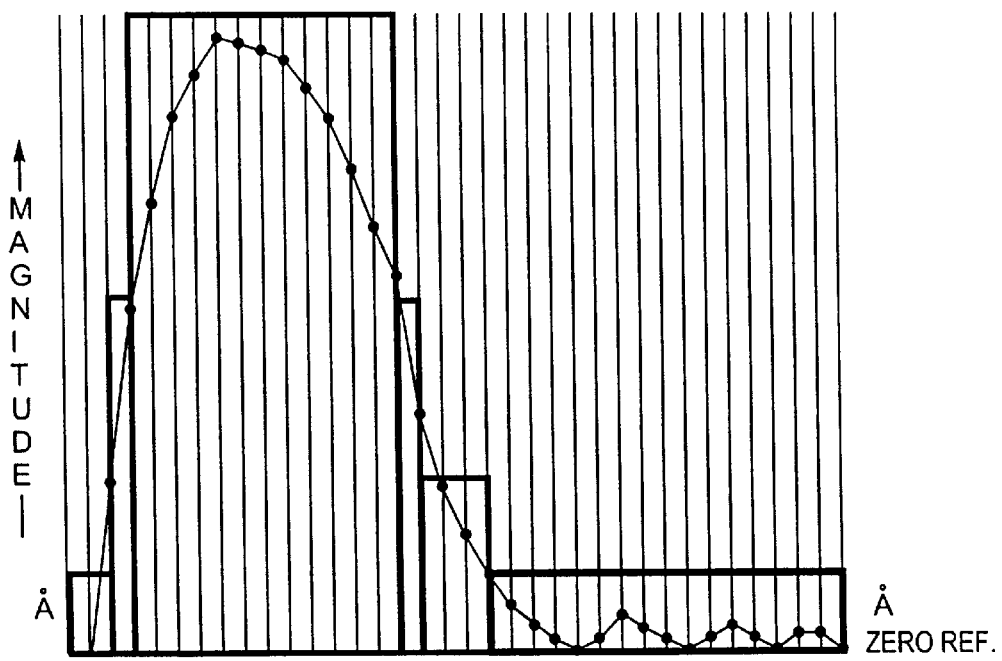
FIG. 6C graphically depicts a digital composite construction of the motion sensor output signal of FIG. 6A of a vehicle door being closed.
Figure 7C:
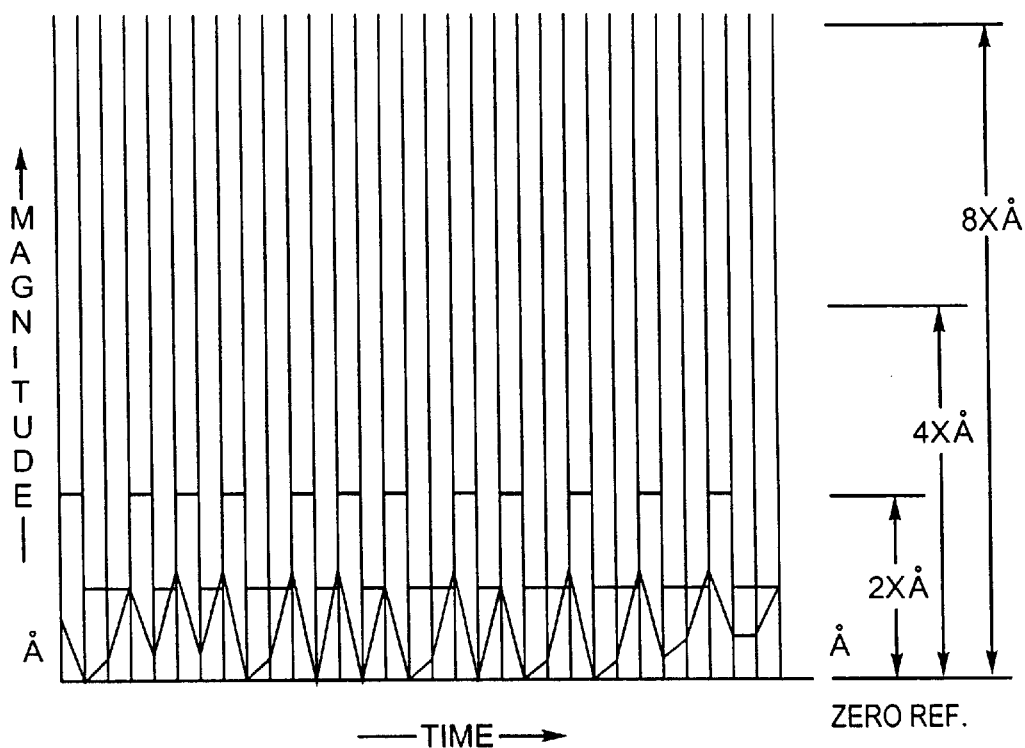
FIG. 7C graphically depicts a digital composite construction of the motion sensor output signal of FIG. 7A of a running engine of a motorized vehicle.

FIG. 5C depicts a digital composite construction of the vibration signal of a door-opening. The graph shows the "ambient zone" which is established adequately above any ambient noise and spurious events that can contaminate the signal. The magnitude of the ambient zone provides the means for normalizing the magnitude of the received motion sensor output signal. By using the magnitude of the ambient zone to characterize the received vibration signal, the subsequent processing of the vibration signal is preferably made independent of the fluctuations in the ambient signal level with time. The magnitudes of the detected signal with time are relative to the "ambient zone," and not to the absolute amplitude of the motion sensor output signal. Thus, the diagram illustrates a zone where the digital signal is two times the magnitude of the "ambient zone," a zone where the digital signal is four times the magnitude of the "ambient zone," and finally, a zone where the digital signal is eight times the magnitude of the "ambient zone." In a preferred embodiment of the present invention, the digital vibration signal is constructed by characterizing the averaged peaks of the digitized motion sensor output signal as a multiple of the ambient signal level. This method eliminates the requirement of sensitivity matching from one motion sensor to another and is robust even given variations in the physical couplings of motion sensors to different vehicles. FIG. 6C depicts a digital composite for the vehicle's door closing. Similarly, FIG. 7C depicts a digital composite for an active engine.

Figure 6D:
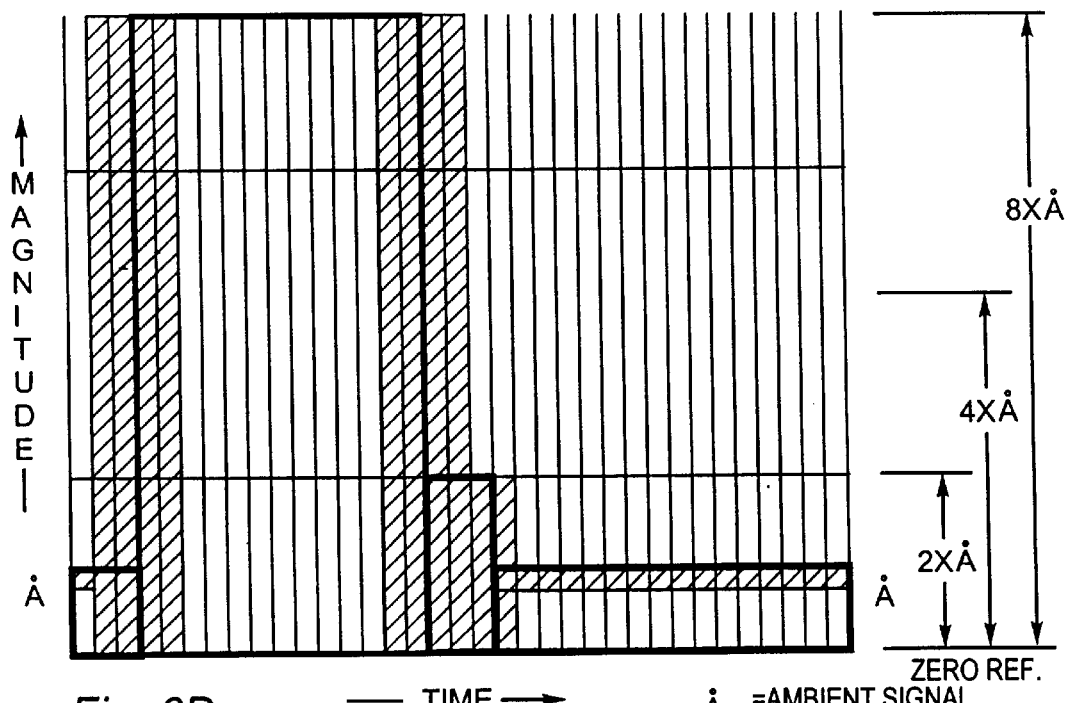
FIG. 6D graphically depicts a digital model of a typical vibration signature for a door closing, as stored in the electronic memory of an integrated vehicle safety and security system according to a preferred embodiment of the present invention. The diagram shows the tolerance-margins for the digital model in gray.
Figure 7D:
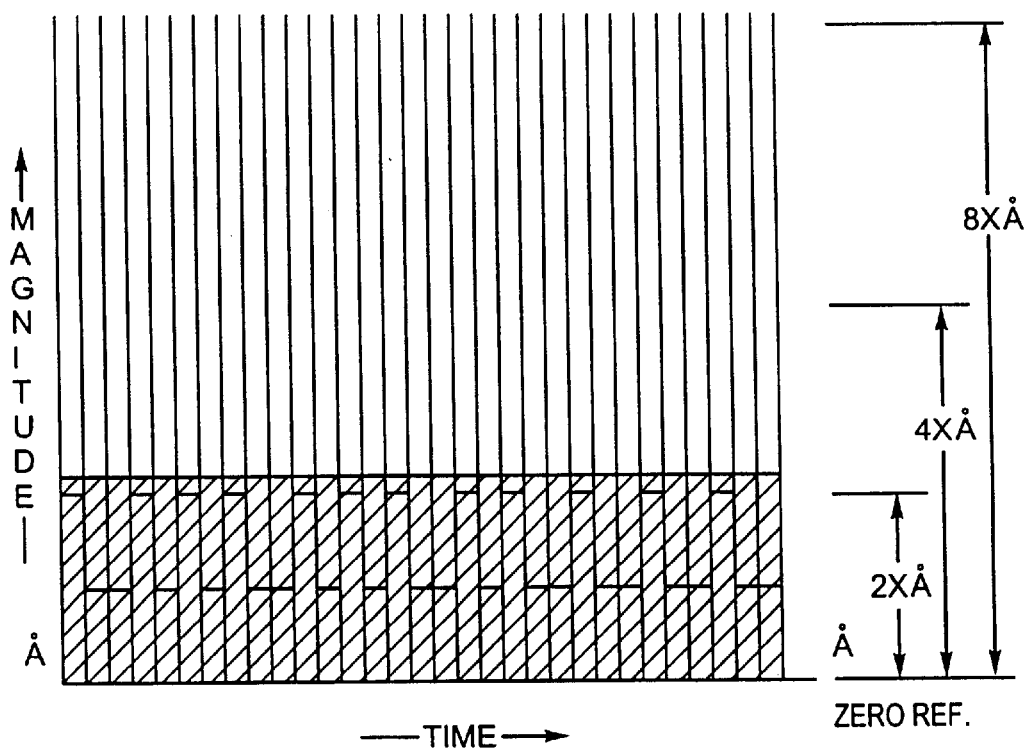
FIG. 7D graphically depicts a digital model of a typical vibration signature for a running engine of a motorized vehicle, as stored in an electronic memory of an integrated vehicle safety and security system according to a preferred embodiment of the present invention. The diagram shows the tolerance-margins for the digital model in gray.

In FIG. 5D, a model of a vibration signature of door closing is illustrated in solid black lines. The signature is stored in the microcontroller's memory 316 for comparison with digitized vibration representations. The diagram also shows the digital vibration signature's tolerance margins in gray. Preferably as discussed above, many other vibration signatures are also stored in the memory 316 of the microcontroller 300 in the form of a signature library. Other examples of digital signatures with tolerance margins are shown in FIGS. 6D and 7D. FIG. 6D represents a stored digital vibration signature for a door closing. FIG. 7D represents a stored digital vibration signature for an active engine.

Once the microcontroller 300 produces an identification of the motion sensor output signal, for example, that a vibration representation matches the door-opening vibration signature, the microcontroller 300 preferably may seek a confirmation of the identification from an analysis of the electrical activity output signal from the electrical activity sensor 302. Alternatively, an identification based on motion sensor input 332 may be sought to confirm an identification based on the electrical activity output signal. To perform signal identification from an electrical activity output signal, the same DSP processing applied to the motion sensor output signal is applied. The electrical activity sensor 302 first processes the electrical activity that it detects on the direct current power transmission circuit 102 and then transmits an electrical activity output signal functionally related to the detected electrical activity to the microcontroller 300. The microcontroller 300 then processes the electrical activity output signal in a manner similar to that for the motion sensor output signal. Specifically, the microcontroller 300 compares the processed signal with a library of electrical activity signatures. Preferably, the microcontroller 300, in combination with the electrical activity sensor 302, distinguishes between the electrical activities of spark plugs, alternator, air conditioner compressor, radiator fan, windshield wipers and any other electrically-powered accessories in the vehicle. Preferably, if one sensor output signal identification is confirmed from the processing of the other sensor output signal, the confidence in the identification is enhanced. However, for most of the functions of the VSS 100, such a confirmation may not be necessarily sought or required by the microcontroller 300. Reliance on one sensor or the other, depending on the stimulus detected, will be sufficient to enable to microcontroller 300 to proceed with a subsequent control function, if appropriate.

Figure 8:
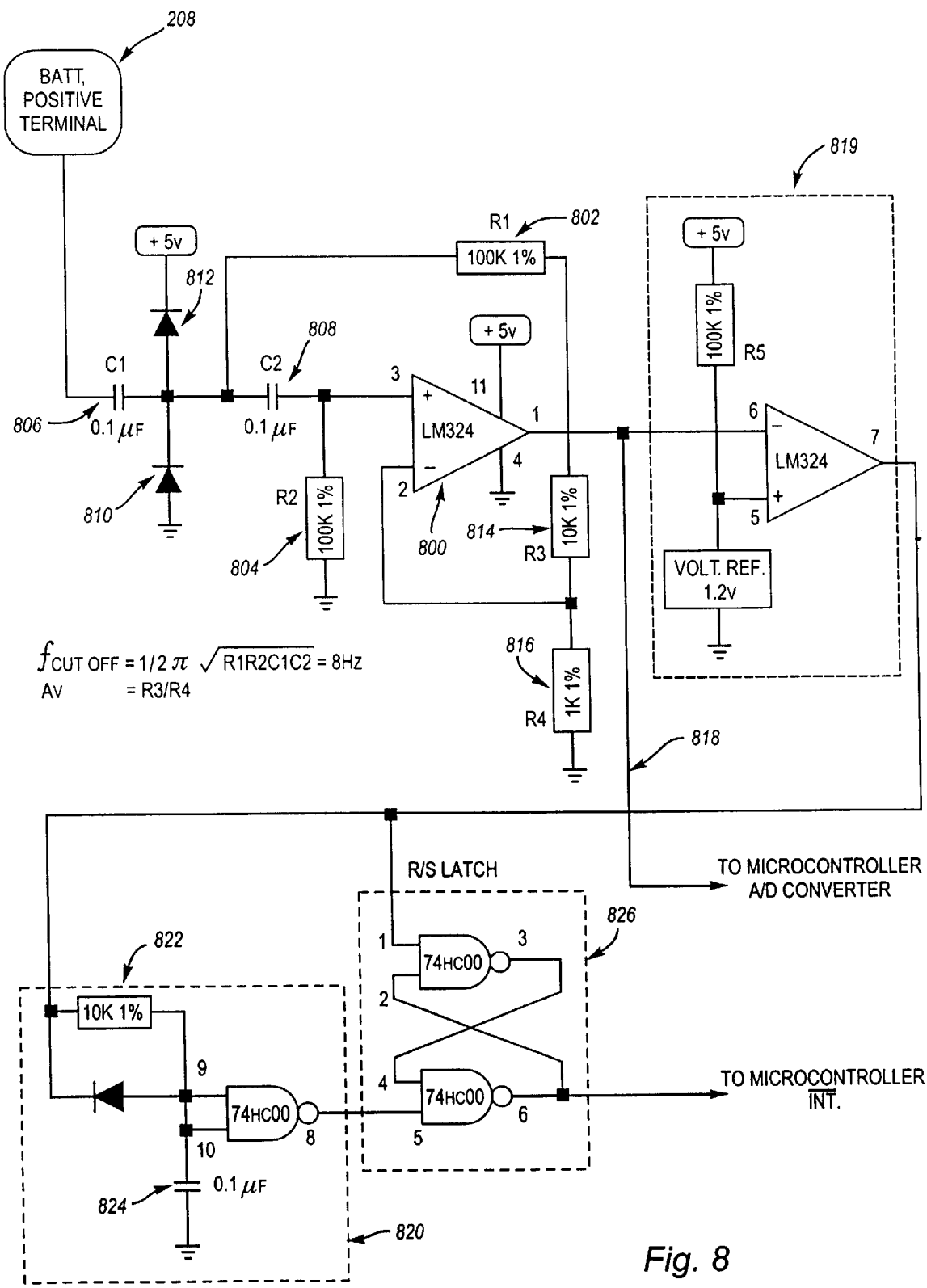
FIG. 8 is a circuit schematic of an electrical activity sensor according to a preferred embodiment of the present invention for detecting and processing the AC electrical activity induced on the power transmission circuit of a vehicle.

A preferred embodiment for the electrical activity sensor 302 generally described in connection with the system block diagram of FIG. 3 is shown in the circuit schematic diagram of FIG. 8. FIG. 8 depicts the aspect of the electrical activity sensor 302 for detecting the AC component of the electrical activity on the power transmission circuit 102. On the sensor's input side 328, the electrical activity sensor 302 has a connection from the battery's positive terminal 208 to enable the detection of the AC electrical activity on the power transmission circuit 102. The configuration of the operational amplifier 800, resistors 802, 804, 814, 816, capacitors 806, 808 and diodes 810, 812 shown in FIG. 8 implements a low-pass-type filter with a frequency cutoff of approximately 8 Hz and a closed-loop gain $A_v$ equal to R3/R4, or to about ten as is shown in FIG. 8 for the resistor values specified. Such low-pass filter implementations are well-known in the art of filter design using electronic circuit components. The output of the low-pass filter 818 is transmitted to both the A/D converter 310 of the microcontroller 300 and to a further amplification/processing step 819 within the circuit itself. The electronic signal is then fed into a delay network 820 that delays the disappearance of an electrical activity signal by a time constant whose value depends on the values for a resistor 822 and a capacitor 824. The output of the delay network 820 is input to an R/S latch 826 that also receives as input the delay network's input signal. The R/S latch 826 and delay network 820 together operate to apply the time constant on the output response of the circuit 302 when an active signal goes to zero, but not apply a response delay when electrical activity is initially sensed. The output of the R/S latch 826 is input to an interrupt-enable input port 324 of the microcontroller 300. The purpose of the application of the time constant as the electrical noise disappears is to account for residual electrical activity in the power transmission circuit 102.

FIG. 9A graphically depicts the AC voltage on the direct current power transmission circuit 102 before and after the vehicle's engine has been turned off. FIG. 9A depicts the presence of electrical noise induced on the power transmission circuit 102 by other electrical systems operating while the engine is active. The electrical noise induced on the power transmission circuit 102 disappears as the engine is turned off. The graph of FIG. 9A represents a typical form for the input signal to the electrical activity sensor 302 before and after an engine is turned off. FIG. 9B depicts the output response of the electrical activity sensor 302 to electrical activity imposed on the power transmission circuit 102, again, before and after the engine has been turned off. Electrical activity is indicated on the electrical activity sensor output for one time constant beyond the instant that the vehicle's engine is turned off. The response to the electrical activity on the power transmission circuit 102 when the engine is active is preferably a constant five-volts. After a time constant beyond engine turn-off, assuming there is no further electrical activity, the response is a constant zero volts, referenced to the ground 348 of the vehicle's chassis. Thus, the electrical activity sensor 302 enables the microcontroller 300 to clearly distinguish between an operating vehicle and a non-operating, electrically-quiet vehicle.

Figures 10A, 10B:
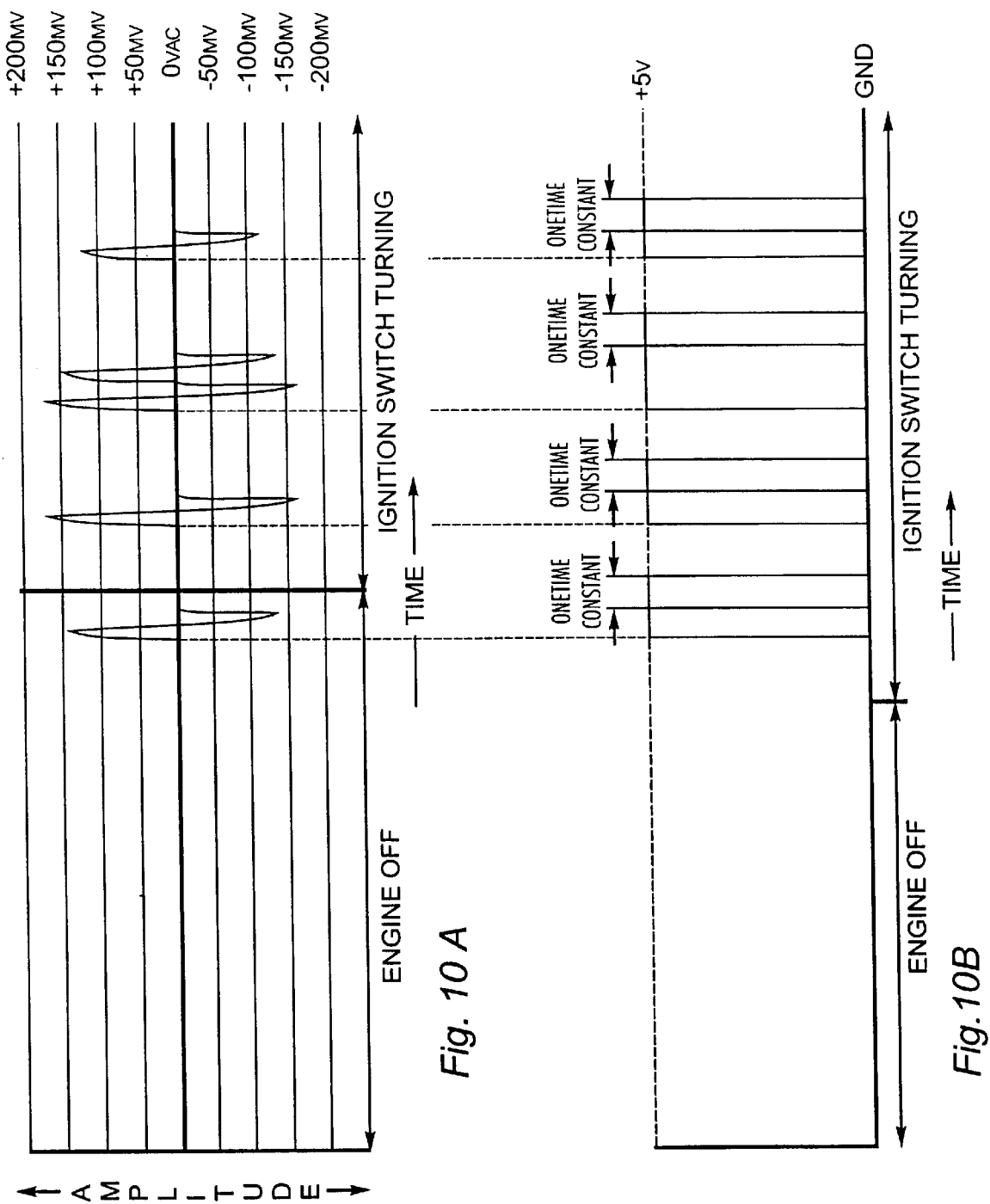
FIG. 10A graphically depicts typical electrical activity induced on a vehicle's power transmission circuit caused by turning an engine ignition switch in the vehicle.
FIG. 10B graphically depicts an output signal from the electrical activity sensor of FIG. 8 where the input to the electrical activity sensor is the electrical activity induced on the power transmission circuit caused by turning on the ignition switch as shown in FIG. 10A.

FIG. 10A graphically depicts the AC electrical activity on the power transmission circuit 102 as a vehicle's ignition switch is set in motion. The sharp amplitude spikes in the induced electrical activity indicate that several relays like fuel pump, ignition and front panel power have been activated. In FIG. 10B, the electrical activity sensor output signal is graphically represented where the input is the electrical activity shown in FIG. 10A. As in FIG. 10A, the response when the engine is inactive is shown. As the ignition switch is turned and set in motion, the electrical activity for the activated relays are represented as square pulses with widths of one time constant greater than their responses on the power transmission circuit 102.

Figures 11A, 11B:
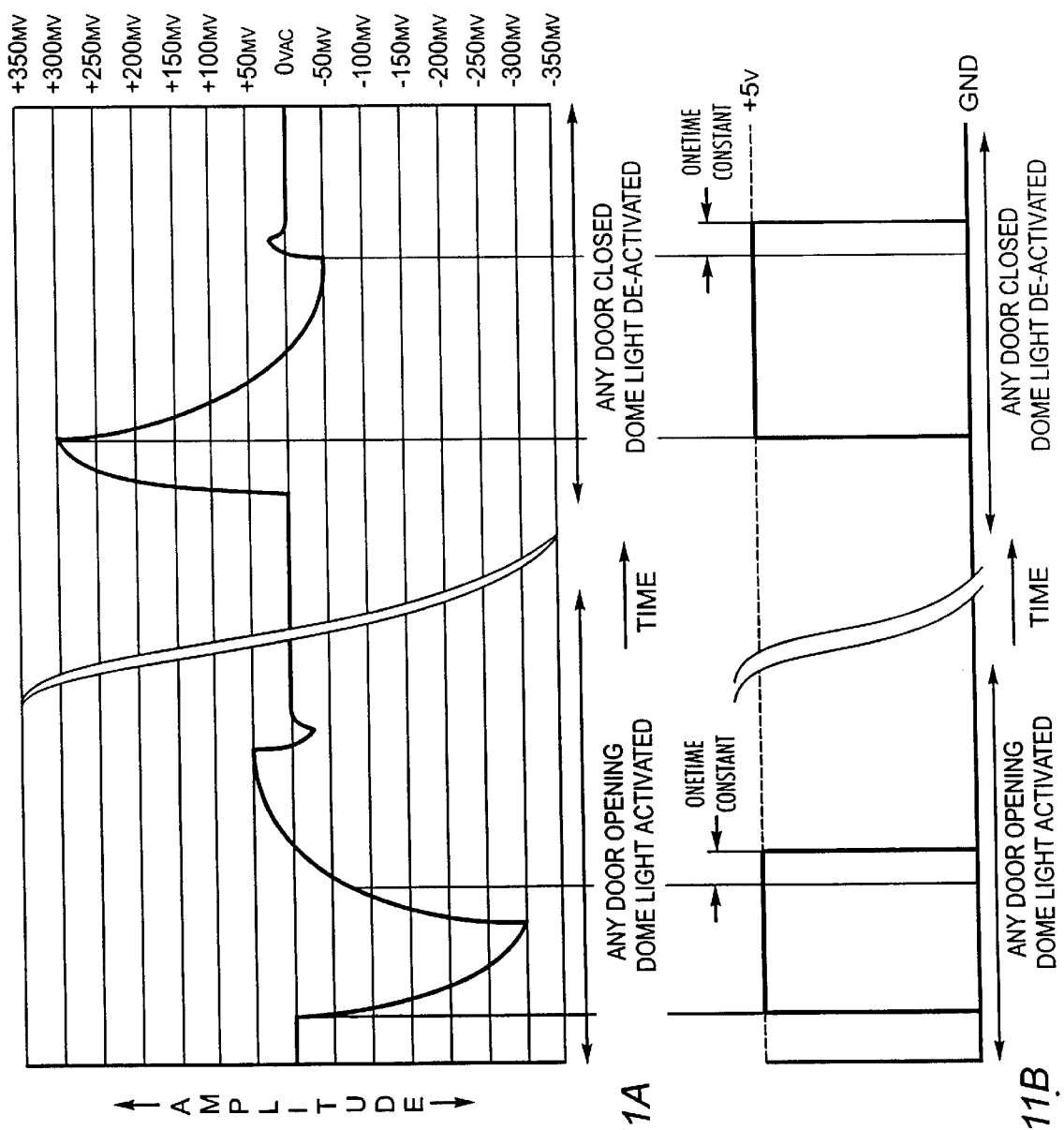
FIG. 11A graphically depicts typical electrical activity induced on a vehicle's power transmission circuit caused by opening and closing a door of a vehicle.
FIG. 11B graphically depicts an output signal from the AC electrical activity sensor of FIG. 8 where the input to the electrical activity sensor is the electrical activity induced on the power transmission circuit by opening and closing the door of a vehicle, as shown in FIG. 11A.

FIG. 11A graphically depicts the AC electrical activity induced on the power transmission circuit 102, in voltage amplitude versus time, when opening and then closing a door of a vehicle. The AC electrical activity depicted is caused by the dome light(s) switching on and off. These electrical activity signatures are known in the art. FIG. 11B graphically depicts the response of the electrical activity sensor 302 to the electrical activity shown in FIG. 11A. The result is the effect of a low-pass filter with the addition of one time constant to the response after the electrical activity has disappeared.

FIG. 12 is a circuit schematic diagram for a preferred embodiment of the high current MOSFET switch 356 and the constant current source 342 referenced above. The design of the constant current source 342 with a power switching means is known in the art. FIG. 12 shows the connections between the switch 356, the constant current source 342 and the microcontroller 300. The constant current source 342, preferably implemented using an LM327 Negative Voltage Regulator 1200 (−4 Volts, 100 milliamps), is maintained using a 2N2222-type transistor 1202. The transistor 1202 receives at its base a constant current source control signal via the connection 358 from the microcontroller 300 labeled "8V Control" coupled via a 1KΩ resistor 1204. This control signal enables and disables the constant current source 342. The emitter of the transistor 1202 is connected to ground 1206. The transistor's collector is connected to the input pin of the LM327 regulator 1200 and to a 12-volt power supply 1208, Vcc, through a 5KΩ resistor 1210. The 12-volt power supplies 1208, 1212, 1214 in the circuit are preferably connections to the vehicle battery's positive terminal connector 344 after being passed through suppression circuitry (not shown) to protect the circuit of FIG. 12. The 12-volt supply 1208 also connects to the ground pin of the regulator 1200 through a resistor 1216 and to the regulator's output pin through resistors 1216, 1218. The output of the regulator 1200 is also connected to the chassis cable connector 346.

The connection 1220 from the regulator 1200 to the second analog input 326 of the microcontroller 300 is the DC component aspect of the electrical activity sensor 302. This connection 1220 effectively provides the microcontroller 300 with the DC component of the electrical activity on the direct current power transmission circuit 102. In FIGS. 3 and 10, this DC component signal is called "8V Sense." The signal is so-called because of a preference in this embodiment for the constant current source 342 to have an ambient condition voltage of about eight volts on the power transmission circuit 102 when the battery 104 is disconnected and the constant current source 342 solely supplies power to the power transmission circuit 102. With an ambient condition voltage of about eight volts, the constant current source 342 provides sufficient power to the power transmission circuit 102 to maintain the memories of any electronic accessories electrically interposed in the power transmission circuit 102. The minimum voltages required to maintain such memories are normally significantly less than the eight volts provided by the constant current source 342 under ambient conditions. Finally, a five-volt guard 1222 comprising a five-volt supply, 100KΩ resistor and diode is interposed as a guard between the circuit and the second analog input 326 to the microcontroller's A/D converter 310.

The microcontroller 300, via the electrical connection 358 from the second of the microcontroller's digital outputs 360, also transmits MOSFET switch-opening and closing control signals to disconnect and reconnect the battery 104 on the power transmission circuit 102. As with the input to the negative voltage regulator 1200, the MOSFET 1224 is preceded by a 2N2222 transistor 1226, where Vcc for the transistor 1226 is again 12 volts, the emitter terminal goes to ground 1228, and the base of the transistor 1226 is connected to the microcontroller 300 via a 1KΩ resistor 1230. The MOSFET's source terminal is connected to the negative terminal 202 of the vehicle battery 104 and the drain is connected to the chassis cable connector 346. Protecting the MOSFET 1224 is an 18-volt zener diode 1232. The MOSFET 1224 returns a thermal sense signal, the signal connection 1236 coming from the surface of the MOSFET 1224 as discussed above in reference to FIG. 3. A five-volt power supply 1238 is used to drive the thermal sense signal.

With the essential components of the VSS 100 presented, the practical functions that a preferred embodiment of the VSS 100 performs are presently described. First, the VSS 100 operates as an accident safety system. The accident safety system disconnects a vehicle's battery 104 from the power transmission circuit 102 within a fraction of a second after the vehicle is involved in a forceful collision. The purpose of the disconnection is to minimize the probability of fires caused by short circuits in the power transmission circuit 102. While systems for disconnecting a vehicle battery 104 after a collision are known in the art, the VSS 100 incorporates this system without additional components or wiring. The accident safety system preferably performs the battery-disconnect function when the microcontroller 300 receives a motion sensor output signal containing the vibration signature of a collision involving the vehicle. Preferably, if the output signal matches a pre-stored signature of a forceful collision to a preset degree, the microcontroller 300 transmits a battery-disabling signal to the switch 356. In another preferred embodiment, the microcontroller 300 analyzes the electrical activity output signal to determine if the signal comports with the motion sensor-based determination that a serious collision has occurred. In both embodiments, the microcontroller 300 performs the analysis and transmits the battery-disabling signal, if necessary, preferably in less than 100 milliseconds.

FIGS. 12A–D are flow diagrams for a preferred embodiment the present invention for a telemetry and control code transmission scheme for transmitting signals to a multitude of electronic accessories or modules interposed in a vehicle's direct current power transmission circuit 102. Thus, the transmission scheme is performed without adding any new wiring to the vehicle.

The transmission scheme is controlled by the microcontroller 300, which encodes data in a data signal on the power transmission circuit 102 by transmitting sequences of battery-enabling and battery-disabling signals to the switch 356. In doing so, square pulses of voltage are produced on the power transmission circuit 102. The time between enabling and disabling signals preferably represents the data being transmitted. Thus, the content of the data determines the widths of the square pulses.

Preferably, the eight-volt constant current source 342 is enabled such that the square pulses of voltage on the power transmission circuit 102 alternate between the constant current source ambient condition voltage and the battery voltage, rather than ground and the battery voltage. Thus, the telemetry and control transmission scheme is preferably performed when the engine and other loads on the power transmission circuit 102 are inactive. Eight volts provides a safe margin for the electronic accessory memory retention, while still providing a telemetry signal dynamic range of four to five volts, compared to the 10 to 20 millivolts provided by the prior art of superimposing frequency modulation of the voltage on the power transmission circuit 102. This difference translates into a significantly enhanced signal-to-noise ratio in the signal transmission. The improved signal-to-noise ratio minimizes the data transmission error rate and corresponding need for error detection and correction.

Figures 13A, 13B:
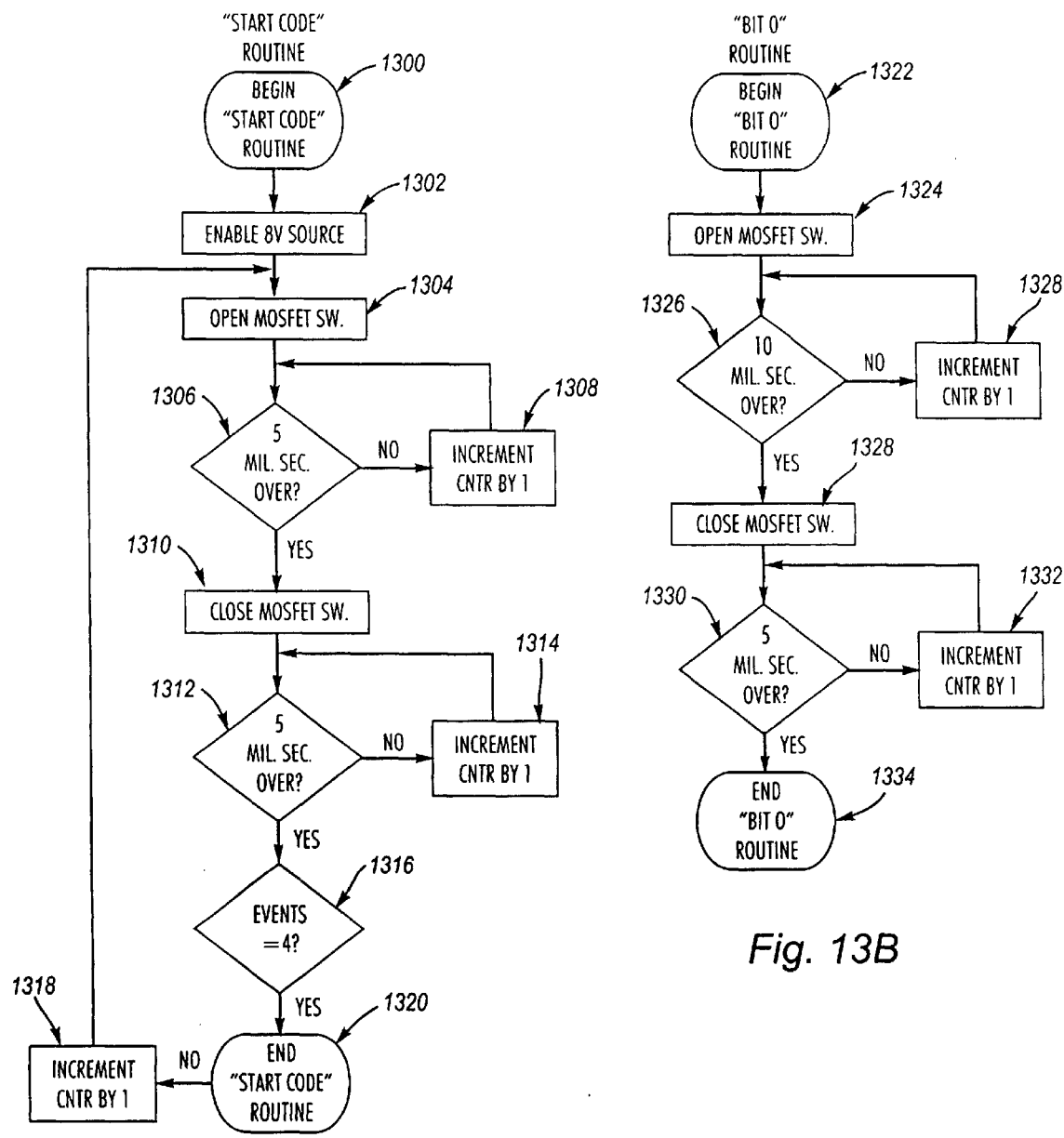
FIG. 13A is a flow diagram of a Start/Stop Routine in a telemetry and control signal transmission scheme according to a preferred embodiment of the present invention using the DC power transmission circuit of a vehicle.
FIG. 13B is a flow diagram of a Bit "0" Routine in a telemetry and control signal transmission scheme according to a preferred embodiment of the present invention using the DC power transmission circuit of a vehicle.
Figure 13C:
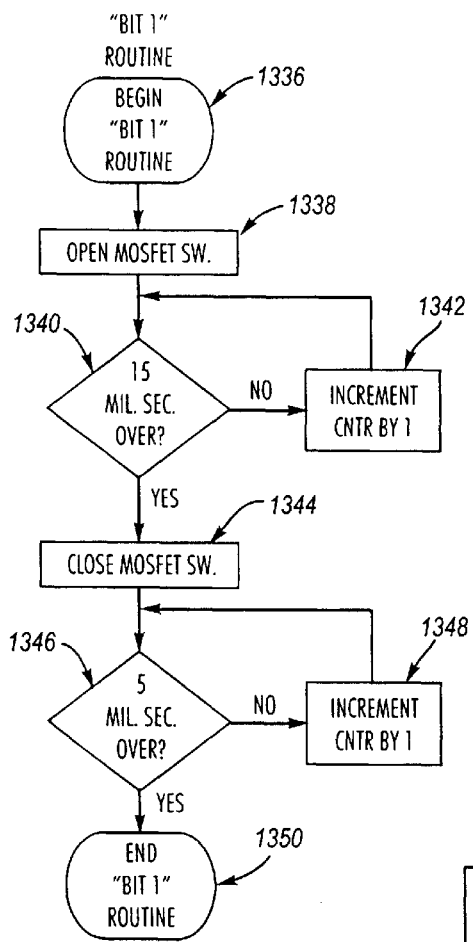
FIG. 13C is a flow diagram of a Bit "1" Routine in a telemetry and control signal transmission scheme according to a preferred embodiment of the present invention using the DC power transmission circuit of a vehicle.

In a preferred embodiment, the microcontroller 300 runs several data transmission routines that reflect different data elements. For example, FIG. 13A is a Start/Stop routine for signaling the beginning and end of data transmission in the telemetry and control signal. Thus, the Start/Stop routine specifically transmits data start and data end codes. The Start/Stop routine preferably begins by initializing the Start/Stop routine 1300 and enabling the eight-volt constant current source 1302. If, at the time the constant current source 342 is enabled, an active load on the power transmission circuit 102 causes the voltage on the circuit 102 to deviate from the constant current source's ambient condition voltage, then the load is preferably deactivated before the telemetry transmission scheme is permitted to proceed. Deactivating a load using an intelligent module interposed on the power transmission circuit 102 is discussed in connection with FIG. 16E.

In the next step, the MOSFET switch 356 is opened 1304 and a five-millisecond timer is started 1306. Thus, the voltage level on the power transmission circuit 102 to the accessories and modules on the power transmission circuit 102 will preferably be low that is, at the constant current source voltage, for five-milliseconds. The routine cycles back to poll the timer 1308 until five milliseconds transpires. At the end of five-milliseconds, the MOSFET switch 356 is closed 1310. At this point, the voltage on the power transmission circuit 102 is high, that is, at the vehicle's battery voltage. A five millisecond timer is again initiated 1312. Again, the routine cycles back to poll the timer 1314 until five milliseconds transpires. At the expiration of five milliseconds, an event counter is polled 1316, and if its value is less than four, the counter is incremented by one 1318 and the routine returns to the switch opening step 1304. The process of opening and closing the MOSFET switch in five-millisecond increments is repeated until the value in the event counter equals four. At that point, the microcontroller 300 exits the Start/Stop routine 1320.

Bits of data to the various accessories are thereby communicated with square pulses varying from the battery voltage of between about 12 volts and about 13.2 volts to the constant current source voltage of preferably about eight volts and then switching back to the battery voltage. For purposes of the telemetry code transmission scheme, while the constant current source voltage is preferably about eight volts under ambient conditions, this voltage can be as low as 1.5 volts (corresponding to the minimum voltage anticipated to maintain an electronic memory in any electronic accessories interposed in the direct current power transmission circuit 102), and as high as about 16 volts, the maximum voltage normally permitted on the power transmission circuit 102 by the suppression circuitry incorporated in the electrical systems of most vehicles. However, to perform effective telemetry code transmission, the ambient condition voltage for the constant current source 342 preferably should be separated from the battery's voltage by at least about 0.5 volts to preserve the dynamic range of the signal.

Thus, to represent a bit with a zero value, the square pulse goes low for about ten milliseconds. FIG. 13B depicts the Bit "0" routine. With the switch 356 to the vehicle battery 104 initially in a closed state, the routine is first initialized 1322 and then proceeds with the opening 1324 of the MOSFET switch 356. The routine polls a counter to check whether ten preferably milliseconds has expired 1326. If not, the counter is incremented until ten milliseconds elapses. After the ten milliseconds, the MOSFET switch 356 is closed 1328. The Bit "0" routine is exited 1334 after the now-closed switch 356 has remained closed for five-milliseconds 1330, 1332.

Similarly, the Bit "1" routine is first initialized 1336 and then proceeds with the opening of the MOSFET switch 1338. However, in the next step, the MOSFET switch 356 is opened for 15 milliseconds 1340, 1342 instead of ten milliseconds. Thereafter, the routine is the same as the Bit "0" routine. The MOSFET switch 356 is closed 1344, remains so for five milliseconds 1346, 1348, and then the routine exits 1350. Thus, the communication of Bit "0" versus Bit "1" is preferably distinguished by a five-millisecond pulse width difference between them.

Figure 13D:
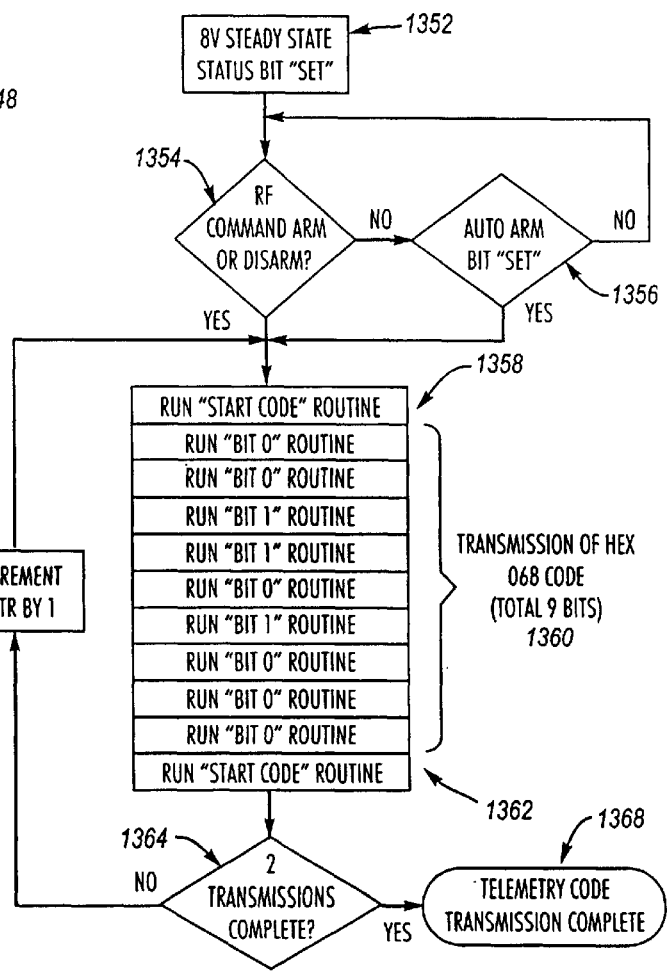
FIG. 13D is a flow diagram of a scheme for transmitting a telemetry code over the power transmission circuit of a vehicle according to a preferred embodiment of the present invention.

FIG. 13D shows a telemetry and control signal transmission scheme for transmitting data over the power transmission circuit 102. In FIG. 13D, a specific code value is transmitted over the direct current power transmission circuit 102, preferably with the purpose of transmitting a control command to a receiving module interposed in the circuit 102. As an example, the control command in the figure communicates that the VSS 100 is armed or disarmed. Consequently, a telemetry signal encoding the command is transmitted to a remote module to perform a specific operation on an electronic accessory in the vehicle. The remote module or receiver receives and decodes the signal into the data. The example code to represent the control command is hex 068, represented as 9 bits of data.

In the preferred embodiment of the telemetry and control transmission scheme, to perform the communication, the eight-volt constant current source 342 is first enabled. A status bit, called 8V Steady State Status Bit, is then set 1352 when a steady eight volts is observed to be provided to the power transmission circuit 102 when the battery 104 is disconnected. To initiate the transmission of the code on the power transmission circuit 102, the RF command from the user's RF transmitter 108 to arm or disarm must be received 1354. Alternatively, a bit in a system state register in the microcontroller 300 must be set to indicate that the VSS 100 has otherwise been armed or disarmed 1356. For example, the arming of the VSS 100 could be set to occur once the engine has been turned off and two minutes have passed. The microcontroller 300, as one of its functions, continues to poll register bits indicating the system state of the VSS 100 until a switch in one of the bits is observed. If one of the bits is switched, indicating a change of the state of the VSS 100 to armed or to disarmed, the transmission scheme for sending the data proceeds. The Start/Stop routine is first run 1358 followed by a string of Bit "0" and Bit "1" routines in a binary sequence 1360 to represent hex 068. Once the sequence of routines has been executed, the Start/Stop routine is rerun 1362 to indicate that data transmission has completed. Preferably, as an error checking measure, the complete transmission scheme including the Start/Stop routine and the bit transmission, is repeated 1364, 1366. Once repeated, the telemetry code transmission process is exited 1368. Alternatively, other error checking measures as are known in the art can be incorporated into the telemetry and control signal transmission scheme.

Figure 13E:
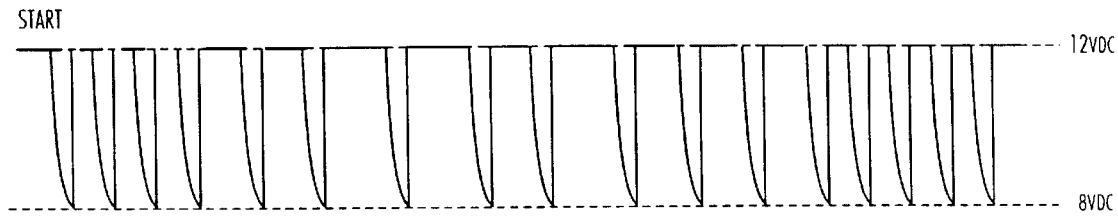
FIG. 13E depicts a telemetry and control signal timing diagram for the transmission scheme of FIG. 13D.
Figure 13F:
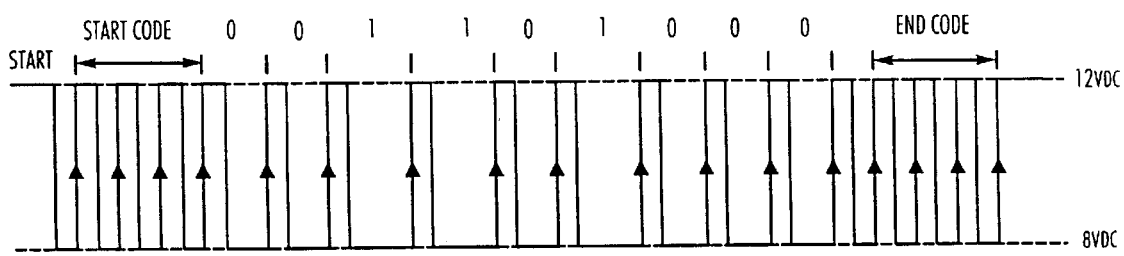
FIG. 13F depicts the output of a Schmitt Trigger where the input is the waveform of FIG. 13E.

FIG. 13E depicts the telemetry code timing diagram for the transmission scheme of FIG. 13D. The voltage on the power transmission circuit 102 is modulated between the nominally 12 volts DC of the battery 104 and the eight volts DC of the constant current source 342. The falling edge of the pulses, as shown, are not normally sharp because of switching limitations in the time constant associated with the voltage drop that is inherent in the power transmission circuitry 102. In FIG. 13F, the telemetry signal of FIG. 13E has been passed through a Schmitt Trigger (not shown) that amplifies the change in voltage and thereby cleans or straightens the edges of the telemetry code signal. The output of the Schmitt trigger, as it is processed by the receiver module, is a considerably sharper telemetry signal. That is, the voltage modulation between 12 volts DC and eight volts DC becomes almost instantaneous. Because the rising edge of the timing signal is normally sharper than the falling edge, the period measurement for extracting the data in the signal is preferably measured from rising edge to rising edge, that is, from switch-closing to switch-closing. The Schmitt trigger is preferably incorporated into the receiver circuitry for the telemetry and control data communication.

Figure 14A:
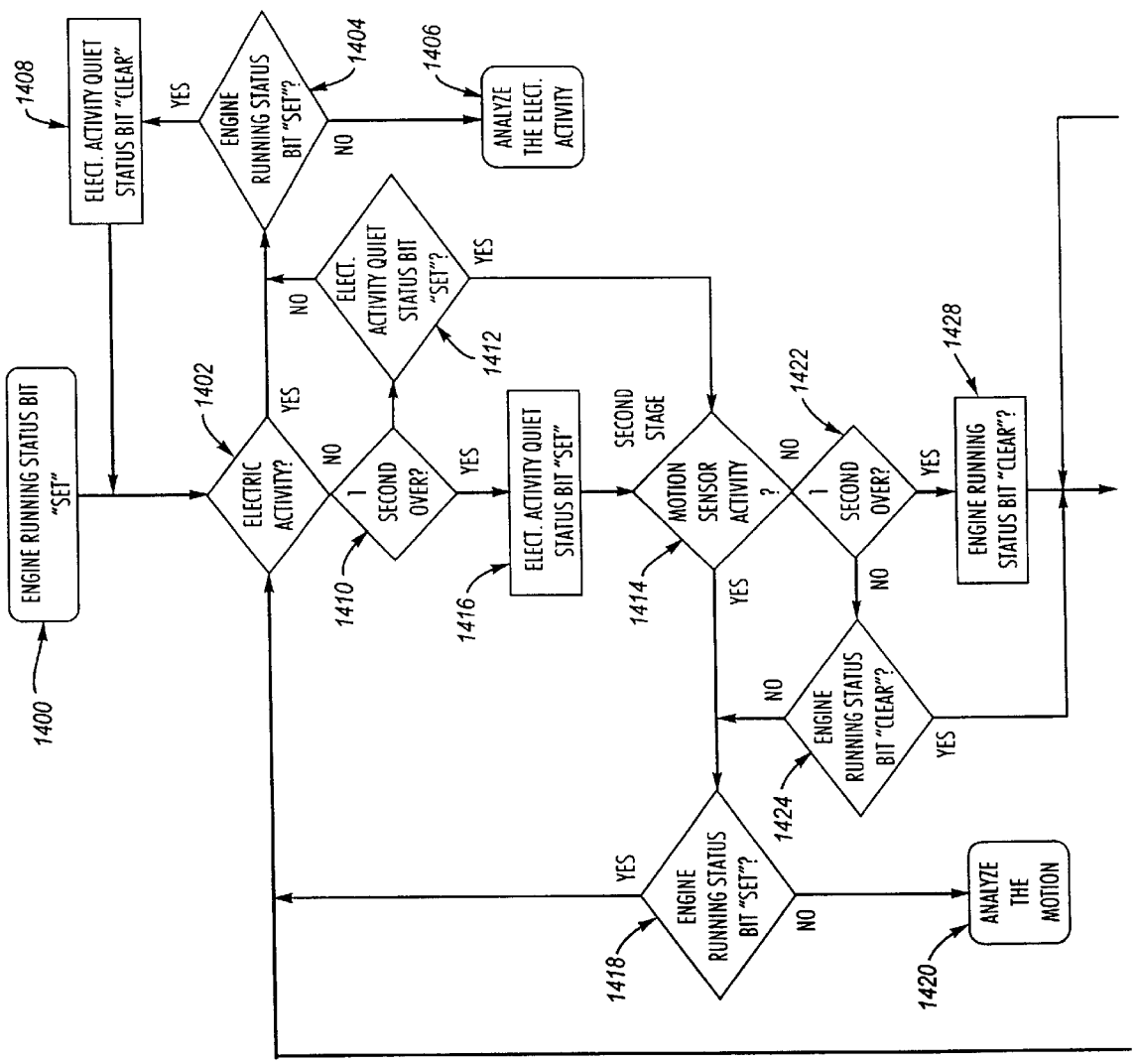
FIG. 14A (which comprises FIGS. 14A' and 14A") depicts a logic flow diagram for a preferred method in the present invention of performing as a battery saver.
Figure 14A:
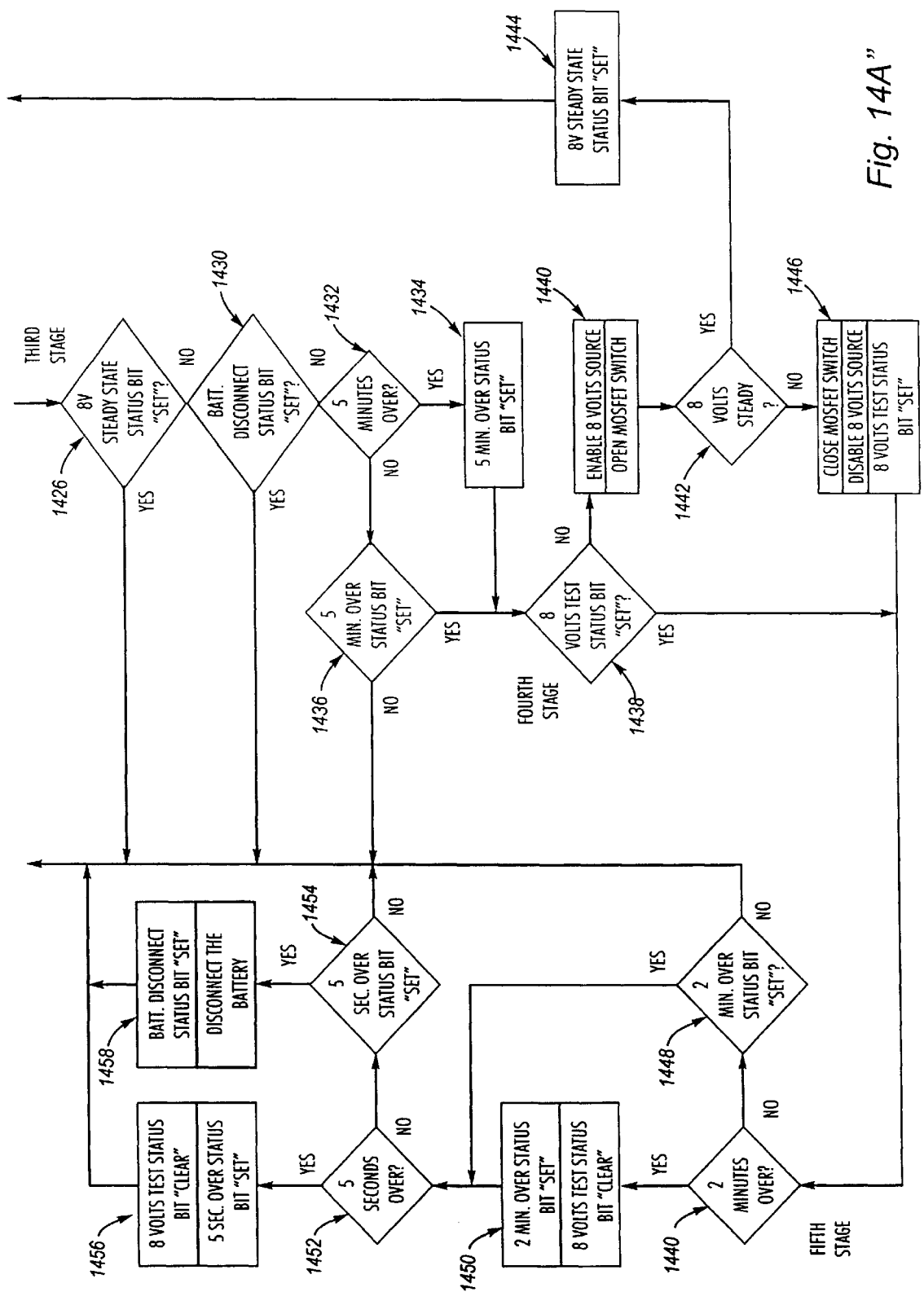

FIG. 14A is a flowchart depicting the preferred embodiment of the steps, grouped into five distinct stages, that are taken by the VSS 100 in performing as a battery saver. Another of the functions preferably performed by the VSS 100, the battery saver monitors the current load on the battery 104 and disconnects the battery 104 from the power transmission circuit 102 if the battery 104 is overloaded. For a vehicle having an engine, the battery saver function is preferably performed once the engine becomes inactive. In another preferred embodiment, the battery saver function is performed once the battery saver determines that the vehicle is also unoccupied. The battery saver logic is preferably implemented in software in the microcontroller 300.

The battery saver functionality is preferably initiated when an Engine Running Status Bit 1400 in the microcontroller 300 is set. When this bit 1400 is set, the bit 1400 is indicative of a vehicle engine that is active or has been turned off too recently for the bit 1400 to have been cleared. The process continues with the microcontroller 300 checking for electrical activity 1402 on the power transmission circuit 102. To perform the electrical activity output signal analysis, the AC output of the electrical activity sensor 302 depicted in FIG. 8 is analyzed by the microcontroller 300. As shown in FIG. 9B, if the electrical activity output signal from the electrical activity sensor 302 is a steady five volts, then the vehicle is still active. A steady five volts output from the electrical activity sensor 302 in this case represents the electrical signature of an active engine. If the electrical activity output signal from the electrical activity sensor 302 is a steady zero volts, then the engine is inactive. Such an output signal is effectively the electrical signature for an inactive engine. In the preferred embodiment, the electrical activity output signal for an active versus an inactive engine is easily distinguished without requiring a comparison of the signals to pre-stored signatures in the microcontroller 300. Alternatively, however, the electrical activity output signal is compared to a library of electrical activity signatures to determine when the engine is active or inactive.

If some electrical activity is detected, the microcontroller 300 polls the Engine Running Status Bit 1404. If the bit is cleared, the microcontroller 300 considers the vehicle to have an inactive engine, but having some electrical activity on the power transmission circuit 102. In this circumstance, the microcontroller 300 analyzes the electrical activity 1406 to identify the source of the electrical activity. This analysis includes identifying electrical activity associated with a vehicle door opening and/or closing (See FIGS. 11A–B). Making such identifications, the microcontroller 300 further surmises whether it is likely that the vehicle is occupied or unoccupied. If the bit is set, then another status bit, called Electrical Activity Quiet Status, is cleared 1408, although this bit may already be in a cleared state. The process then loops back to the polling of the electrical activity sensor 302 to determine if electrical activity remains on the power transmission circuit 102 indicating that the engine is still active 1402.

When the electrical activity sensor 302 initially detects no activity, a timer polled to determine if one second has elapsed or the timer is started if the routine is on its first pass through this step 1410. The purpose of the step is to allow any residual electrical activity to cease. During that period, the Electrical Activity Quiet Status Bit is polled 1412. If the bit is clear, indicating that such residual activity may yet remain on the power transmission circuit 102, then the routine returns to the point of polling the Engine Running Status Bit 1404. If the Electrical Activity Quiet Status Bit is set, the routine preferably proceeds onward to a second stage to determine whether there is any motion sensor activity 1414.

After one second elapses from the first instance of sensing no electrical activity, the microcontroller-executed routine proceeds to set the Electrical Activity Quiet Status Bit 1416. From this step, the routine moves forward to analyze the motion sensor output signal 1414. The motion sensor output signal is analyzed to determine whether there is vibration indicative of an active or inactive engine. If vibration is detected, the Engine Running Status Bit is polled 1418. If the bit is set, the routine returns to the original state of checking for electrical activity from the electrical activity sensor output 1402. If the Engine Running Status Bit is clear, then the routine proceeds to analyze the vibration activity from the motion sensor 1420. Beyond analyzing the motion sensor output signal to determine whether the engine is active or inactive, the microcontroller 300 further analyzes the signal to determine whether any doors of the vehicle have been opened or closed (see FIGS. 5A–D and 6A–D). Such information, when identified, enables the microcontroller 300 to confirm that the vehicle is occupied or unoccupied.

Alternatively, if no motion sensor activity is detected, then on the first instance of no detected activity, a one-second timer is started to allow residual vibration to dissipate 1422. Before one second has elapsed, the routine proceeds by polling the Engine Running Status Bit 1424. If the Engine Running Status Bit is set, the routine proceeds as though vibration was detected, returning the routine to the point of analyzing the electrical activity sensor output 1402. If the bit is clear, the routine proceeds to a third stage 1426.

If no vibration is detected, and one second has elapsed since the first instance that the microcontroller 300 analyzed the motion sensor output signal, then the routine proceeds to clear the Engine Running Status Bit 1428. By clearing this bit, the routine confirms with the two sensors 302, 304 that the engine is inactive and that all electrical activity and vibration associated with the operation of the engine has ceased. Consequently, the routine proceeds towards performing a battery load test, the beginning of which is preferably performed in the routine's third stage.

In the third stage of the battery saver process, the first step is preferably the polling of an Eight-Volt Steady State Status Bit 1426. This bit 1426 is set after the "8V Sense" connection 322 (the DC component electrical activity sensor) that is input to the A/D converter 310 of the microcontroller 300 has determined that the constant current source 342 is steady at about eight volts. Preferably, a steady-eight-volts determination is made if a fixed consecutive number of samples from the A/D converter output 310 reads eight volts DC ± about 200 millivolts. Preferably, 32 consecutive samples are required to be within this voltage range for the microcontroller 300 to set the Eight-Volt Steady State Status Bit. Also, the sampling rate for the measurement of voltage on the direct current power transmission circuit 102 is preferably one millisecond. Therefore, the set state of this bit indicates that the constant current source 342 is supplying to the power transmission circuit 102 a steady eight volts, and that therefore the battery 104 is not experiencing excessive current drain such that a battery-disconnect is required. Thus, if the bit is set when it is initially polled, the routine returns to the first stage where the analysis of the electrical activity is performed 1402. If the Eight-Volt Steady State Status Bit is clear, then a further analysis is performed to determine whether a battery-disconnect is required.

In proceeding with the further analysis, a Battery Disconnect Status Bit is first polled 1430. This bit is initially checked to determine whether the reason for the lack of a steady-state eight volts on the power transmission circuit 102 is that the battery 104 has already been disconnected. If this bit is set, indicating that such is the case, the routine returns to the first stage 1402. If, alternatively, the bit is clear, the routine proceeds to the next step. This next step is the start of a five-minute timer 1432. The purpose of the timer is to allow additional time to pass since the vehicle engine was deactivated. When five minutes have elapsed, a status bit, indicating that the time has elapsed, is set 1434. This bit, a Five-Minutes-Over Status Bit, is checked as a precaution if the timer indicates that the time has not elapsed. If the Five-Minutes-Over Status Bit is clear 1436, the routine returns to the first stage 1402. If, alternatively, the Five-Minutes-Over Status Bit is set or the timer indicates that five minutes has elapsed (which causes the bit to be set anyway), the routine proceeds to a fourth stage 1438.

In the fourth stage, the first step is to determine whether the load test using the constant current source 342 and the DC sensing of the electrical activity sensor 302 via the "8V Sense" connection 322 has been performed. To recognize whether such a test has been performed, another status bit called Eight Volts Test Status Bit is polled. A set state for this bit indicates that the load test has been performed within the last two minutes. If the bit is in fact set, the routine proceeds to poll a two-minute timer 1440. If the timer is being polled for the first time, then the timer commences its timing. If the Eight Volts Test Status Bit is clear, indicating that no load test has been performed in the last two minutes, then such a test is initiated.

To initiate the load test, the microcontroller 300 first transmits from a digital output port 352 a constant current source enabling signal to the eight-volt constant current source, thereby enabling the constant current source 342. The microcontroller 300 then preferably transmits 1440 from another digital output port 360 of the microcontroller 300 a battery-disabling signal to the MOSFET switch 356, thereby opening the switch 356 positioned between the negative terminal 202 of the vehicle's battery 104 and ground 348. The constant current source 342, being in series with the battery 104 and electrically in parallel with the switch 356, becomes the sole source of power to the power transmission circuit 102. Next, the microcontroller 300 samples the DC electrical activity sensor 302 as discussed above to determine the load on the power transmission circuit 102. In evaluating the load, the microcontroller 300 analyzes the DC electrical activity output signal to determine whether the signal varies by a preset amount from eight volts 1442, the predetermined ambient condition level. In the preferred embodiment, the microcontroller 300 makes this determination by simply evaluating whether the voltage on the power transmission circuit 102 is "Eight-Volts-Steady" or "Eight-Volts-Not-Steady." If two or more of the 32 samples taken measure as seven volts DC ± 100 millivolts, the constant current source 342 is determined to be Eight-Volts-Not-Steady. If the microcontroller 300 finds Eight-Volts-Steady, the Eight-Volts-Steady-State Status Bit is set 1444 and the routine returns to the first stage 1402. The preset amount in this embodiment therefore is the one-volt difference between seven volts and the ambient condition voltage of eight volts. Alternatively, the preset amount is at least 5% of the ambient condition voltage.

Figure 14B:
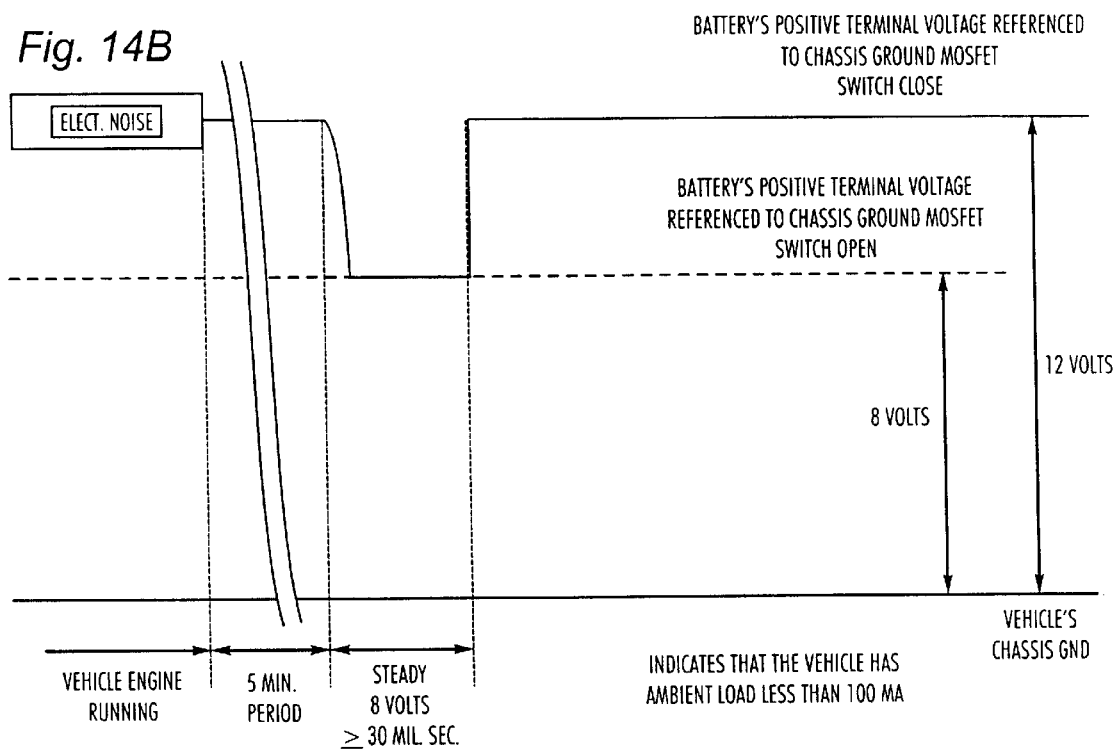
FIG. 14B graphically depicts an output signal from the DC electrical activity sensor when a load test controlled by a microcontroller in the present invention according to the logic flow diagram of FIG. 14A shows that the vehicle battery is not overloaded.

FIG. 14B is a diagram showing the DC voltage on the power transmission circuit 102 versus time as the load test is performed and the Eight-Volts-Steady state is observed. Before the MOSFET switch 356 is opened, the voltage on the power transmission circuit 102 is equal to the battery voltage. After five minutes, the MOSFET switch 356 is opened to indicate the commencement of the load test. The DC electrical activity sensor 302 is sampled every millisecond for at least 32 milliseconds with the result being that each sample is measured at about eight volts. The MOSFET switch 356 is then closed, and the routine returns to the first stage 1402.

If the microcontroller 300 finds Eight-Volts-Not-Steady, the microcontroller 300 transmits a control signal closing the MOSFET switch 356, transmits another control signal disabling the constant current source 342, sets the Eight-Volts-Test Status Bit 1446 and then proceeds to the first step 1440 of the fifth stage. At the fifth stage, if the load test using the constant current source 342 has only been performed once, this stage requires the passing of two minutes according to a timer that is started after this stage is first entered. Thus, the first step in this stage is the status check of the two-minute timer 1440. If the timer indicates that two-minutes has elapsed, it further indicates that the routine is in its second pass though the fifth stage and that the second of two load tests using the constant current source 342, separated from the first by more than two minutes, can commence. Thus, as shown in FIG. 14A, if two minutes has not yet elapsed, the routine cycles back to the first stage until the two-minute timer so indicates. When the timer indicates that two minutes has elapsed or when the status bit, the Two-Minutes-Over Status Bit, for this timer is set 1448, the routine clears the constant current source test bit, the Eight-Volts-Test Status Bit 1450, and then proceeds to a check of a five-second timer 1452 and a polling of a Five Seconds Over Status Bit 1454 that enables a first repeat of the test. That is, on the first pass though the five-second timer, the routine will return to the first stage 1402, and cycle back to enable a load retest using the eight-volt constant current source 342.

The second pass though the five-second timer 1452 indicates that the retest of the constant current source 342 has failed. Once the timer indicates that the five seconds has elapsed, a Five-Seconds-Over Status Bit is set and the Eight-Volts-Test Status Bit is cleared 1456 to enable a final disconnection of the battery 104 from the power transmission circuit 102. A return to this stage results in the microcontroller 300 transmitting a switch-opening control signal that electrically disconnects the battery 104 from the power transmission circuit 102, setting a Battery Disconnect Status Bit 1458, and returning to the first stage of the battery disconnect routine 1402.

Figure 14C:
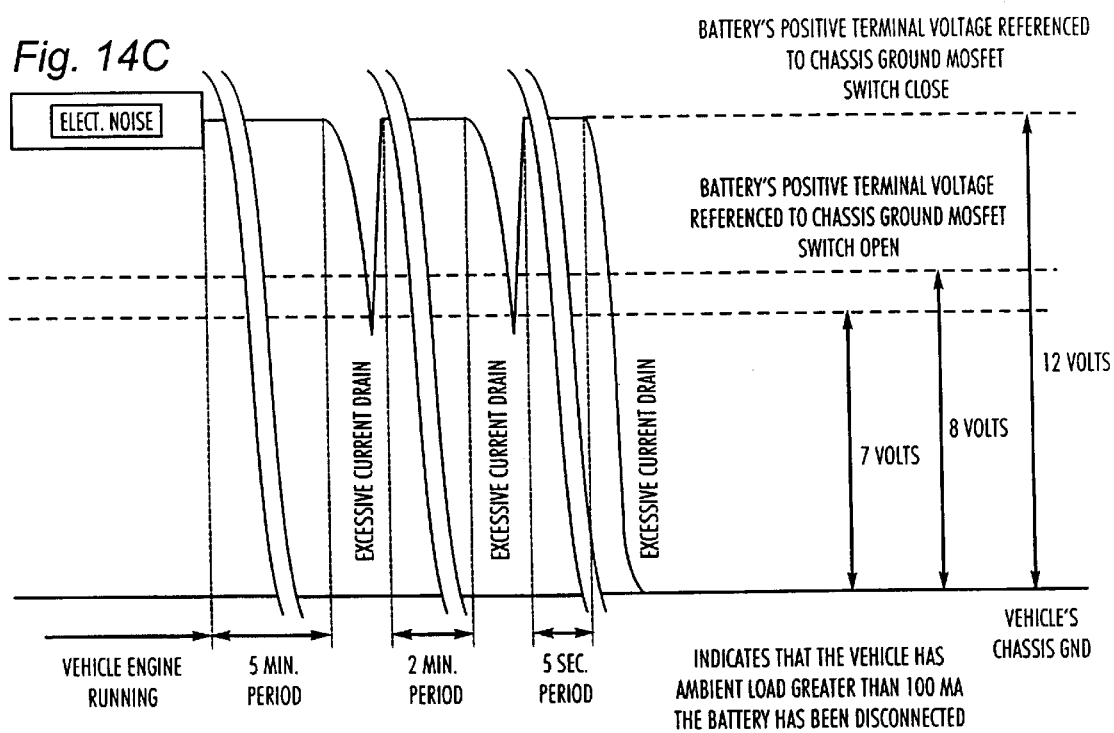
FIG. 14C graphically depicts an output signal from the DC electrical activity sensor when a load test controlled by a microcontroller of the present invention according to the logic flow diagram of FIG. 14A shows that the vehicle battery is overloaded and thereby has been disconnected from the power transmission circuit.

FIG. 14C is a diagram showing just such a sequence of events performed by the microcontroller 300 from the perspective of the DC electrical activity signal on the power transmission circuit 102. After the vehicle engine has been deactivated, a five-minute period is allowed to elapse. A first load test using the eight-volt constant current source 342 fails with the positive terminal voltage exhibiting excessive current drain, in that the voltage on the power transmission circuit 102 drops below seven volts, unable to maintain an eight-volt steady state. This drop indicates that the vehicle has an ambient load greater than the 100 milliamps that the constant current source 342 is preferably designed to provide. Then, the MOSFET switch 356 is closed before the voltage drops below a point where any electronic memory powered on the power transmission circuit 102 might be lost. Then preferably a two-minute timer commences. After the expiration of the additional two minutes, a second test is performed. The MOSFET switch 356 is opened and again, the test shows excessive current drain. Once more, the switch 356 is closed. Preferably about five seconds are allowed to elapse before the battery 104 is preferably finally disconnected.

Figure 15A:
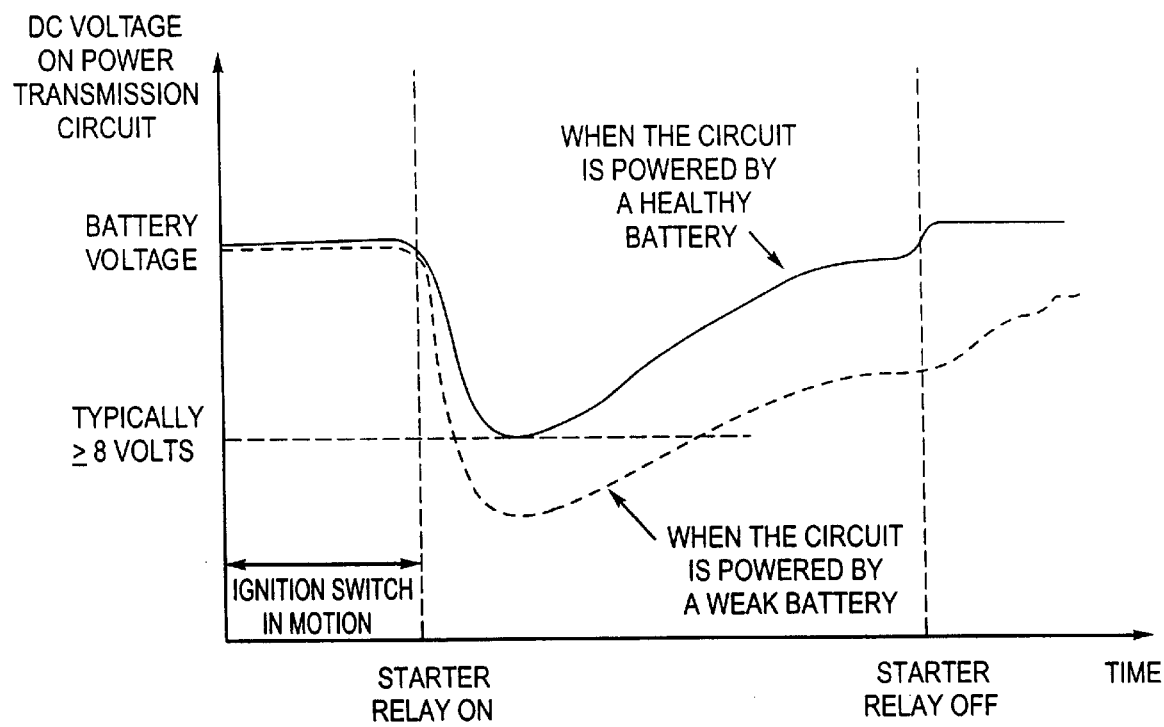
FIG. 15A graphically depicts two DC signals on the power transmission circuit when a vehicle's starter is engaged for the cases of a healthy battery and a weak battery interposed in the power transmission circuit.

The VSS 100 is also a battery-analyzer that preferably reports the condition of the battery 104 to the user of the vehicle. When the engine of a vehicle is started, the battery analyzer analyzes the charge capacity of the battery 104 by analyzing the DC voltage on the power transmission circuit 102 using the DC electrical activity sensor 302. The measurement of voltage during engine-startup is highly indicative of the condition of the battery 104. If the battery 104 is weak, that is, having a low charge capacity and/or having a high internal resistance, the response on the power transmission circuit 102 shows a significantly greater dip in voltage than if the battery 104 is healthy. FIG. 15A depicts the typical difference in DC voltage on the power transmission circuit 102 at engine start-up depending on whether the battery 104 in the circuit 102 is healthy or weak.

Referencing FIG. 15A, initially while the ignition switch is in motion, the DC voltages on the power transmission circuit 102 are approximately the same for the healthy and for the weak battery. As the starter is engaged however, the voltage for the weak battery drops significantly below eight volts, the expected minimum voltage while the starter relay is on if the battery is healthy. For approximately 300 to 500 milliseconds, the voltage potentially sags to six or seven volts. Furthermore, while the starter relay is on, the weak battery recovers much more slowly than the healthy battery. This extended recovery time for the weak battery continues even after the starter relay is switched off.

Using the DC electrical activity sensor 302, the microcontroller 300 of the VSS 100 acts as a battery analyzer by distingushing between the DC voltage signals for a healthy battery and a poor battery at engine start-up. Preferably, the battery condition is determined based on whether the voltage drops below a predetermined threshold level, such as eight volts. Alternatively, the microcontroller 300 additionally analyzes the motion sensor output signal that the vibration in the vehicle produces at start-up, providing a further indication of the condition of the battery 104. Once the condition of the battery 104 is determined, the microcontroller 300 transmits a battery condition signal, preferably using the telemetry and control data transmission scheme previously discussed, to a condition reporting module. The condition reporting module then reports the battery condition to the user by an audible and/or visual means.

Figure 15C:
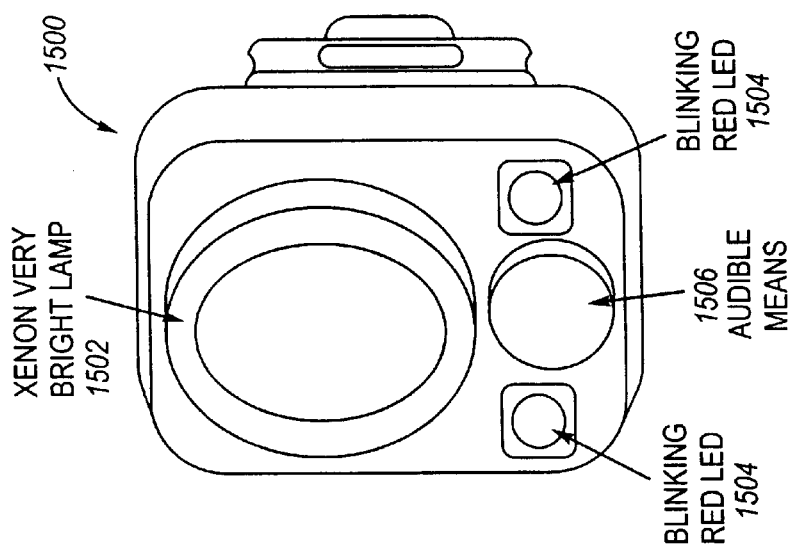
FIG. 15C is a front view of a preferred condition reporting module included in a preferred alternative embodiment of the present invention.
Figure 15B:
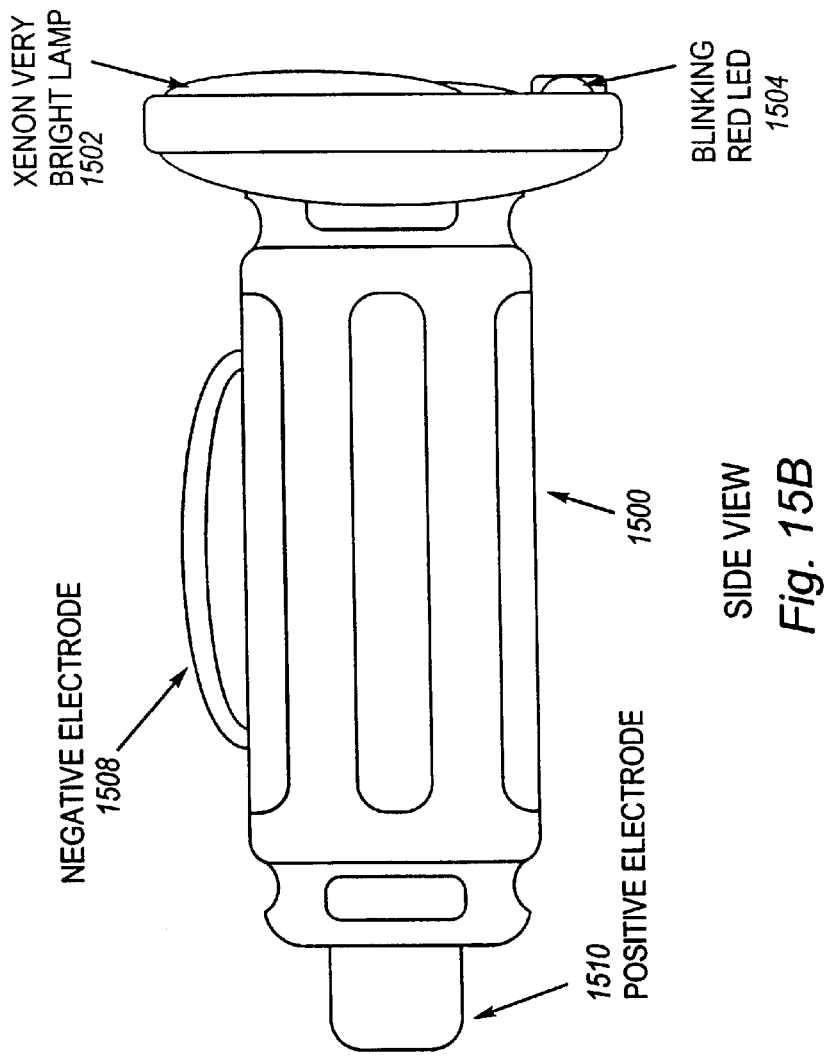
FIG. 15B is a side view of a preferred condition reporting module included in a preferred alternative embodiment of the present invention.
Figure 15D:
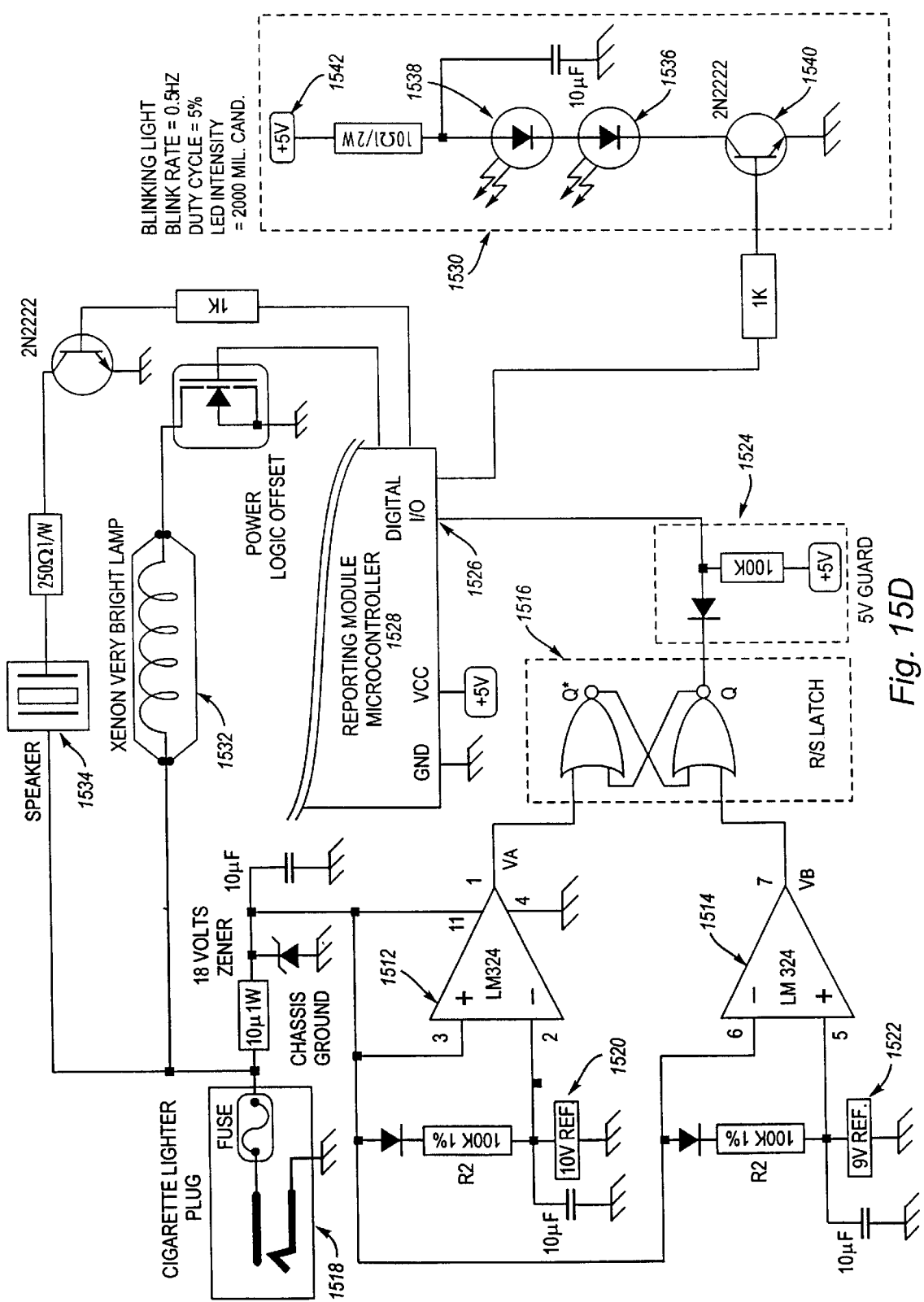
FIG. 15D is a circuit schematic for a preferred condition reporting module included in a preferred alternative embodiment of the present invention.

FIGS. 15B–D depict preferred perspectives of the condition reporting module 1500 interposed in the power transmission circuit 102 for reporting the battery condition to the user. FIG. 15B is a side view of the condition reporting module 1500 which preferably includes a bright lamp 1502, a pair of blinking red lights 1504 and a speaker (audible means) 1506. The bright lamp 1502 is preferably a xenon lamp with wattage sufficient to illuminate the cab of the vehicle. The lamp 1502 is preferably activated via a telemetry code signal on the power transmission circuit 102 when the VSS 100 is disarmed by the user as the user approaches the vehicle. Further, the condition reporting module 1500 preferably includes a negative electrode 1508 preferably disposed on a side face of the module 1500 and a positive electrode 1510 on the back of the module 1500. This positioning of electrodes allows for the condition reporting module 1500 to be plugged into the cigarette lighter socket equipped in most motorized vehicles, minimizing the installation complexity. FIG. 15C depicts the front face of the condition reporting module 1500. The front face depicts the speaker 1506 and two red lightbulbs 1504, either or both of which are useable to provide information to the user regarding the condition of the battery 104.

A schematic diagram depicting a preferred embodiment of the telemetry and control data-decoding circuitry for the condition reporting module is shown in FIG. 15D. As discussed above, a cigarette lighter plug for the condition reporting module 1500 connects the module 1500 to the power transmission circuit 102. This connection supplies the power to the reporting interfaces, in particular, the speaker 1506 and the xenon lamp 1502.

The condition reporting module 1500 includes two comparitors 1512, 1514 whose outputs are inputs to an R/S latch 1516. The inputs for the first comparitor 1512 are the supply voltage received via the cigarette lighter plug 1518 and a ten-volt reference 1520. The inputs for the second comparitor 1514 are the same voltage supply 1518 and a nine-volt reference 1522. In combination with the R/S latch 1516, the circuit produces the truth table shown in FIG. 15E. The truth table indicates a one-volt hysteresis when sensing the power transmission voltages. The output of the R/S latch 1516 is transmitted through a five-volt guard 1524 to a digital input port 1526 of a reporting module microcontroller 1528. The reporting module microcontroller 1528 processes the digital signal from the R/S latch 1516 to determine the content of the data transmitted by the main microcontroller 300. A preferred decoding algorithm implemented in the reporting module microcontroller 1528 and in the intelligent module is discussed below is depicted in the logic flow diagram of FIG. 17. Depending on the content of the transmitted data, the reporting module microcontroller 1528 transmits a report instruction signal that activates the module's user interface comprising a plurality of reporting accessories including the red lightbulbs 1530, the Xenon lamp 1532 and, preferably, the speaker 1534. Each of the reporting accessories 1530, 1532, 1534 of the user interface is electrically connected to a dedicated digital output port of the reporting module microcontroller 1528. The red lightbulbs 1530 are preferably comprised of LEDs 1536, 1538 positioned between the collector of a 2N2222 transistor 1540 and a collector voltage source 1542 of about five volts. Preferably, the LEDs have a blink rate of 0.5 Hz, a duty cycle of 5% and an intensity of 2000 mil. candles. The speaker 1534 preferably produces a chirp, beep or alarm sound depending on the condition or warning being reported.

The condition reporting module 1500 is also an integral part of a theft-deterrence system functionality of the VSS 100. In a first functional aspect of the theft-deterrence system, when an arm/disarm control signal from the remote transmitter 108 is received by the microcontroller 300, the microcontroller 300 sets a value in a system state register to one representing that the VSS 100 is armed or disarmed depending on the signal received and transmits an alarm condition signal to the condition reporting module 1500. In response to the received signal, the condition reporting module 1500 preferably signals the speaker 1534 to produce a beeping sound indicating the theft-deterrence system's armed or disarmed state and to display or cease a theft-deterring light 1530. The theft-deterring light 1530 is preferably a rapid blinking of the LEDs 1536, 1538. The theft-deterring light is preferably designed to continue blinking as long as the VSS 100 is armed. Furthermore, when the system state register is set to an armed state value, the microcontroller 300 analyzes the output signals from the sensors 302, 304 as part of a theft-deterrence system mode for the VSS 100.

In a further aspect of the theft-deterrence system, the microcontroller 300 transmits a telemetry and control signal to the condition reporting module 1500 to sound an alarm from the speaker 1534 when the VSS 100 is armed and the microcontroller 300 determines that a door of the vehicle is being opened. For this functionality, the condition reporting module 1500 performs as an alarm sounging module. Alternatively, the VSS 100 further includes a distinct alarm module (not shown) electrically connected directly to a separate digital output port of the microcontroller 300. The distinct alarm module broadcasts a theft-deterring alarm when an alarm activation signal is received from the microcontroller 300. Preferably, the analysis of the activity around the vehicle is based on a signal input from the electrical activity sensor 302 (see FIG. 11A). However, alternatively, the motion sensor 304 provides a motion sensor signal to the microcontroller 300 of a door opening as in FIG. 5A. In another alternative embodiment, the microcontroller 300 uses both sensors 302, 304 to make the determination. The microcontroller 300 may also transmit an alarm activation signal to the alarm module if certain other activity indicating that the vehicle is being tampered with is sensed by either one or both of the sensors 302, 304. While the VSS 100 is in an armed state, the microcontroller 300 distinguishes, via the motion sensor output signal, a breaking of a window or any other forceful contact with the vehicle.

As an additional capability, if the VSS 100 is armed and there is an attempt to start the vehicle, the microcontroller 300 sends a battery-disabling signal to the switch 356 thereby disconnecting the battery 104 and preventing a startup of the engine. This theft-deterring measure is preferably performed as a last resort when the electrical activity sensor 302 detects and the microcontroller 300 identifies with a preset level of certainty the AC electrical activity sensor signal of an ignition switch in motion (see FIGS. 9A–B). The identification is preferably performed using the library of electrical activity signatures discussed above. Preferably, when the microcontroller 300 receives a theft-deterrence system disarming signal from the RF remote transmitter 108, the microcontroller 300 transmits a battery-enabling signal to the switch 356 to reconnect the battery 104 to the power transmission circuit 102 if the battery 104 is not already connected.

In a preferred embodiment of the theft-deterrence system, the sensory identifications that the microcontroller 300 performs contribute to a theft-deterrence value that the microcontroller 300 calculates which quantifies the likelihood that an unauthorized force is contacting the vehicle. The evaluation of the theft-deterrence value leads to a determination by the VSS 100 to perform one or more actions. For example, in the preferred embodiment of the theft-deterrence system, if the theft deterence value exceeds a predetermined battery-disconnect threshold level, the microcontroller 300 sends a battery disabling signal to the switch 356. Moreover, predetermined thresholds levels for the theft-deterrence value may be set for performing a visual alarm warning and for the activation of the audible alarm. The measure of the theft-deterrence value therefore provides the basis for displaying or sounding the alarm or disconnecting the battery 104. Unlike other theft-deterrence systems however, the theft-deterrence value may see contribution from a multitude of identified and tentatively identified sensory inputs, each contributing to an evaluation of the circumstances that lead to the action taken by the VSS 100.

Figure 16A:
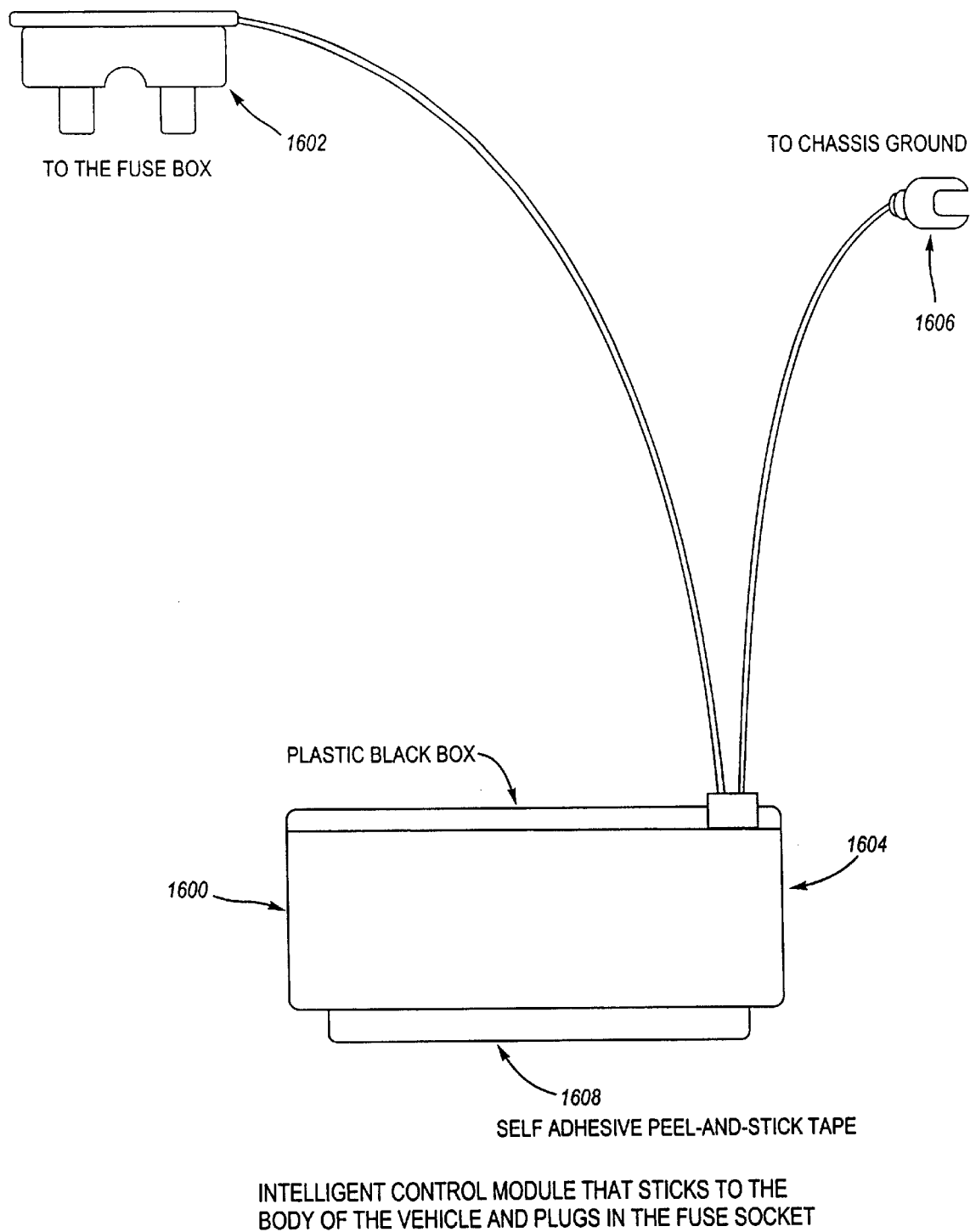
FIG. 16A depicts a preferred embodiment of an intelligent control module that plugs into the fuse box of a motorized vehicle.
Figure 16B:
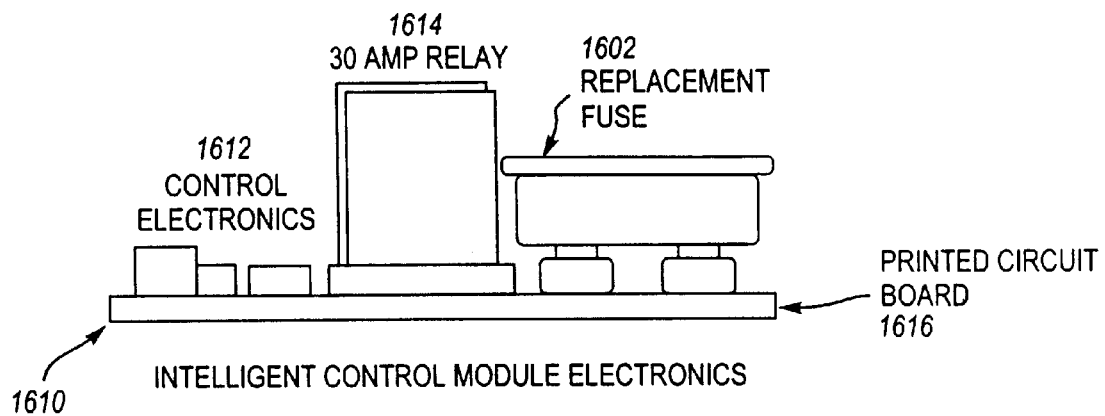
FIG. 16B depicts a preferred embodiment of an electronics package for an intelligent control module that plugs into the fuse box of a motorized vehicle.
Figure 16C:
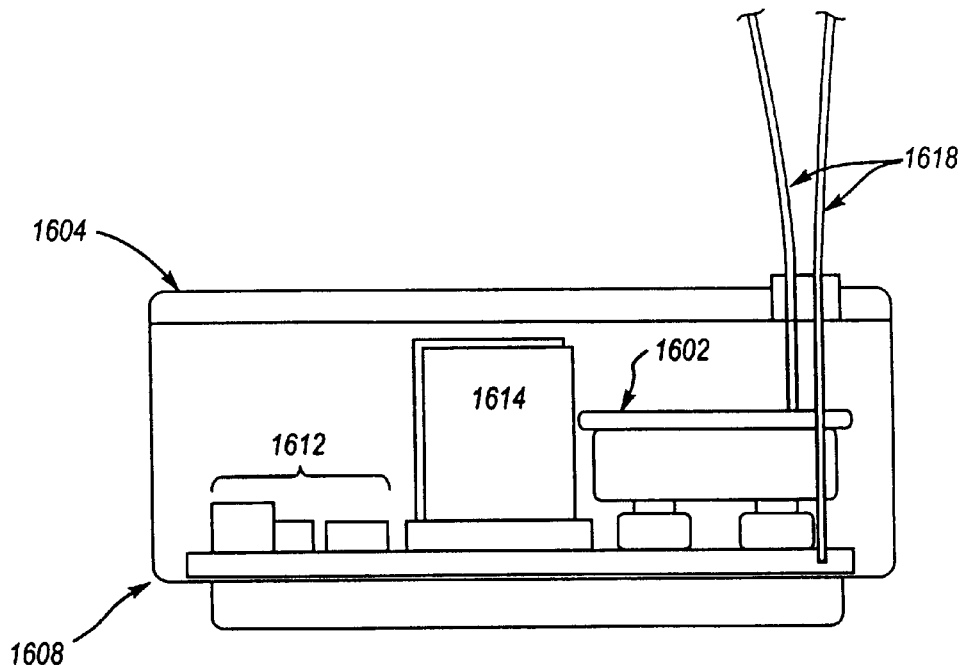
FIG. 16C depicts a preferred embodiment of an electronics package for an intelligent module mounted inside an intelligent module casing.

FIG. 16A depicts an intelligent control module 1600, a communicative accessory that connects to the fuse box via a replacement fuse 1602, preferably receives and decodes telemetry and control signals transmitted over the power transmission circuit 102 according to the previously discussed scheme, and controls pre-existing electronic accessories installed in a vehicle's power transmission circuit 102. The pre-existing electronic accessories may, for example, include door locks, dome lights, headlights, warning lights and other displays. The diagram shows a plastic box 1604 with the replacement fuse 1602 that plugs in the fuse receptacle that it replaces. The intelligent module 1600 has separate connection to the chassis ground 1606. Preferably, the box has a peel-and-stick tape 1608 that allows it to be easily attached to the body of the vehicle. FIG. 16B is a side view of the basic electronic package 1610 of the intelligent module 1600. The electronic package 1610 includes control electronics 1612, a 30-amp relay 1614, and the replacement fuse 1602, all connected via a printed circuit board 1616. In FIG. 16C, these electronics 1610 are shown mounted inside the plastic black box 1604 with power transmission circuit connection cables 1618 leading out of the box 1604.

Figure 16D:
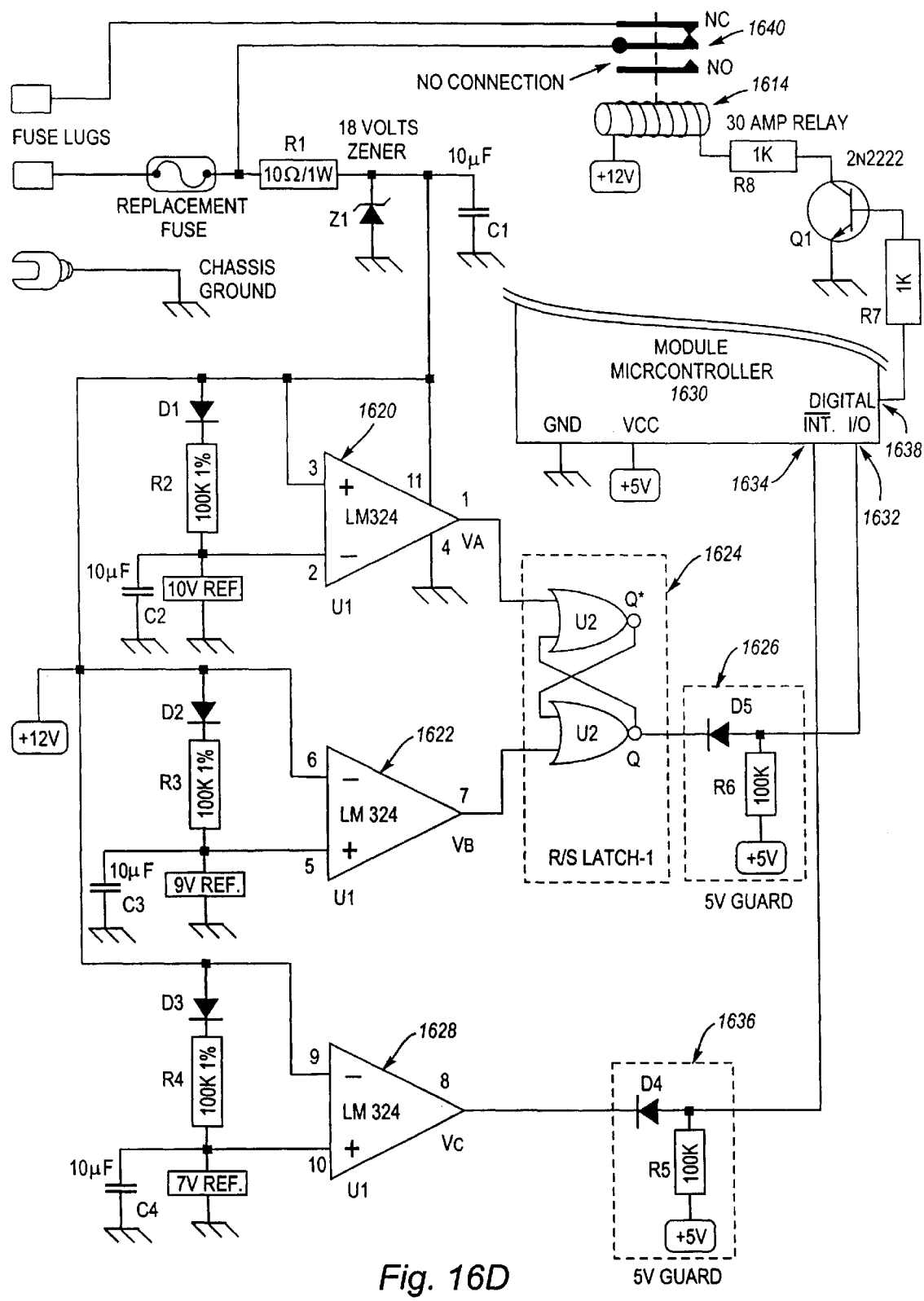
FIG. 16D is a circuit schematic for a preferred embodiment of an intelligent control module that plugs into the fuse box of a vehicle.

FIG. 16D is a schematic diagram detailing a preferred embodiment of the telemetry and control data decoding circuitry for the intelligent module 1600. The intelligent module 1600 includes the circuitry for performing DC signal detection off the of power transmission circuit 102 like that for the condition reporting module 1500, including identical comparitors 1620, 1622, R/S latch 1624 and five-volt guard 1626. The intelligent module 1600 of FIG. 16D however, includes an additional seven-volt comparitor 1628. A module microcontroller 1630 receives the output of the R/S latch 1624 at a digital input port 1632 and receives the output of the seven-volt comparitor 1628 at an interrupt port 1634. The output of the seven-volt comparitor 1628 is transmitted through a five-volt guard 1636 to the interrupt input port 1534. A connection from a digital output port 1638 of the module microcontroller 1630 to the relay 1614 (preferably 12 volts, 30 amps) enables the intelligent module 1600 to control via one or more switches 1640 pre-existing electronic accessories interposed on the power transmission circuit 102. When the module microcontroller 1630 receives an interrupt signal, the module microcontroller 1630 proceeds to switch off any active electronic accessories causing the excessive current drain.

Figure 16E:
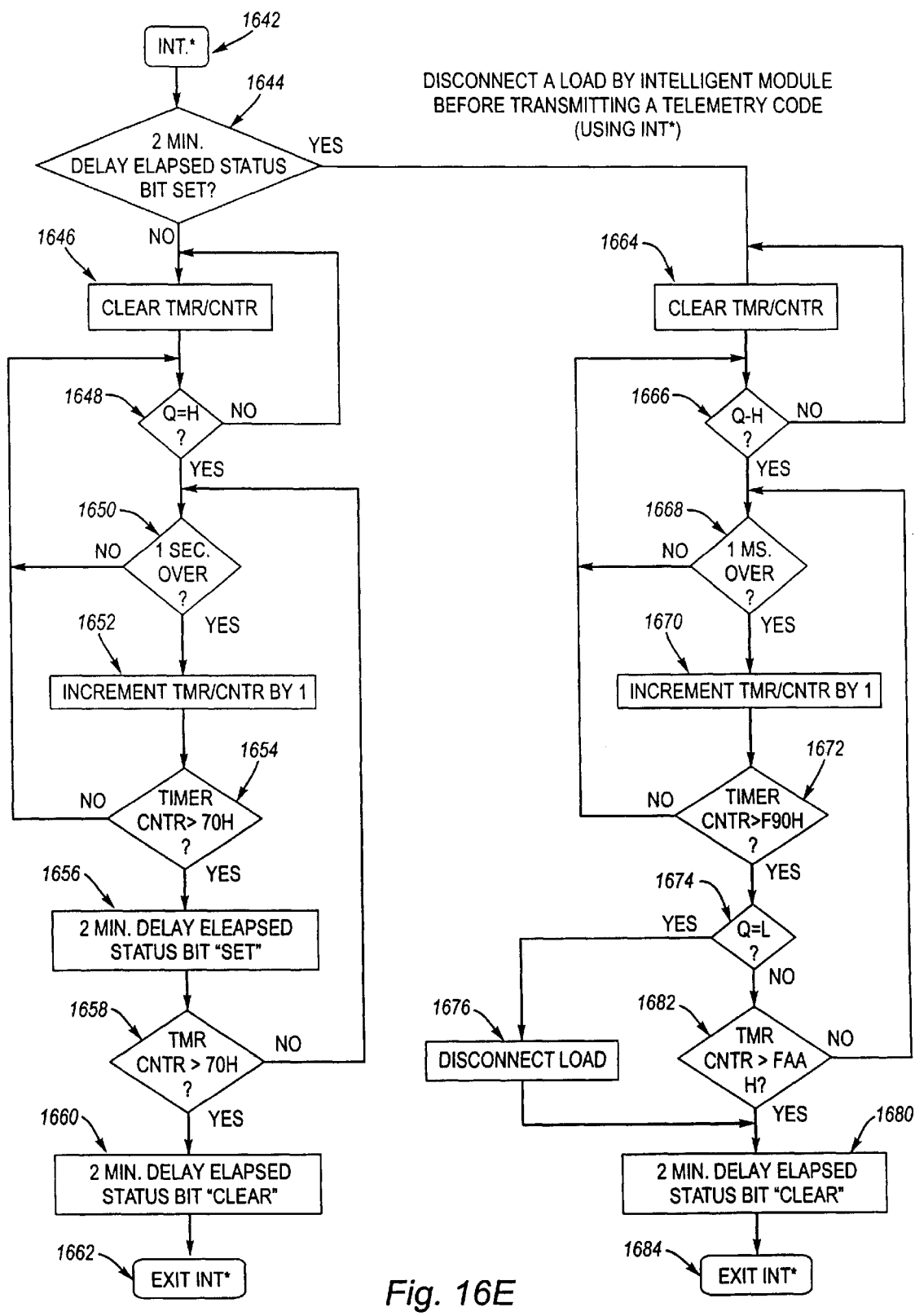
FIG. 16E depicts a preferred embodiment of the logic processed by a microcontroller in an intelligent control module for disconnecting a load before a telemetry code is transmitted on the vehicle's power transmission circuit.

FIG. 16E is a flow diagram depicting an algorithm implemented in the intelligent module microcontroller 1630 for disconnecting a load from the power transmission circuit 102 caused by an active electronic accessory. This functionality is an enhancement to the battery saver described above. Active electronic accessories are preferably deactivated before a telemetry or control signal can be transmitted. The load disconnection procedure begins when the excessive current drain-detecting comparitor 1628 detects the DC voltage on the power transmission circuit 102 dropping below seven volts. This detection normally is due to the main microcontroller's 300 performance of the battery-disconnect test. If the seven-volt threshold is detected by the intelligent module 1600 via the seven-volt comparitor 1628, it is similarly detected by the DC electrical activity sensor 1220.

Once the interrupt is received at the module microcontroller 1630, the load disconnection routine is initialized 1642 and a Two-Minute Delay Elapsed Status Bit is polled 1644. This bit complements the Two-Minutes Over Status Bit referenced in FIG. 14A in the main microcontroller 300. If the Two-Minute Delay Elapsed Status Bit is clear the routine proceeds along one flow path. If the Bit is set, the routine proceeds along a second flow path. Along the first path, the first step 1646 is to clear a one-second timer and a counter in the intelligent module microcontroller 1630. Then, the R/S latch 1624 in the decoding circuit is polled at the digital input port 1632 of the module microcontroller 1630 to determine its state 1648. If Q=L, the routine loopes back to the timer and counter clearing step 1646. If Q=H, the routine proceeds onward. In the next step 1650, the one-second timer in the intelligent module microcontroller 1630 is checked to determine if one second has elapsed. If not, the routine returns to the step 1648 of polling the Q output of R/S latch. If one second has transpired, the routine proceeds by incrementing the counter by on and clearing the timer 1652. For the next step 1654, the value in the counter is compared to 70 hex. If the value in the counter is not greater than 70 hex, the routine returns to the step 1648 of polling the Q output. If the value is greater than 70 hex, the routine proceeds to a step 1656 of setting the Two-Minute Delay Elapsed Status Bit. From that step 1656, the routine proceeds to a step 1658 of comparing the value in the counter to 7D hex. If the value is not greater than 7D hex the routine returns to the step 1650 of checking the timer to determine if one second has elapsed since it was last cleared. If the timer counter does exceed 7D hex, in the next step 1660 the Two-Minute Delay Elapsed Status Bit is cleared. The final step 1662 in the first process path is that the interrupt enabled process is exited.

If the main microcontroller 300 is performing the battery overload test shown in FIG. 14A, then at a point late in the processing of the above-described first flow path, a second interrupt signal will be received by the module microcontroller 1630 from the seven-volt comparitor 1628. The seven-volt comparitor 1628 in the intelligent module 1600 would be detecting the second battery-overload test failure thereby transmitting an interrupt signal to the intelligent module microcontroller 1630. The interrupt would lead to a restart of the routine of FIG. 16E while the routine was in the step 1658 of counting down approximately two minutes of time.

However, on the second instance of the start of the routine, typically exactly two minutes from the first start of the routine because of the time between battery-disconnect tests by the main microcontroller 300, the step 1644 of polling the Two-Minute Delay Elapsed Status Bit should show that the bit is still be in a set state. Thus, in the second run of the routine, the second flow path in FIG. 16E is followed. In the first step 1664 of this process path, a one-millisecond timer and a counter are cleared. In the next step 1666, the Q output of the R/S latch is polled. If Q=L, the process returns to the step 1664 of clearing the timer and millisecond counter. If Q=H, the routine proceeds to the next step. In the next step 1668, the one-millisecond timer is checked to determine if one millisecond has elapsed. If not, the routine returns to the step 1666 of checking the Q output on the digital input port 1632 of the module microcontroller 1630. If one millisecond has elapsed, the routine proceeds to a step 1670 of incrementing the millisecond counter by one. The routine continues to a step 1672 of comparing the value in the counter to F90 Hex. If the value in the counter is not greater than F90 Hex, the routine returns to the step 1666 of polling the Q output. If the value in the counter is greater than F90 hex, the routine proceeds to a step 1674 of checking for the Q output going low. The instant that Q=L represents the main microcontroller's third disconnect of the battery 104 from the power transmission circuit 102, as shown in FIG. 14D. The intelligent module 1600 detects this third battery-disconnect with the check for Q=L in this step 1674. If Q=L, the intelligent module 1600 transmits a command signal disconnecting from the power transmission circuit 102 any active electronic accessory or accessories controlled by the intelligent module 1600. This action is the "Disconnect Load" step 1676 in the second flow path. Consequently, any loads on the power transmission circuit 102 controlled by the intelligent module 1600 that contributed to the excessive current drain are no longer active. The DC electrical activity sensed by the main microcontroller 300 does not drop to the seven-volt threshold, and a permanent disconnection of the battery 104 from the power transmission circuit 102 is avoided.

Figure 16F:
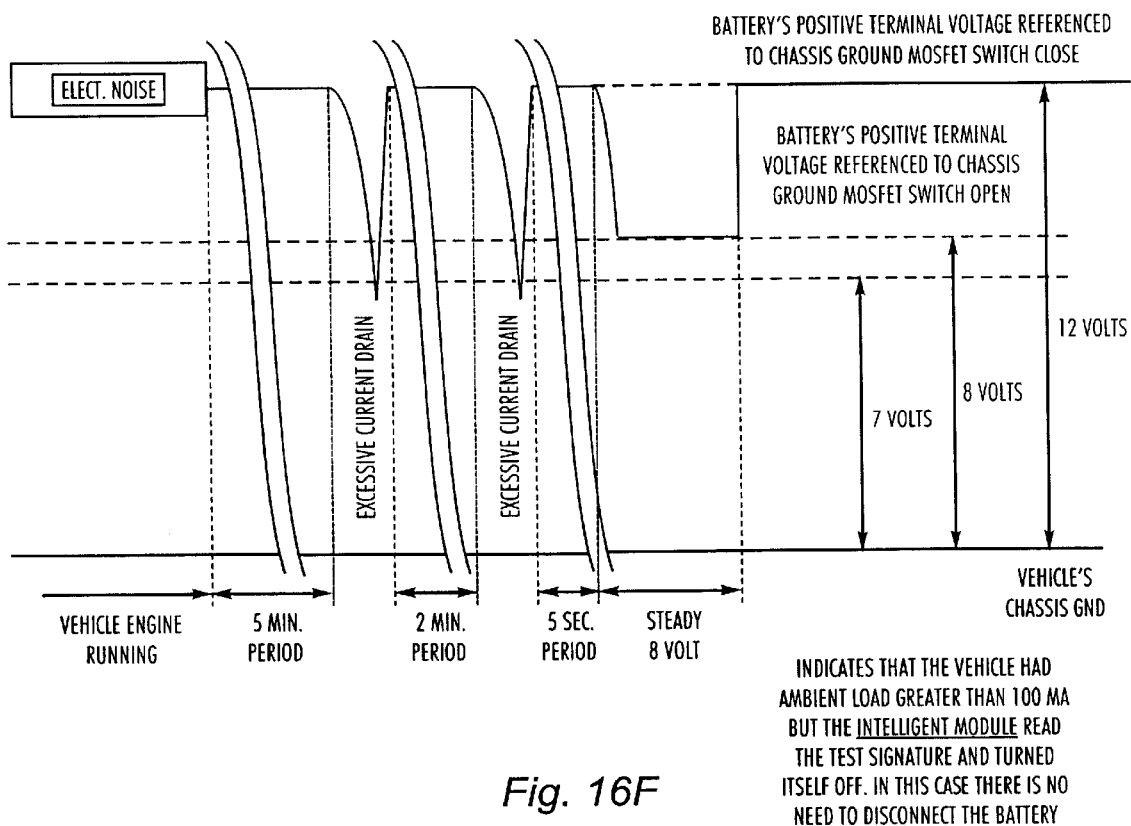
FIG. 16F graphically depicts the output signal from the DC electrical activity sensor when a load test controlled by a microcontroller of the present invention according to the logic flow diagram of FIG. 14A shows that the vehicle battery is overloaded and that an electronic accessory causing the overload consequently has been disconnected from the power transmission circuit by an intelligent module.

FIG. 16F depicts the result of incorporating the intelligent module 1600 in the power transmission circuit 102 to disconnect an active electronic load. In FIG. 16F, the ambient load on the vehicular battery 104 is more than 100 milliamps for each of the first two battery-disconnect tests using the constant current source 342. However, the third test using the constant current source 102 results in a steady state eight volts. In this case, the intelligent module 1600, electrically interposed in the power transmission circuit 102 and controlling one or more accessories, detects the excessive current drain on the power transmission circuit 102. After detecting the excessive current drain, the intelligent module 1600 electrically disconnects from the power transmission circuit 102 any active electronic accessories that the intelligent module 1600 controls, including headlights, dome lights, etc. Thus, after the analysis of the electrical activity causing the drain, the active accessory is deactivated. The deactivation enables the Eight-Volts Steady State test to complete successfully. In this case, the battery 104 did not need to be disconnected to avoid a drain of battery power.

Returning to FIG. 16E, once the intelligent module 1600 disconnects the electronic load, the routine proceeds to a step 1678 of clearing the Two-Minute Delay Elapsed Status Bit. Alternatively, if the step 1674 of polling for the Q output does not indicate that Q=L, then the routine continues to a step 1682 of comparing the value in the timer counter to FAA hex. If the value in the counter is greater than FAA hex, the routine proceeds to the step 1680 of clearing the Two-Minute Delay Elapsed Status Bit followed by the exit 1684 from the interrupt-enabled routine. If the value in the timer counter is not greater than FAA hex, then the routine returns to the step 1668 of checking the one-millisecond timer. The difference between the F90 Hex and the FAA Hex corresponds to the approximately 30 milliseconds that the battery 104 is normally disconnected by the main microcontroller 300 before the battery-disconnect switch 356 is again closed. Also, the Two-minute Delay Elapsed Status Bit is cleared 1660, 1680 at the end of both process flow paths of the load disconnection routine to prevent a premature disconnection of an electronic accessory by the intelligent module 1600.

Figure 17:
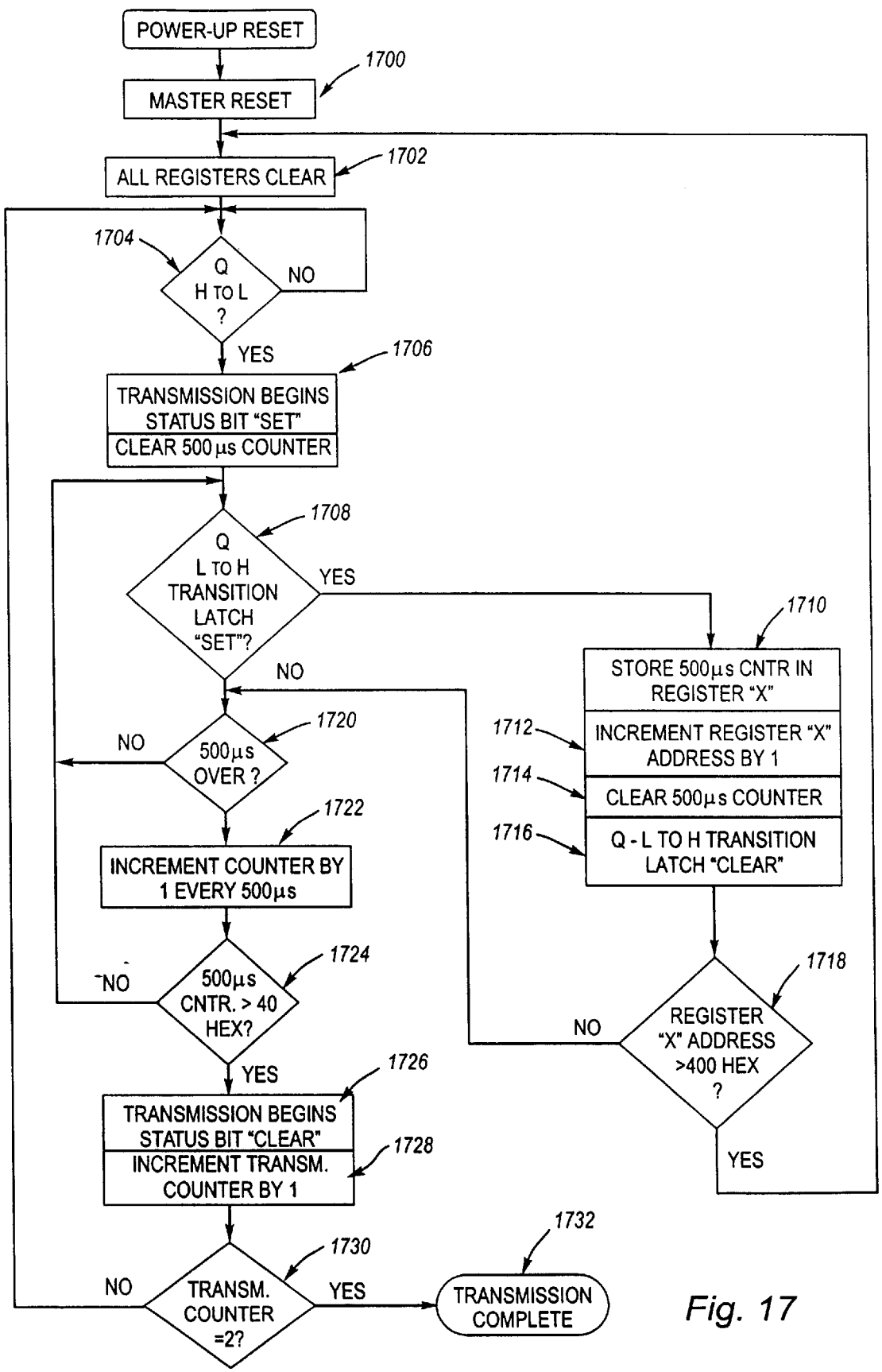
FIG. 17 depicts a preferred decoding algorithm implemented in a condition reporting module and in intelligent control modules included in preferred alternative embodiments of the present invention.

FIG. 17 depicts a process flow diagram for a preferred embodiment of a decoding algorithm implemented in the intelligent module microcontroller 1630 and condition reporting microcontroller 1528 operable asynchronously with the VSS 100. The decoding algorithm is designed to sense the beginning of a transmission of data from the microcontroller 300 and then read the binary-coded data that is subsequently transmitted. As discussed above, binary data is coded according to a fixed variation in the pulse widths on the power transmission circuit 102. A pulse width of nine milliseconds to 11 milliseconds indicates the transmission of the Start/End routine. A pulse width of 14 milliseconds to 16 milliseconds indicates the transmission of a zero in the "Bit 0" routine. A pulse width of 19 to 21 milliseconds indicates the transmission of a one in the "Bit 1" routine. The decoding algorithm measures the pulse widths and stores the results in its internal registers. Upon completion of the transmission, the intelligent module 1600 preferably performs a function on the electronic accessories that it controls in accordance with the received codes, including turning on, turning off, or configuring the electronic accessories to a more particularized state. To implement this decoding, when the module or accessory initially receives power, the modules 1600 first reset 1700 and then clear 1702 all of their internal registers. Then, the R/S latches 1516, 1624 in the respective modules 1500, 1600 are polled 1704 for a transition from High (H) to Low (L). If no such transition is detected, the modules continue to poll 1704 for such a transition. If the transition is detected, normally indicative of a switch from the 12-volt battery 104 to the eight-volt constant current source 342, then the routine proceeds to a step 1706 of setting a Transmission-Begins Status Bit and clearing a 500 microsecond counter.

Transmission signal decoding begins with the next step 1708 of determining whether the latch has transitioned from L to H. Pulse widths are measured from rising edge to rising edge of the Q output of the R/S latch. The rising edge is used for the measurement because of the low impedance of the MOSFET switch as it is closed causes a steep transition of the voltage from L to H. Consequently, the rising edge of the transition from eight-volts to 12 volts is very sharp. Thus, a high degree of timing accuracy is obtained when measuring the period between two rising edges. Furthermore, this accuracy is relatively insensitive to variations in temperature and tolerance differences between components.

If an L-to-H transition is detected, the routine proceeds to a step 1710 of storing the value of the 500-microsecond counter in a register "X" which contains transmission signal data for the current pulse. The count stored in the first location of the register "X" should indicate a pulse width between about two and about five milliseconds. Such a pulse width would indicate a valid fall time between the two discrete voltages, while the MOSFET switch 356 is opening. In the routine, the next step 1712 is to increment the address of the register "X" by one. Then, the 500-microsecond counter is again cleared 1714, as is the 500-microsecond timer, to enable the determination of the next signal. Then, the L-to-H transition latch is also cleared 1716 for the next such transition. Finally, the routine proceeds to a step 1718 of checking the address of the register "X." Preferably, if the address is greater than 400 hex, the routine returns to the step 1702 of returning to the initial register address and clearing all of the registers. If not, the routine proceeds to the next step 1720 of measuring the time until the next transition. To do this, the routine polls the 500-microsecond timer. If 500 microseconds have not elapsed, the routine returns to the prior step 1708 of checking the L-to-H transition latch. If 500 microseconds have elapsed, then the routine proceeds to a step 1722 of incrementing a 500-microsecond counter by one. After each increment of the counter, the routine checks 1724 whether the value stored in the counter exceeds 40 hex. If 40 hex has not been exceeded, the routine returns to the step 1708 of polling the L-to-H transition latch. If the 500-microsecond counter has exceeded 40 hex, the counter indicates that no further data is being sent because such a count exceeds the pulse width of any transmitted data. In such a case, the routine proceeds to steps of clearing 1726 the Transmission-Begins Status Bit, incrementing 1728 a Transmission Counter by one, and then checking 1730 to determine if the value in the Transmission Counter equals two. As discussed above, the telemetry transmission scheme preferably repeats each transmission as an error-checking measure. Thus, the value in the transmission counter must equal two before the routine will deem the data transmission complete. If such is the case, the routine exits 1732. If not, the routine returns to the step 1704 of detecting an H-to-L transition of the Q output of the R/S latch.

Although the present invention has been described with reference to preferred embodiments, it will be readily appreciated to those of ordinary skill in the art that many modifications and adaptations of the invention are possible without departure from the spirit and scope of the invention as claimed hereinafter.

I claim:

1. A theft-deterrence system for a vehicle having a direct current power transmission circuit including a battery, and having an ignition switch that when in motion produces electrical activity on the direct current power transmission circuit, said theft-deterrence system comprising:

a. an electrical activity sensor coupled to the direct current power transmission circuit, said electrical activity sensor having an electrical activity sensor output producing an electrical activity output signal functionally related to a voltage detected on the direct current power transmission circuit;

b. a battery-disconnect switch electrically interposed in the direct current power transmission circuit; and c. a controller, including an input, an output and a system state register, the input of said controller being electrically coupled to the electrical activity sensor output and the output of said controller being electrically coupled to said battery-disconnect switch, said controller analyzing the electrical activity output signal of said electrical activity sensor to identify when the electrical activity output signal contains an electrical signature of an ignition switch in motion, and said controller calculating a theft-deterrence value based on analyzing the electrical activity and transmitting a battery-disabling signal to said battery-disconnect switch when the theft-deterrence value surpasses a predetermined battery-disconnect threshold level.

2. The theft-deterrence system of claim 1, said controller determining that when the system state register is in a state representing that said theft-deterrence system is armed and the electrical activity output signal matches the ignition switch electrical signature to a preset degree, the theft-deterrence value surpasses the predetermined battery-disconnect threshold level.

3. The theft-deterrence system of claim 1, further comprising:

a. a remote radio frequency transmitter actuated by a remote user and transmitting an arm/disarm control signal; and b. a radio frequency receiver receiving the arm/disarm control signal and having a receiver output electrically coupled to the input of said controller and producing a receiver output signal functionally related to the arm/disarm control signal, said controller setting the system state register to the armed state when the receiver output signal to arm said theft-deterrence system is received, and setting the system state register to a disarmed state when the receiver output signal to disarm said theft-deterrence system is received.

4. The theft-deterrence system of claim 1, said controller further including a memory comprising a library of electrical activity signatures, and said controller analyzing the electrical activity output signal by comparing the signal with the library of electrical activity signatures.

5. The theft-deterrence system of claim 1, said controller analyzing the electrical activity output signal of said electrical activity sensor to identify when the electrical activity output signal contains an electrical signature of a door opening, and said controller factoring into the theft-deterrence value whether said controller identifies the door-opening electrical signature when the theft-deterrence system is armed.

6. The theft-deterrence system of claim 1, further comprising a condition reporting module electrically interposed in the direct current power transmission circuit and reporting a warning when an alarm warning signal is received over the direct current power transmission circuit, said controller transmitting the alarm warning signal to said condition reporting module when the theft-deterrence value surpasses a predetermined warning threshold level.

7. The theft-deterrence system of claim 6, further comprising an alarm module electrically coupled to the output of said controller and broadcasting an alarm signal when an alarm activation signal is received from the controller, said controller transmitting the alarm activation signal to said alarm module when the theft-deterrence value surpasses a predetermined alarm threshold level.

8. The theft-deterrence system of claim 1, further comprising an alarm module electrically coupled to the output of said controller and broadcasting an alarm signal when an alarm activation signal is received from the controller, said controller transmitting the alarm activation signal to said alarm module when the theft-deterrence value surpasses a predetermined alarm threshold level.

9. The theft-deterrence system of claim 1, further comprising a motion sensor having a motion sensor output electrically coupled to the input of said controller and producing a motion sensor output signal functionally related to vibration detected within the vehicle, said controller analyzing the motion sensor output signal of said motion sensor to identify when the motion sensor output signal contains a vibration signature of a forced entry of the vehicle, and said controller factoring into the theft-deterrence value whether the controller identifies the forced entry vibration signature.

10. The theft-deterrence system of claim 1, said controller further including a memory comprising a library of electrical activity and vibration signatures, and said controller analyzing the electrical activity output signal by comparing the electrical activity output signal with the library of electrical activity signatures and analyzing the motion sensor output signal by comparing the motion sensor output signal with the library of vibration signatures.

11. The theft-deterrence system of claim 1, the electrical activity sensor including a low-pass filter.

12. The theft-deterrence system of claim 1, the battery-disconnect switch being a field-effect transistor.

13. A method of deterring theft of a vehicle having a direct current power transmission circuit including a battery, and having an ignition switch that when in motion produces an electrical activity signal unique to said motion on the direct current power transmission circuit, said method comprising the steps of:

a. setting a system state register in a controller to a value representing a theft-deterrence system in an armed state;

b. analyzing the electrical activity signal on the direct current power transmission circuit and identifying therefrom when the ignition switch is in motion;
said analyzing step being performed by comparing the electrical activity signal with a library of electrical activity signatures;

c. calculating a theft-deterrence value based on identified electrical activity; and d. transmitting a battery-disabling signal when the theft-deterrence value surpasses a predetermined battery-disconnect threshold level.

14. A method of deterring theft of a vehicle having a direct current power transmission circuit including a battery, and having an ignition switch that when in motion produces an electrical activity signal unique to said motion on the direct current power transmission circuit, said method comprising the steps of:

a. setting a system state register in a controller to a value representing a theft-deterrence system in an armed state;

b. analyzing the electrical activity signal on the direct current power transmission circuit and identifying therefrom when the ignition switch is in motion;

c. calculating a theft-deterrence value based on identified electrical activity;

d. transmitting a battery-disabling signal when the theft-deterrence value surpasses a predetermined battery-disconnect threshold level;

e. detecting vibration within the vehicle;

f. identifying when the vibration contains a vibration signature of a forced entry of the vehicle; and g. factoring into the theft-deterrence value whether the forced entry vibration signature is identified in the vibration.

15. A method of deterring theft of a vehicle having a direct current power transmission circuit including a battery, and having an ignition switch that when in motion produces an electrical activity signal unique to said motion on the direct current power transmission circuit, said method comprising the steps of:

a. setting a system state register in a controller to a value representing a theft-deterrence system in an armed state;

b. analyzing the electrical activity signal on the direct current power transmission circuit and identifying therefrom when the ignition switch is in motion;

c. calculating a theft-deterrence value based on identified electrical activity;

d. transmitting a battery-disabling signal when the theft-deterrence value surpasses a predetermined battery-disconnect threshold level; and e. determining that when the system state register is in a state representing that said theft-deterrence system is armed and the electrical activity signal matches the ignition switch electrical signature to a preset degree, the theft-deterrence value surpasses the predetermined battery-disconnect threshold level.

* * * * *